(12) United States Patent
Shigeta

(10) Patent No.: US 11,410,491 B2
(45) Date of Patent: Aug. 9, 2022

(54) TABLE GAME MANAGEMENT SYSTEM AND GAME MANAGEMENT SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 16/411,868

(22) Filed: May 14, 2019

(65) Prior Publication Data

US 2019/0347893 A1 Nov. 14, 2019

(30) Foreign Application Priority Data

May 14, 2018 (JP) .............................. JP2018-093247

(51) Int. Cl.
*G07F 17/32* (2006.01)
*G06Q 40/00* (2012.01)
*G06Q 50/34* (2012.01)
*G06K 19/04* (2006.01)
*G06N 3/08* (2006.01)
(Continued)

(52) U.S. Cl.
CPC ......... *G07F 17/322* (2013.01); *G06K 19/047* (2013.01); *G06N 3/08* (2013.01); *G06Q 20/346* (2013.01); *G06Q 40/12* (2013.12); *G06Q 50/34* (2013.01); *G06V 20/00* (2022.01); *G06V 40/172* (2022.01); *G07C 9/00* (2013.01); *G07F 17/3206* (2013.01); *G07F 17/3234* (2013.01); *G07F 17/3239* (2013.01); *G07F 17/3244* (2013.01);
(Continued)

(58) Field of Classification Search
CPC ............... G07F 17/322; G07F 17/3234; G07F 17/3239; G07F 17/3244; G07F 17/3293; G06Q 40/12; G06Q 50/34
USPC .......................................................... 463/11
See application file for complete search history.

(56) References Cited

U.S. PATENT DOCUMENTS

2005/0009601 A1  1/2005  Manfredi et al.
2005/0014562 A1  1/2005  Fujimoto
(Continued)

FOREIGN PATENT DOCUMENTS

AU  2016356234 A1  11/2017
CA     3032770 A1   2/2018
(Continued)

OTHER PUBLICATIONS

International Search Report dated Jun. 4, 2019 issued in corresponding/family PCT application PCT/JP2019/018950.
(Continued)

*Primary Examiner* — Allen Chan
(74) *Attorney, Agent, or Firm* — Norton Rose Fulbright US LLP

(57) ABSTRACT

The management and control device uses the information acquired from the measurement device to detect a total bet amount of the chips placed on the bet area of the game table by the game participants, and uses the information acquired from the card shoe and the measurement device to detect a winning or losing amount for the game organizer. A sales balance management part compares a sales profit ratio that is a ratio of the winning or losing amount for the game organizer to the total bet amount with a theoretical profit ratio or a previous average profit ratio, and outputs a comparison result.

46 Claims, 31 Drawing Sheets

(51) Int. Cl.
  *G06Q 20/34*  (2012.01)
  *G07C 9/00*  (2020.01)
  *G06V 20/00*  (2022.01)
  *G06V 40/16*  (2022.01)
(52) U.S. Cl.
  CPC ...... *G07F 17/3248* (2013.01); *G07F 17/3276* (2013.01); *G07F 17/3293* (2013.01)

(56) References Cited

U.S. PATENT DOCUMENTS

| | | | |
|---|---|---|---|
| 2010/0171267 A1* | 7/2010 | Walker | A63F 1/14 273/274 |
| 2015/0080117 A1* | 3/2015 | Czyzewski | G07F 17/3258 463/27 |
| 2015/0087397 A1* | 3/2015 | Snow | A63F 1/00 463/25 |
| 2015/0206375 A1 | 7/2015 | Emori et al. | |
| 2015/0312517 A1 | 10/2015 | Hoyt et al. | |
| 2015/0375096 A1 | 12/2015 | Jackson et al. | |
| 2019/0362594 A1 | 11/2019 | Shigeta | |
| 2020/0265672 A1 | 8/2020 | Shigeta | |

FOREIGN PATENT DOCUMENTS

| | | |
|---|---|---|
| CN | 102125756 A | 7/2011 |
| CN | 105120206 A | 12/2015 |
| JP | 2017018499 A | 1/2017 |
| JP | 2018020103 A | 2/2018 |
| WO | 20170174970 A1 | 10/2017 |
| WO | 2018025752 A1 | 2/2018 |

OTHER PUBLICATIONS

European Search Report dated Sep. 16, 2019 issued in corresponding EP application 19174386.3.
Macao Office Action dated Apr. 27, 2020 issued in corresponding MO application I/001612.
European Search Report dated Feb. 25, 2022 issued in EP Application No. 19804178.2.
Filipino Allowance dated May 27, 2022 issued in PH Application No. 1-2019-000188.

* cited by examiner

| GAME START TIME (BET END TIME) | 2018/03/15 20:16'25 |
|---|---|
| BET END TIME (SETTLEMENT START TIME) | 2018/03/15 20:17'32 |
| WIN-LOSE RESULT | PLAYER |
| PLAYER PAIR | NONE |
| BANKER PAIR | NONE |

FIG.6

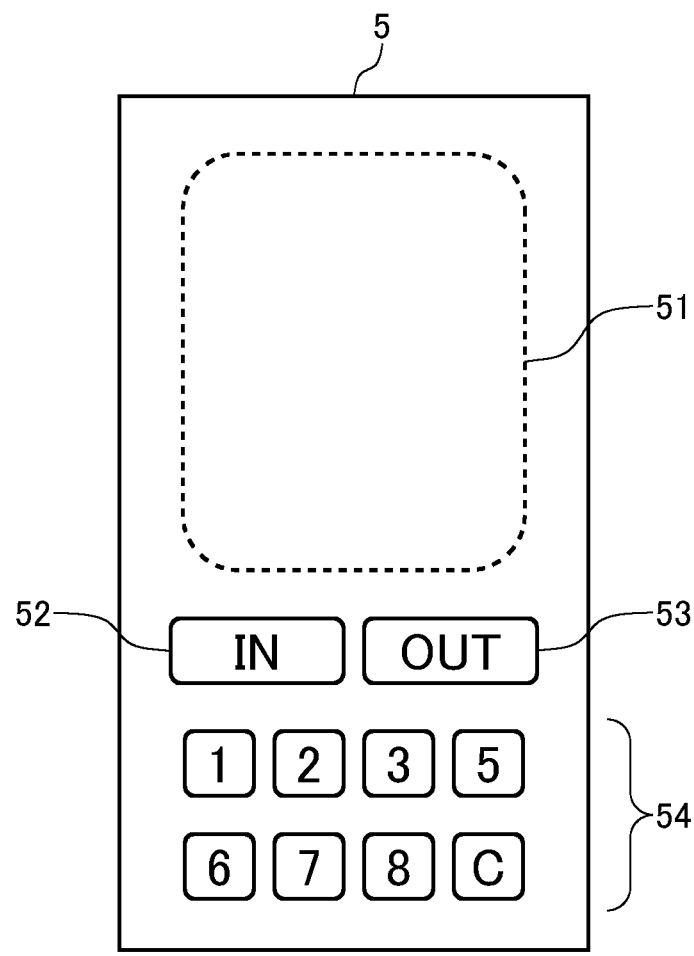
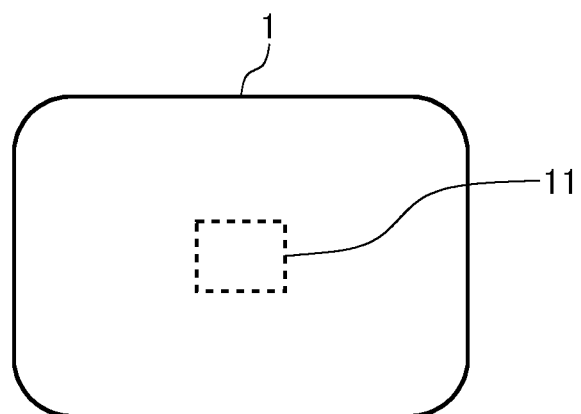
FIG.7

| |
|---|
| MEMBER ID |
| OWNED POINTS |
| RECENT BALANCE |
| ACQUIRED POINTS DURING LAST THREE DAYS |
| ACQUIRED POINTS DURING LAST ONE MONTH |
| ACQUIRED POINTS DURING LAST ONE YEAR |

FIG.8

| | | | | | | | | |
|---|---|---|---|---|---|---|---|---|
| TIME AND DATE | 2018/3/14 20:38 | | | | | | | |
| TABLE ID | T0001 | | | | | | | |
| LAYOUT | Type-a | | | | | | | |
| MINIMUM BET AMOUNT | $100 | | | | | | | |
| DEALER ID | D0001 | | | | | | | |
| BET PERIOD | '46 | | | | | | | |
| GAMING PERIOD | 1'03 | | | | | | | |
| CHIP COLLECTION PERIOD | '16 | | | | | | | |
| CHIP PAYMENT PERIOD | '42 | | | | | | | |
| GAME RESULT | PLAYER | | | | | | | |
| DEALER CHIP AMOUNT AT START | 5,825,410 | | | | | | | |
| DEALER CHIP AMOUNT AFTER SETTLEMENT | 5,825,660 | | | | | | | |
| VERIFICATION RESULT | OK | | | | | | | |
| POSITION | 1 | 2 | 3 | 4 | 5 | 6 | 7 | 8 |
| MEMBER ID | - | P0001 | - | - | P0002 | P0003 | P0004 | - |
| BET AMOUNT | 100,000 / - | 100,000 / 0 | 100,000 / - | - | 100,000 / 0 | 100,000 / 0 | 100,000 / 0 | 100,000 / - |
| | 10,000 / - | 10,000 / 0 | 10,000 / - | - | 10,000 / 0 | 10,000 / 0 | 10,000 / 0 | 10,000 / - |
| | 1,000 / - | 1,000 / 0 | 1,000 / - | - | 1,000 / 0 | 1,000 / 0 | 1,000 / 0 | 1,000 / - |
| | 100 / - | 100 / 1 | 100 / - | - | 100 / 0 | 100 / 3 | 100 / 2 | 100 / - |
| | 10 / - | 10 / 5 | 10 / - | - | 10 / 0 | 10 / 0 | 10 / 0 | 10 / - |
| BET TARGET | - | BANKER | - | - | - | BANKER | PLAYER | - |
| PAYMENT(-)/COLLECTION(+) | - | +150 | - | - | 0 | +300 | -200 | - |
| SALES | 650 | | | | | | | |
| NET PROFIT | +250 | | | | | | | |

FIG.18

Chip Count in Chip Tray for Each Table

15-Mar-18

| Table No. | $100,000 | $50,000 | $10,000 | Chip Count $5,000 | $1,000 | $500 | $100 | $25 | Total Amount |
|---|---|---|---|---|---|---|---|---|---|
| 1 | 4 | 10 | 37 | 43 | 62 | 70 | 85 | 26 | $1,591,150 |
| 2 | 5 | 11 | 35 | 20 | 89 | 67 | 82 | 23 | $1,631,275 |
| 3 | 5 | 12 | 36 | 36 | 56 | 66 | 52 | 36 | $1,735,100 |
| 4 | 2 | 7 | 49 | 45 | 78 | 65 | 61 | 31 | $1,382,375 |
| 5 | 3 | 15 | 36 | 18 | 52 | 63 | 70 | 25 | $1,591,125 |
| 6 | 4 | 10 | 44 | 41 | 80 | 60 | 80 | 38 | $1,663,950 |
| 7 | 6 | 5 | 34 | 26 | 51 | 66 | 77 | 42 | $1,412,750 |
| . | . | . | . | . | . | . | . | . | . |
| . | . | . | . | . | . | . | . | . | . |
| . | . | . | . | . | . | . | . | . | . |
| 73 | 36 | 24 | 50 | 20 | 12 | 27 | 31 | 18 | $5,429,050 |
| 74 | 47 | 20 | 28 | 21 | 46 | 21 | 40 | 12 | $6,145,800 |
| 75 | 4 | 5 | 30 | 20 | 66 | 68 | 80 | 27 | $1,158,675 |
| Total | 311 | 750 | 2,904 | 2,454 | 5,014 | 4,896 | 5,432 | 2,368 | $117,939,900 |

FIG.20

Profit

15-Mar-18

| Table No. | Total Bet Amount | Gross Profit | Profit Ratio |
|---|---|---|---|
| 1 | $1,700,200 | $42,505 | 2.5% |
| 2 | $1,460,400 | $58,416 | 4.0% |
| 3 | $1,050,500 | -$21,010 | -2.0% |
| 4 | $1,650,700 | $39,617 | 2.4% |
| 5 | $968,000 | $32,912 | 3.4% |
| 6 | $1,104,200 | $16,563 | 1.5% |
| 7 | $1,458,500 | $90,427 | 6.2% |
| . | . | . | . |
| . | . | . | . |
| . | . | . | . |
| 75 | $1,755,425 | $43,886 | 3.3% |
| Total | $100,633,929 | $3,019,018 | 3.0% |

FIG.21

|  | PLAYER1 | PLAYER2 | PLAYER3 | PLAYER4 |
|---|---|---|---|---|
| 1 | $1,000 | $3,000 | $2,000 | $1,000 |
| 2 | $1,200 | $3,000 | $1,500 | $1,500 |
| 3 | $2,000 | $2,000 | $1,800 | $1,000 |
| 4 | $1,000 | $3,500 | $2,300 | $1,300 |
| 5 | $1,500 | $2,300 | $1,800 | $1,000 |
|  | ↓ | ↓ | ↓ | ↓ |
| MINIMUM AMOUNT | $1,000 | $2,000 | $1,500 | $1,000 |
|  | LOW AMOUNT | HIGH AMOUNT | HIGH AMOUNT | LOW AMOUNT |

FIG.24A

|  | PLAYER1 | PLAYER2 | PLAYER3 | PLAYER4 |
|---|---|---|---|---|
| 1 | $1,000 | $1,500 | $2,000 | $1,300 |
| 2 | $1,200 | $2,000 | $1,000 | $1,500 |
| 3 | $2,000 | $2,000 | $1,500 | $1,100 |
| 4 | $1,000 | $3,000 | $1,300 | $1,300 |
| 5 | $1,500 | $1,500 | $1,800 | $1,200 |
|  | ↓ | ↓ | ↓ | ↓ |
| MINIMUM AMOUNT | $1,000 | $1,500 | $1,000 | $1,100 |
|  | LOW AMOUNT | HIGH AMOUNT | LOW AMOUNT | LOW AMOUNT |

FIG.24B

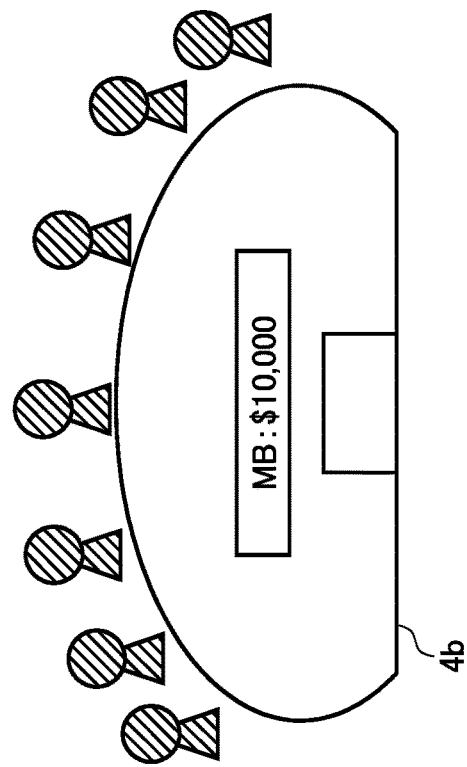
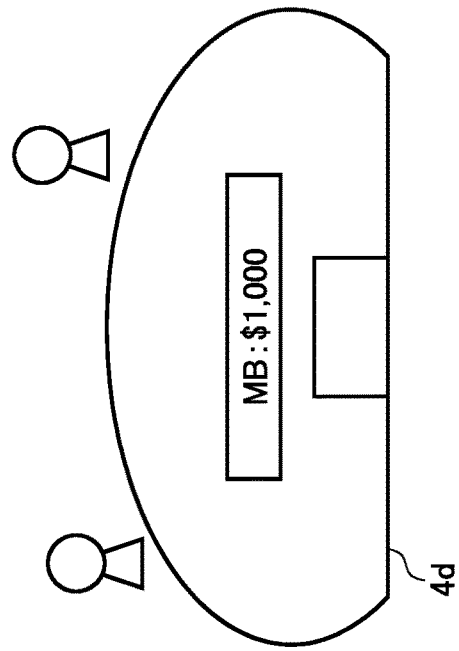
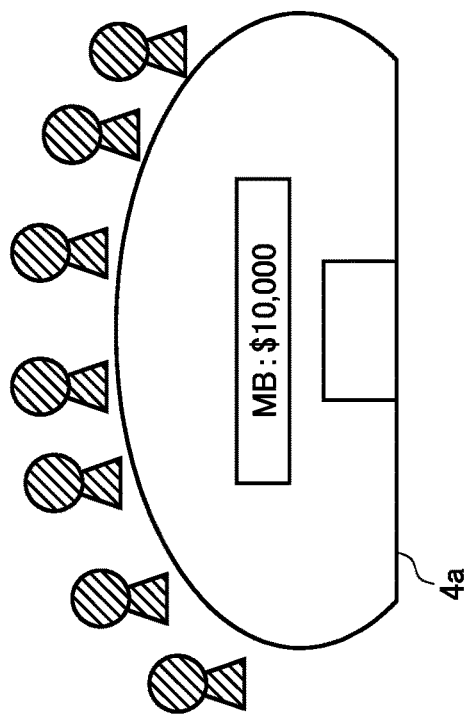
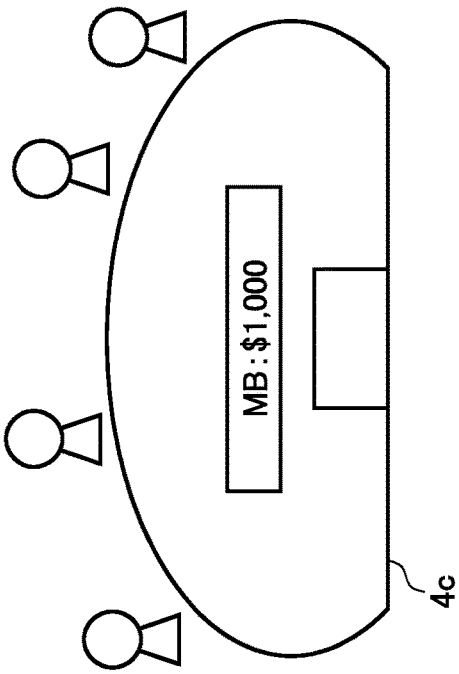
FIG.25A

TABLE GAME MANAGEMENT SYSTEM AND GAME MANAGEMENT SYSTEM

CROSS REFERENCE TO RELATED APPLICATION

This application claims priority to Japanese Patent Application No. 2018-093247 filed May 14, 2018, the entire contents of which are hereby incorporated by reference.

FIELD

The present invention relates to a table game management system used in casino play halls that offer table games.

BACKGROUND AND SUMMARY

Conventionally, in the casino play hall, the game organizer or the owner has used income (gross profit) of the casino play hall in a predetermined period as information for management analysis. In a game played in the casino play hall in a predetermined period, the income can be found as a difference between funds owned by the game organizer (house) at the start and at the end in the concerned period, when the bet amount is collected from losing players and payment is made to winning players.

However, proper management analysis cannot be made merely by ascertaining the magnitude of the income. That is, if the income is diverged from a target amount or an ideal amount, the game organizer of the casino play hall cannot acquire information about room for improvement.

Thus, an object of the present invention is to provide a table game management system capable of acquiring useful management information for improvement in the management and operation of the casino play hall.

An aspect of the present invention is a table game management system including: a win-loss determination device configured to determine a win-loss result of each game at a game table; a measurement device configured to measure the type and the number of gaming chips placed on the game table; and a management and control device configured to identify and store the position, the type, and the number of the gaming chips placed on a bet area of the game table by a game participant, based on a measurement result of the measurement device in each game, wherein the gaming chip has a plurality of plastic colored portions of different colors, and can be identified in type from appearance, the measurement device is configured to use a camera to detect the position, the type, and the number of the gaming chips, the management and control device uses the information acquired from the measurement device to detect a total bet amount (that is, sales) (B) that is the total amount of the gaming chips placed on bet area of the game table by the game participant, the management and control device is further configured to use information acquired from the win-loss determination device and the measurement device to detect a winning or losing amount for the game organizer (Y), and output a sales profit ratio (X) that is a ratio of the winning or losing amount for the game organizer (Y) to the total bet amount (B), and the management and control device is further configured to compare the sales profit ratio (X) with a theoretical profit ratio or a previous average profit ratio and output a comparison result.

With this configuration, the total bet amount (B) and the winning or losing amount (Y) can be automatically acquired to estimate the sales profit ratio (X).

A table game management system includes: a win-loss determination device configured to determine a win-loss result of each game at a game table; a measurement device configured to measure the type and the number of gaming chips placed on the game table; and a management and control device configured to identify and store the position, the type, and the number of the gaming chips placed on a bet area of the game table by a game participant, based on a measurement result of the measurement device in each game, wherein the gaming chip has a plurality of plastic colored portions of different colors, can be identified in type from appearance, and has a unique ID, the measurement device is configured to read the unique IDs of the gaming chips to detect the position, the type, and the number of the gaming chips, and/or to use a camera to detect the position, the type, and the number of the gaming chips, the management and control device uses the information acquired from the measurement device to detect a total bet amount (that is, sales) (B) that is the total amount of the gaming chips placed on bet area of the game table by the game participant, the management and control device is further configured to use information acquired from the win-loss determination device and the measurement device to detect a winning or losing amount for the game organizer (Y), and output a sales profit ratio (X) that is a ratio of the winning or losing amount for the game organizer (Y) to the total bet amount (B), and the management and control device is further configured to compare the sales profit ratio (X) with a theoretical profit ratio or a previous average profit ratio and output a comparison result.

Also, with this configuration, the total bet amount (B) and the winning or losing amount (Y) can be automatically acquired to estimate the sales profit ratio (X).

In the above-mentioned management system, the measurement device may be configured to the detect the position, the type, and the number of the gaming chips by deep learning.

With this configuration, even if the gaming chips are partially hidden, the position, the type, and the number of the gaming chips can be recognized.

In the above-mentioned management system, the management and control device may be configured to output the total bet amount (B), the winning or losing amount for the game organizer (Y), or the sales profit ratio (X) in each game.

With this configuration, the sales profit ratio (X) can be estimated for each game.

In the above-mentioned management system, the measurement device may be configured to detect the total bet amount (B) for each player position of the game table, and the management and control device may use the information acquired from the measurement device to output the total bet amount (B) and/or the sales profit ratio (X) for each player position.

With this configuration, the total bet amount (B) and the sales profit ratio (X) can be estimated for each player position.

In the above-mentioned management system, the management and control device may be associate the player position with the particular game participant at the game table.

With this configuration, the sales profit ratio (X) can be estimated for each game participant to identify the game participant who excessively wins.

In the above-mentioned management system, the management and control device may ascertain the gaming chips placed on the game table by the game participant for each stack, and associate the stack with the particular game participant at the game table.

With this configuration, the stack of the gaming chips on the game table can be associated with the game participant.

In the above-mentioned management system, the management and control device may be configured to ascertain relation between the number of games and time taken to play the games, and output the total bet amount (B), the winning or losing amount for the game organizer (Y), or the sales profit ratio (X) in a predetermined number of games for each game participant, or each game table and/or each dealer in charge of each table.

With this configuration, the efficiency of the progress of the game can be estimated based on the time taken to play the game.

In the above-mentioned management system, the management and control device may be configured to ascertain bet positions and/or the number of stacks of the gaming chips placed on the game table by the game participant, or the number of the gaming chips in each stack, and output it in association with the number of games and time taken to play the games.

With this configuration, the relation between the number of stacks and the taken time can be estimated.

In the above-mentioned management system, the management and control device may be configured to ascertain the number of game participants at the game table, and output the number of game participants in association with the number of games and time taken to play the games.

With this configuration, the relation between the number of the game participants and the taken time can be estimated.

In the above-mentioned management system, the management and control device may ascertain the dealer in charge of each game table, and may have a function of detecting and storing one of following element periods: 1) a bet period, 2) a chip collection period, 3) a chip payment period, and 4) a gaming period, for each dealer.

With this configuration, the element periods of the dealer can be estimated.

In the above-mentioned management system, the table game may be a game using playing cards, and the management and control device may be configured to detect start time and end time of distribution of the playing cards in each game, and ascertain a period from the start time to the end time of the distribution of the playing cards as the gaming period.

With this configuration, the gaming period can be estimated.

In the above-mentioned management system, a minimum bet amount can be set for each game table, and the management and control device may be configured to suggest the minimum bet amount to the game table in order to increase the total bet amount (B) within a predetermined time or period.

With this configuration, the minimum bet amount can be proposed so as to increase the total bet amount (B).

The above-mentioned management system may further include an overall management device configured to manage a plurality of game tables, and the overall management device may be configured to suggest different minimum bet amount to different game tables in order to increase the total bet amount (B) in a predetermined or period at each game table or in unit of game tables.

With this configuration, the minimum bet amount at each game table can be suggested so as to increase the total bet amount (B) of the plurality of game tables.

The above-mentioned management system may further include an overall management device configured to manage a plurality of game tables, and the overall management device may be configured to ascertain information about the bet amount in unit of game tables for each player position or each particular game participant, and suggest the minimum bet amount of each game table based on the information.

With this configuration, the minimum bet amount can be properly suggested.

The above-mentioned management system may further include an overall management device configured to manage a plurality of game tables, and the overall management device may be configured to ascertain the total bet amount (B) for each game and/or the total bet amount (B) in a predetermined time or period in unit of game tables, and suggest the minimum bet amount of the game table to be newly opened.

With this configuration, the minimum bet amount of the newly opened game table can be properly proposed.

In the above-mentioned management system, the management and control device may be configured to suggest the game table to increase the minimum bet amount, if game participants who bet a higher bet amount than the minimum bet amount of the game table by a predetermined ratio or more occupy a predetermined ratio or more.

With this configuration, the minimum bet amount can be properly changed.

In the above-mentioned management system, the overall management device may be configured to suggest the minimum bet amount to each game table so as to decrease an average number of game participants at the game table with the high minimum bet amount.

With this configuration, the number of game participants at the game table with high minimum bet amount can be decreased to increase the turnover ratio, thereby increasing the sales.

In the above-mentioned management system, the overall management device may be configured to suggest the game table to decrease the minimum bet amount, if the game tables with a predetermined number of game participants or less occupy a predetermined ratio or more.

With this configuration, when the number of game participants is small, the minimum bet amount can be decreased to promote an increase in the game participants.

The above-mentioned management system may further include an overall management device configured to manage a plurality of game tables, and the overall management device may be configured to ascertain the total bet amount in a predetermined time or period for each game participant, provide the game participant with a point or status under a predetermined condition, and output the point or status.

With this configuration, providing the point or status can promote participation in the game.

The above-mentioned management system may further include an overall management device configured to manage a plurality of game tables, and the overall management device may be configured to ascertain a net profit in a predetermined time or period for each game participant (that is, the total amount acquired by subtracting the losing amount from the winning amount of the game participant), provides the game participant with a point or status under a predetermined condition.

With this configuration, based on the net profit in the predetermined time or period for each game participant, the point or status can be provided so as to promote the game participant to participate in more games.

The above-mentioned management system may further include an overall management device configured to manage a plurality of game tables, and the overall management device may be configured to ascertain the number of participating games in a predetermined time or period for each game participant, provide the game participant with a point or status under a predetermined condition, and output the point or status.

With this configuration, based on the number of participating games of the game participant in the predetermined time or period, the point or status can be provided so as to promote the game participant to participate in more games.

The above-mentioned management system may further include an overall management device configured to manage a plurality of game tables, and the overall management device may be configured to store at least one of information: 1) the number of visits to the concerned play hall, 2) the number of times of bet, 3) winning amount, and 4) losing amount, in unit of weeks or months, or in a predetermined period for each game participant.

With this configuration, it can be ascertained whether or not the game participant participates in the game in the play hall the predetermined period.

In the above-mentioned management system, the overall management device may be configured to output at least one of the information 1) to 4), when the game participant enters the play hall.

With this configuration, it is possible to ascertain that the game participant enters into the play hall. At entrance into the play hall, the entrance may be limited according to the number of visits, or the number of times of bet of the game participant.

The above-mentioned management system may further include an overall management device configured to manage a plurality of game tables, and the overall management device may be configured to output the accumulated bet amount or the bet amount in a predetermined period for each game participant, as credit information about the game participant.

With this configuration, the bet amount in the play hall may be used as the credit information.

In the above-mentioned management system, the overall management device may be configured to ascertain purchase information about the gaming chips in a predetermined time or period by the game participant, and output the purchase information in association with the bet amount, or the winning or losing amount for each game participant.

With this configuration, by ascertaining the purchase information about the gaming chips, the bet amount, and the winning or losing amount for each game participant, the amount of the gaming chips owned by the game participant can be ascertained to detect, for example, a doubt about money laundering.

In the above-mentioned management system, the overall management device may be configured to ascertain the purchase information for each type of the gaming chips.

With this configuration, the purchase information can be ascertained for each type of gaming chip.

In the above-mentioned management system, the predetermined time or period may be provided in the predetermined time or period, in unit of days or consecutive days, in unit of months, or in a cumulative period.

With this configuration, the point or status can be properly provided.

In the above-mentioned management system, if the point is intensively provided in the predetermined time or period, the point or status may be additionally provided.

With this configuration, a bonus point or status may be provided to the game participant who intensively acquire points in a predetermined time or period.

In the above-mentioned management system, an access to a VIP room may be provided under a predetermined condition of the point or status.

With this configuration, the access to the VIP room can be allowed according to the point or status.

In the above-mentioned management system, the point or status may be converted into unconvertible gaming chips under a predetermined condition.

With this configuration, it is possible to promote the participation in the game according to the point or status.

In the above-mentioned management system, the point or status may be used for payment of charges of hotels or predetermined facilities under a predetermined condition.

With this configuration, by promoting the participants to use facilities such as hotels and stay longer according to the point or status, the bet amount in the casino hall can be increased.

In the above-mentioned management system, the management and control device may be configured to store information about following items 1) to 3): 1) a bet amount (B) of individual game played at the game table; 2) a win-loss result (W&L) of the individual game played at the game table; and 3) a gross profit ratio (R %) according to rules of the game played at the game table, in each and/or a predetermined time or period, and use the information about the items 1) to 3) to calculate a following equation:

$$Y = \rho(B \times W\&L \times R\%)$$

to output a gross profit (Y).

With this configuration, the gross profit (Y) can be calculated from the bet amount, the win-loss result, and the gross profit ratio.

In the above-mentioned management system, the management and control device may be configured to output bet positions and/or the number of stacks of the gaming chips placed on the game table by the game participant, or the number of the gaming chips in each stack.

With this configuration, the bet amount can be ascertained for each bet position or stack.

In the above-mentioned management system, the management and control device may be configured to calculate the gross profit (Y) using different gross profit ratios (R1%, R2%, . . . ), if the gross profit ratio (R %) based on rules of the game played at the game table is the gross profit ratio that varies according to layout or bet area of the game table.

With this configuration, the gross profit (Y) can be calculated using the gross profit ratio that varies according to the layout to estimate the layout.

In the above-mentioned management system, the management and control device may be configured to output the distribution state of the total bet amount (TB) of the game and/or the bet amount (B) of the game for each layout or bet area, if different gross profit ratios are set according to layout or bet area of the game table, for each different gross profit ratio (R1%, R2%, . . . ).

With this configuration, the distribution of the bet amount for each layout or bet area can be ascertained to analyze the layout in which the participant bets a target having a high ratio.

With this configuration, the distribution of the bet amount for each gross profit ratio can be ascertained to analyze the layout in which the participant bets a target having a high ratio.

The above-mentioned management system may further include an overall management device configured to manage a plurality of game tables, and the overall management device may be configured to compare the gross profits (Y) or the total gross profit ratios (R %) of the game tables having layout or bet area with each other in unit of game table, the different gross profit ratios (R1%, R2%, ... ) being set according to the layout or bet area of the game table.

With this configuration, the distribution of the bet amount for each table can be ascertained to analyze the layout in which the participant bets a target having a high ratio.

In the above-mentioned management system, the measurement device may be configured to read the unique IDs of the gaming chips and/or use a camera to measure the total amount of the gaming chips in the chip tray of the game table, and the management and control device may be configured to use information acquired from the win-loss determination device and the measurement device in each game to detect the winning or losing amount for the game organizer (Y), perform noncoincidence detection of detecting whether or not an increase/decrease amount in the total amount of the gaming chips in the chip tray coincides with the winning or losing amount for the game organizer (Y), and output a detection result.

With this configuration, any unfair practice or mistake in collection or payment of the gaming chips can be detected.

In the above-mentioned management system, the management and control device may be configured to count the number of times of noncoincidence detection of detecting the increase/decrease amount in the total amount of the gaming chips in the chip tray coincides with the winning or losing amount for the game organizer (Y), and output the count.

With this configuration, the number of unfair practices or mistakes in collection or payment of the gaming chips can be ascertained.

In the above-mentioned management system, the management and control device may be configured to compare the increase/decrease amount in the total amount of the gaming chips in the chip tray with the winning or losing amount for the game organizer (Y), count a noncoincidence amount (L) when noncoincidence occurs, and output the count.

With this configuration, the noncoincidence amount caused by unfair practices or mistakes in collection or payment of the gaming chips can be ascertained.

In the above-mentioned management system, the management and control device may be configured to ascertain an accumulated amount of the noncoincidence amount (L).

With this configuration, the accumulated noncoincidence amount caused by unfair practices or mistakes in collection or payment of the gaming chips can be ascertained.

In the above-mentioned management system, the management and control device may be configured to compare the increase/decrease amount in the total amount of the gaming chips in the chip tray with the winning or losing amount for the game organizer (Y), count the noncoincidence amount (L), and calculate a following equation:

$$Y' = \Sigma(B \times W\&L \times R\% \pm L)$$

to output a gross profit (Y').

With this configuration, the gross profit can be calculated in consideration of the noncoincidence amount.

In the above-mentioned management system, the management and control device may be configured to compare the increase/decrease amount in the total amount of the gaming chips in the chip tray with the winning or losing amount for the game organizer (Y), count the noncoincidence amount (L), and output the noncoincidence amount (L) for each game participant or each dealer in charge of each game table.

With this configuration, the noncoincidence amount can be ascertained for each dealer or game participant to identify a person with suspected unfair practice.

In the above-mentioned management system, the management and control device may be further configured to compare results of the actual winning percentage and the total amount of the gross profit (Y) with numerals calculated by probability and statistics or numerals based on previous accumulated data at completion of a predetermined the number of games for each game participant and for each dealer in charge of each game table, determine whether or not there is a significant difference therebetween, and identify at least one of the game participant, the dealer, and the game table that cause the significant difference.

With this configuration, even if a high level of unfair practice that cannot be detected in unit of games is made, a person with suspected unfair practice can be identified by statistically calculating the winning percentage and the gross profit.

In the above-mentioned management system, the management and control device may be configured to store the bet chip amounts at each game table at the bet positions having different gross profit ratios (R %), and identify whether or not a cause for the significant difference in a series of games causing the significant difference is related to the bet positions having the different gross profit ratios (R %).

With this configuration, for example, the game participant who wins at a typical winning percentage, but bets at high ratio when wins, or the dealer in collusion with such game participant can be found.

An example embodiment of the present invention is directed to a game management system for managing casino games played in a play hall, where the game management system includes: a win-loss determination device configured to determine a win-loss result of each game at a game table; a measurement device configured to measure the type and the number of gaming chips placed on the game table; a management and control device configured to identify and store the position, the type, and the number of the gaming chips placed on bet area of the game table for each player position of the game table, based on a measurement result of the measurement device in each game; and an overall management device configured to manage a plurality of game tables, where the management and control device is configured to associate the player position with a particular game participant at the game table and use information acquired from the win-lose determination device and the measurement device to detect a winning or losing amount for each game participant, and the overall management device is configured to ascertain purchase information and selling information about the gaming chips for each game participant in a predetermined time or period, and performs addition or subtraction of the purchase information and the selling information for each game participant, and the winning or losing amount detected by the management and control device for each game participant to ascertain a balance of the gaming chips owned by each game participant at a predetermined timing.

In an example of this game management system, the overall management device is configured to ascertain purchase information and selling information about the gaming chips for each game participant in a period from entrance into the play hall to leaving from the play hall of each game participant.

In an example of this above-mentioned game management system, the system further includes an entrance and leaving management device configured to recognize entrance/leaving of the game participant into/from the play hall, where the overall management device is configured to use information acquired from the entrance and leaving management device to ascertain the game participant who attempts to leave from the play hall and issue an alert about the leaving of the game participant when the balance of the gaming chips owned by the concerned game participant is a predetermined amount or more.

In an example of this above-mentioned game management system, the game participant is identified by face recognition system using an image from a camera, or by reading a member card or a credit card of the game participant.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 6 is a view illustrating data recorded in a recording part;

FIG. 7 is a view illustrating a reader/writer and a member card;

FIG. 8 is a view illustrating information stored in the member card 1;

FIG. 18 is a view illustrating the configuration of a game record generated for each game;

FIG. 20 is an exemplified sales table generated by a sales balance management part of the overall management device;

FIG. 21 is an exemplified gross profit table generated by the sales balance management part of the overall management device;

FIG. 24A is a table illustrating an example of setting the minimum bet amount based on the actual bet amount;

FIG. 24B is a table illustrating an example of setting the minimum bet amount based on the actual bet amount;

FIG. 25A is a view illustrating an example of decision of the recommended value of the minimum bet amount based on table congestion degree;

DETAILED DESCRIPTION OF NON-LIMITING EXAMPLE EMBODIMENT

An embodiment of the present invention will be described below with reference to figures. The embodiment described below merely describes an example in implementing the present invention, and does not limit the present invention to the below-mentioned specific configuration. In implementing the present invention, the specific configuration may be appropriately adopted according to the embodiment.

This embodiment describes the configuration for finding and preventing various unfair practices and mistakes in the casino play hall, and utilizing such configuration for improvement in the operation and management of the casino. Games in the casino experience following phases: bet, game, settlement (collection of loser's chip and payment to a winner). Unfair practices on game tables are often made in the period from the end of bet to settlement.

A table game management system 100 in this embodiment includes a plurality of game table systems 10. Using various sensing technologies and information processing technologies, each of the game table systems 10 or the management system 100 find unfair practices, mistakes, or doubt about them later or in real time. The management system in this embodiment processes sensing data acquired for finding unfair practices or mistakes, thereby calculating useful data for the operation and management of the casino.

Figure 1:
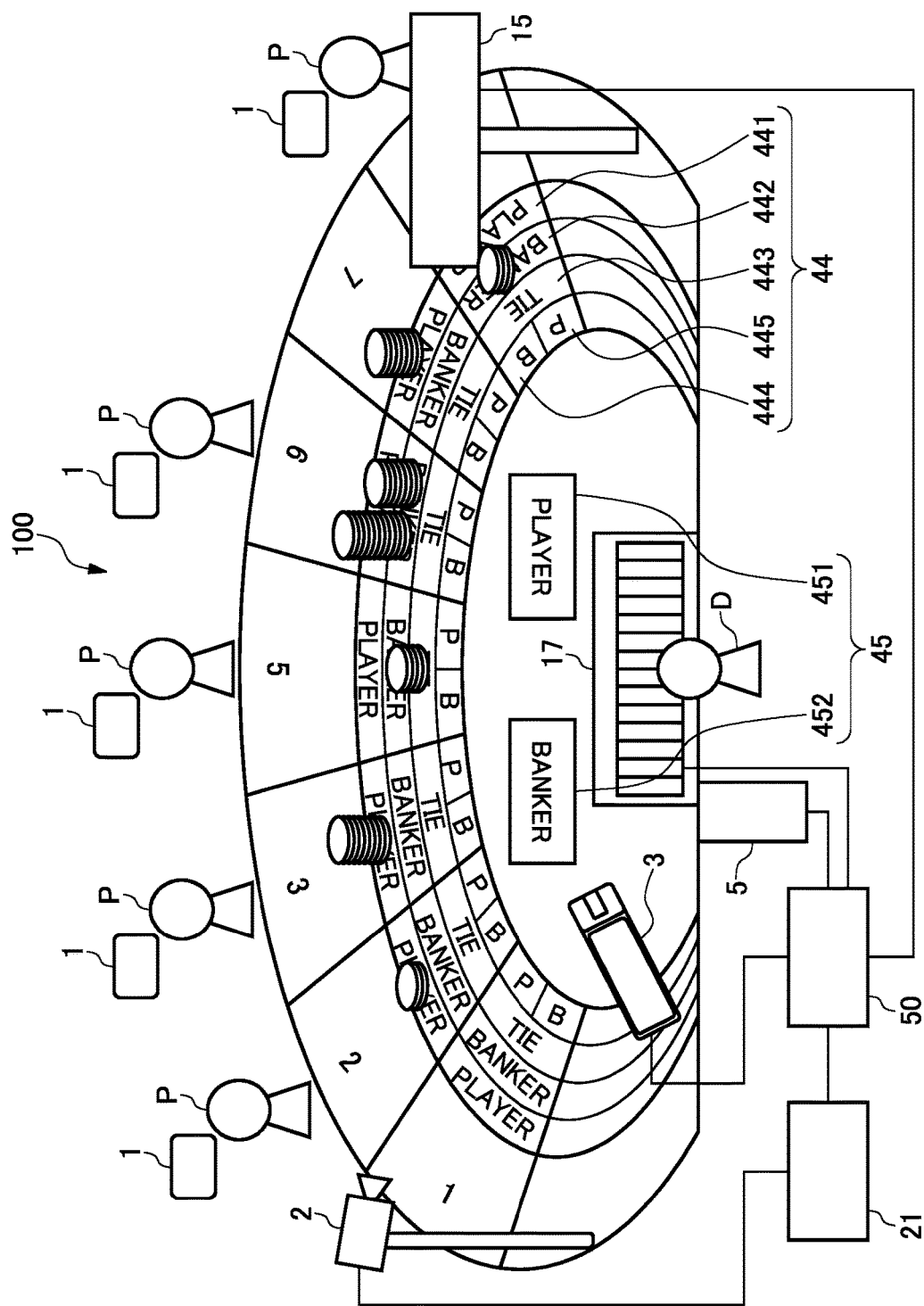
FIG. 1 is a view illustrating the configuration of a game table system.

FIG. 1 is a view illustrating the configuration of the game table system. The game table system 10 is provided with a game table 4, a camera 2, a card shoe 3, a display 15, a reader/writer 5, a dealer chip tray 17, and a table management control device 50. The camera 2, the card shoe 3, the reader/writer 5, the display 15, and the dealer chip tray 17 each are connected to the table management control device 50. The table management control devices 50 of the plurality of game table systems 10 are connected to an overall management device 60 so as to be communicable in a wired or wireless manner, to constitute the table game management system 100.

The table management control device 50 is a computer including a processor and a memory, and operates according to a control program in this embodiment. The table management control device 50 further includes a recording medium such as nonvolatile memory. The table management control device 50 further includes an input/output port connected to the camera 2, the reader/writer 5, the display 15, and the dealer chip tray 17. The table management control device 50 has a communication function for communication with the overall management device 60. If the table management control device 50 wirelessly communicates with the overall management device 60, the communication function includes an antenna.

The game table 4 is substantially elliptical, and has a dealer position at the center on one side of the minor axis of an ellipse, where a dealer D is located, and a plurality of player positions on the other side of the minor axis, where a plurality of game participants (hereinafter referred to as "player") P are located. In the example illustrated in FIG. 1, the seven player positions are set. The dealer chip tray 17 is embedded at the dealer position on the game table 4. Numbers "1", "2", "3", "5", "6", "7", and "8" are assigned to the seven player positions, respectively.

A hand area 45 including a PLAYER hand area 451 and a BANKER hand area 452 is provided at the center of the game table 4. As described above, in the layout illustrated in FIG. 1, a bet area for all types of bet targets are provided at each of the player positions. That is, in the layout in FIG. 1, the bet targets for a bet area 44 are provided as a PLAYER area 441, a BANKER area 442, a TIE area 443, a BANKER PAIR area 444, and a PLAYER PAIR area 445 at each of the player positions.

Figure 2:
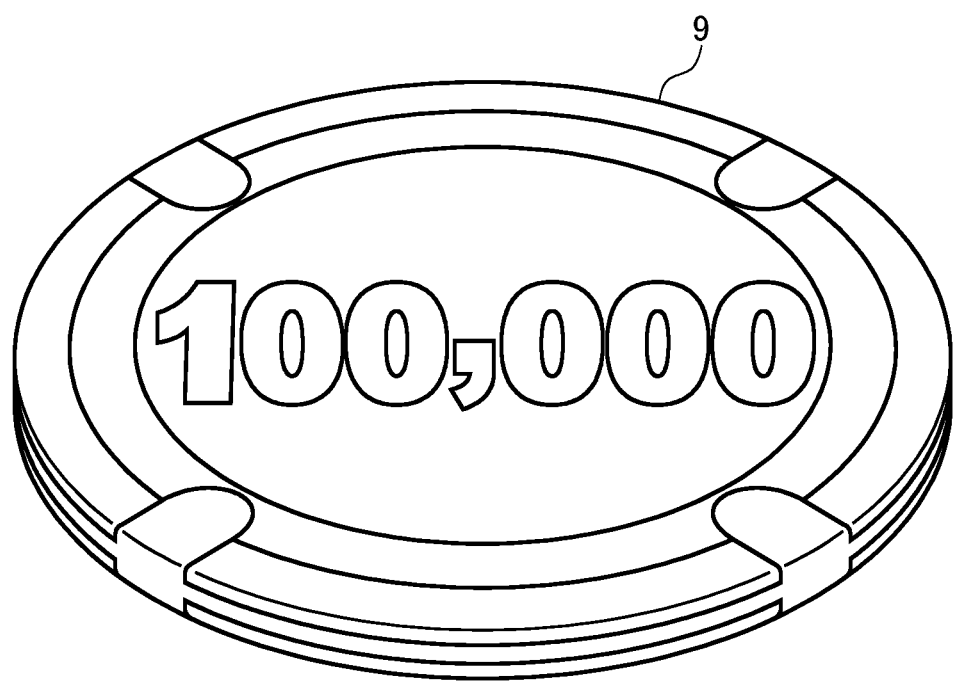
FIG. 2 is a perspective view illustrating a gaming chip.

FIG. 2 is a perspective view of a gaming chip. A gaming chip (hereinafter referred to as "chip") 9 is produced by stacking at least three plastic plates, and bonding them by thermocompression and then, being cut out by punching. The chip 9 is disc-shaped, and has the same design on front and back faces. Numerals indicating the value of the chip are also written on the front and back faces.

The outermost layers of the plurality of stacked layers have the same white or light color irrespective of the value of the chip, and the intermediate layer has a color specific to the value. With this configuration, the value of the chip 9 may be visually recognized based on the design (including numerals indicating the value) on the front and back faces, as well as the color of the intermediate layer (also referred to as ("center line").

An RFID tag is embedded between the layers of the chip 9. The RFID tag stores at least information about the value of the chip. In this manner, the value of the chip 9 may be recognized by reading the RFID tag through electromagnetic wave, or by visually reading the appearance of the front and back faces or the side face.

The camera 2 is a digital camera, and outputs captured images and video to a measurement device 21. The camera captures images (still images) at predetermined time intervals. Alternatively, the camera 2 may periodically capture images (still images) while capturing a video (moving images). The camera 2 is installed so as to capture images of the bet area 44 where the players P place the chips 9 for betting, the hand area 45 where the dealer D places cards drawn from the card shoe 3, and the dealer chip tray 17. The camera 2 may further capture images of the players located at the player positions.

The plurality of cameras 2 may be installed at one game table 4, and capture images in different ranges. For example, the plurality of cameras may be provided so as to take images of the left bet area 44, the right bet area 44, the hand area 45, the dealer chip tray 17, and the player positions. Alternatively, one camera 2 may change the viewing field to take images in different ranges. Further, when the plurality of cameras are installed, the plurality of cameras may capture the image of a stack of the same chips 9. In this case, if all cameras have no dead angle and can clearly view the stack, the image captured from the closest position is used.

The measurement device 21 recognizes the image acquired from the camera 2. This image recognition recognizes the chips 9 on the game table 4. Various techniques of detecting an object from an image can be adopted as the image recognition. For object detection, machine learning technologies such as deep neural network and deep learning are advantageously used. In object detection using machine learning, the chips 9 may be independently recognized. The measurement device 21 may use a recursive neural network such as LSTM to recognize time series data such as a plurality of consecutive images or a video, thereby detecting an object.

The measurement device 21 may simultaneously recognize the value and the number of piled (stacked) chips 9 in each stack, and associate the stack with the player position or player. In this case, by prepared a label for each combination of the number and value of the chip, for example, "four piled 100-dollar chips", "five piled 1000-dollar chips", machine learning and object detection are performed. In this manner, even if there is any hidden chip 9 in the stack, the number of the piled chips 9 may be correctly recognized. In a certain image, if there is another stack located in the dead area around the stack of the chips 9, the measurement device 21 recognizes the stack located in the non-dead area, and ascertains the value and the number of the chips.

The measurement device 21 can further identify each of the bet areas 441 to 445 in the layout of the game table 4. The bet area 44 can be also identified using the machine learning technology. For example, the measurement device 21 applies semantic segmentation to an image, thereby identifying a region corresponding to each of the bet area 441 to 445 at each player position, and assigning a tag consisting of the combination of the number of the player position and the type of the bet area (bet target) to the region.

Based on the result of image segmentation and the recognition result of the chips 9, the measurement device 21 ascertains the number of chips 9, the value of the chips 9, and the player positions and the bet targets of the chips 9, that is, the bet target and the bet amount at each player position.

The measurement device 21 may further recognize the image of the chips in the dealer chip tray 17 to ascertain the number and the type of the chips in the dealer chip tray 17. Since the side faces of all chips 9 stored in the dealer chip tray 17 are exposed from the tray, the measurement device 21 can recognize the design of the side faces of the chips 9, in turn, the value of the chips 9. Based on the recognition result, the table management control device 50 calculates the total amount of the chips in the dealer chip tray 17.

The measurement device 21 may further analyze the image of the camera 2 to ascertain the position and contents (rank and suit) of a card that is drawn from the card shoe 3 and placed face up in the hand area 45 of the game table 4. In this case, the measurement device 21 may recognize start, end and game result of the game, based on the position and contents of the card recognized by image recognition and stored game rules. By using the neural network technology as the image recognition, even if the card is squeezed and bent, the contents of the card placed face up on the table can be read.

In the case where the measurement device 21 performs image recognition with respect to the card on the game table 4, the measurement device 21 can determine the progress state of the game. Specifically, the measurement device 21 analyzes the image from the camera 2, thereby recognizing whether or not the chip has been placed in the bet area (first state), any card has been drawn (second state), all cards to be drawn has been drawn and placed in a card area (third state), and all cards and chips has been removed from the game table 4 (fourth state) to ascertain the progress state of the game.

The measurement device 21 may prepare a first state flag to a fourth state flag corresponding to the first state to the fourth state, and ascertain the progress state of the game according to the flag. That is, the state in which only the first state flag is turned on indicates that the player is betting. From this state, the state in which the first state flag and the second state flag are turned on indicates the gaming state in which the card is drawn, and the game is progressing. Further, the state in which the third state flag is turned on indicates the settlement state in which the gaming state is finished to establish a game result, and chip collection and payment are performed. The period from turning-on of the fourth state flag to turning-off of the fourth state flag and turning-on of the first state flag indicates an interval state between a previous game and a next game. In this manner, the table management control device 50 analyzes the image from the camera 2, thereby turning on/off the state flags and ascertaining the progress state (state) of the game based on the combination of turning-of/off of the state flags.

In the baccara, in some cases, two cards written as "PLAYER" and "BANKER" are placed on the game table 4, and the dealer turns over either of the cards according to a game result to clearly present the game result to the players. In this case, when analyzing the image from the camera 2 and ascertaining that either of the cards is turned over, the measurement device 21 may recognize that the game result is established, and turn on the third state flag. At this time, when analyzing the image from the camera 2 and determining which card is turned over, the measurement device 21 may ascertain the game result. The measurement device 21 may be configured of the same hardware as the table management control device 50.

In the above-mentioned embodiment, position, type, and number of the bet chips 9 are found by image recognition using the camera 2 and the measurement device 21. Additionally or alternatively, the bet chips 9 may be found using RFID. In this case, to read the RFID tag built in the chip 9 placed in the bet area, a RFID reader is embedded at each bet area of the table face of the game table 4. The reading result of the RFID reader is notified to the table management control device 50.

Figure 3:
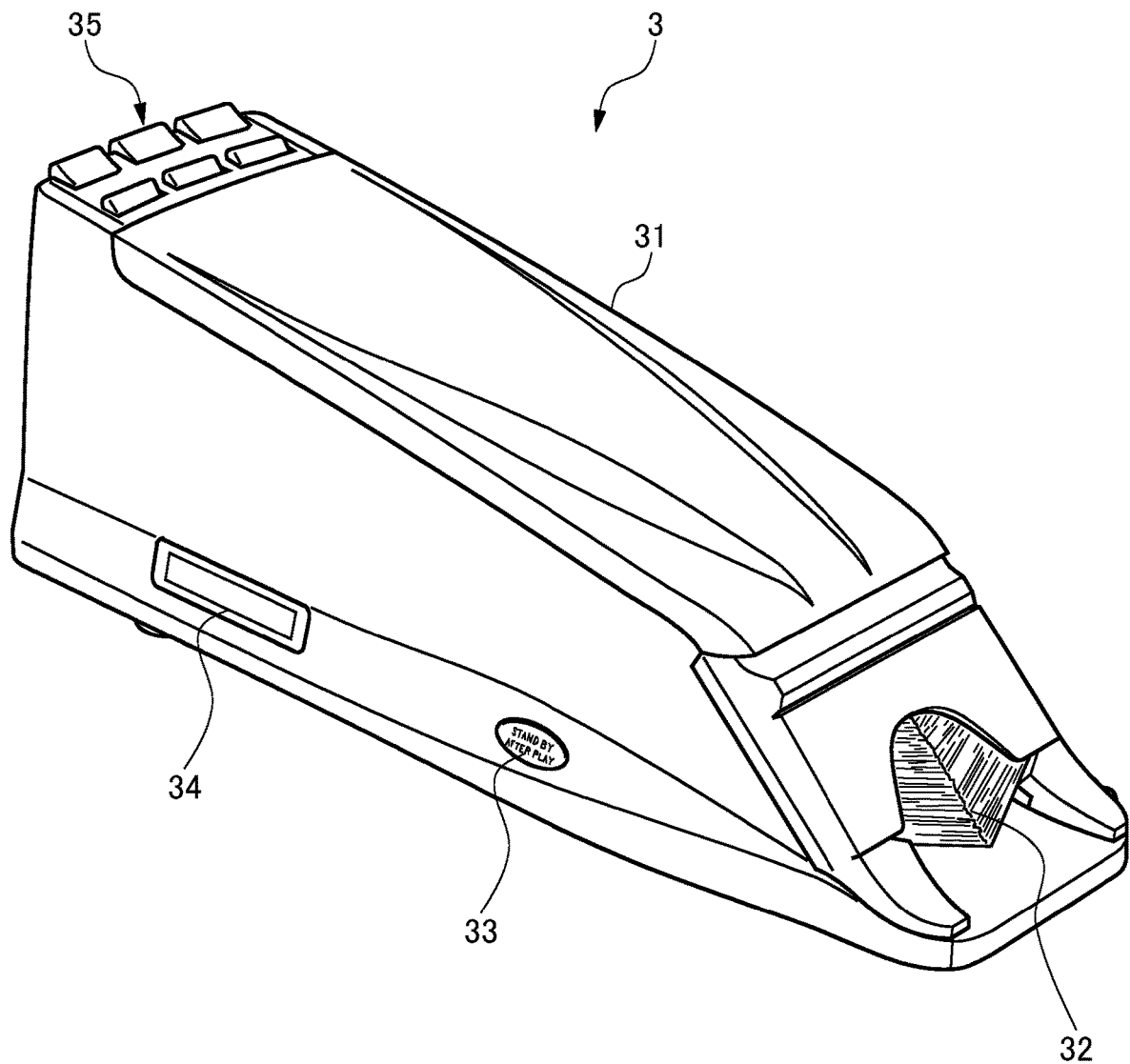
FIG. 3 is a perspective view illustrating the configuration of a card shoe.

FIG. 3 is a perspective view illustrating the configuration of the card shoe. The card shoe 3 can store a plurality of decks (for example, 8 decks) of cards in a storage part 31. The dealer D can manually draw the cards one by one from an outlet 32 of the card shoe 3. A standby button 33 and a reading result display part 34 are provided on the side face of the card shoe 3. The standby button 33 is used to operate when card drawing is finished in the game (that is, when the game result is established). The reading result display part 34 is configured of a liquid crystal monitor.

A game result display lamp 35 is provided at the edge of the upper face of the card shoe 3 on the opposite side to the outlet 32. The game result display lamp 35 includes a plurality of lamps, and indicates the game result according to which lamp is turned on. The game result display lamp 35 includes a TIE lamp turned on when the game result is TIE, a PLAYER lamp turned on when the game result is PLAYER, a BANKER lamp turned on when the game result is BANKER, a P. PAIR lamp lit when PLAYER is PAIR, and a B. PAIR lamp turned on when BANKER is PAIR.

Figure 4:
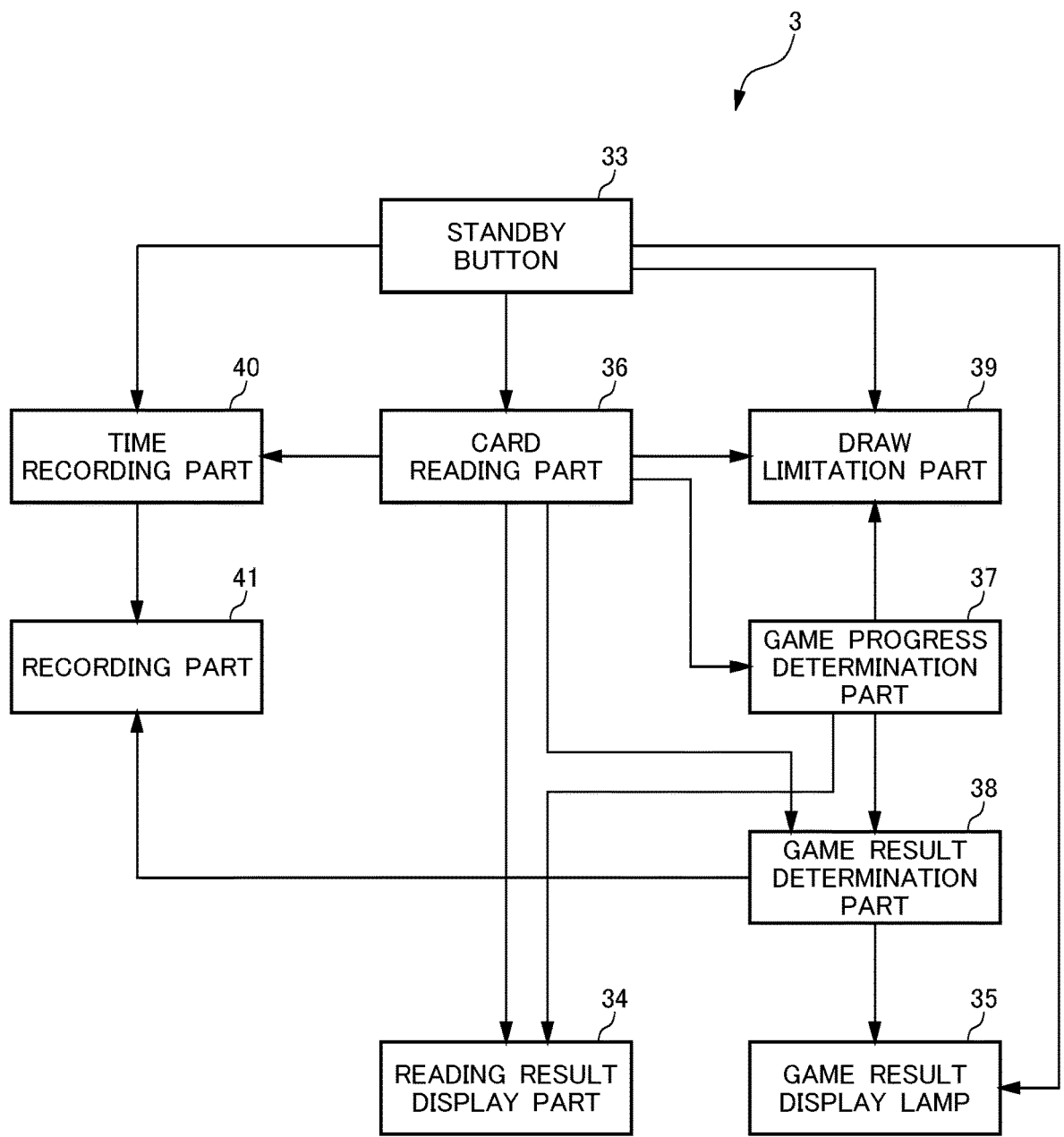
FIG. 4 is a block diagram illustrating the configuration of the card shoe.

FIG. 4 is a block diagram illustrating the configuration of the card shoe. The card shoe 3 includes, in addition to the constituents illustrated in FIG. 3, a card reading part 36, a game progress determination part 37, a game result determination part 38, a draw limitation part 39, a time recording part 40, and a recording part 41.

When the dealer D draws the card from the outlet 32 of the card shoe 3, the card reading part 36 reads rank and suit of the drawn card. The surface of the card displaying the rank and suit (hereinafter referred to as "front face") is subjected to subjected to special treatment to indicate rank and suit, in addition to visually recognizable representation of rank and suit. For example, any invisible sign, or two-dimensional or one-dimensional code, which indicates rank and suit, may be printed on each card, and the card reading part 36 may read the printing to recognize rank and suit of the card.

The card is not necessarily subjected to special treatment. In this case, the card reading part 36 may capture an image of the front face of the card, and recognize numeral indicating rank and symbol indicating suit, which are visibly printed on the front face of the card, by image recognition. Alternatively, the card may include a recording medium for storing information about rank and suit, and the card reading part 36 may read the information in a contactless manner to recognize rank and suit of the drawn card.

Based on the reading result of the card reading part 36, the game progress determination part 37 ascertains the progress of the game. The game progress determination part 37 determines whether the drawn card is banker hand or player hand according to the rules of the baccara. Based on the rules of the baccara and suit and rank of four cards initially drawn from the start of the game, the game progress determination part 37 determines whether or not the player or the banker needs to draw the third card.

Figure 5:
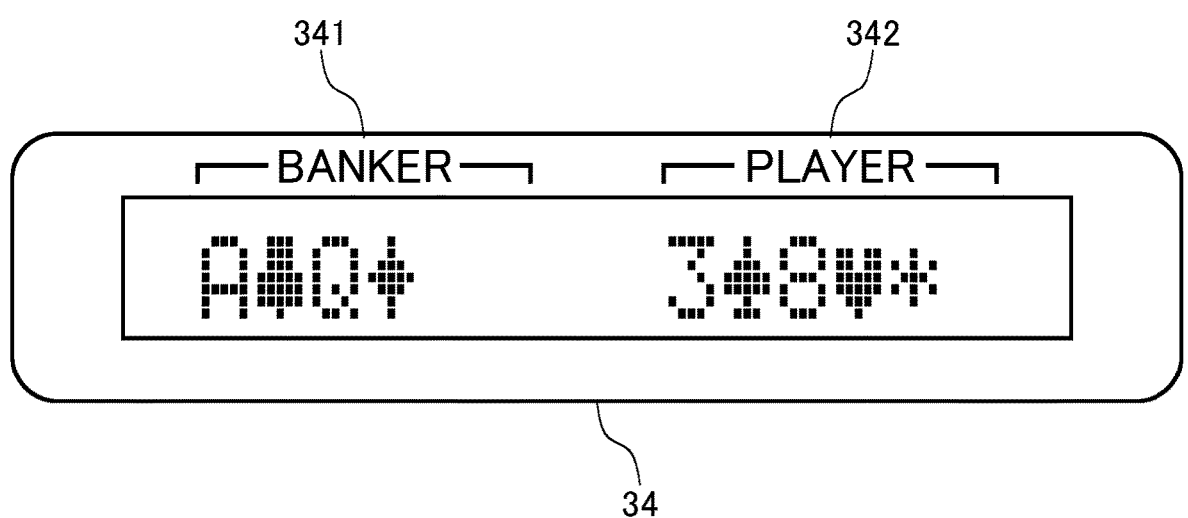
FIG. 5 is an enlarged view illustrating a reading result display part.

FIG. 5 is an enlarged view illustrating the reading result display part. The reading result display part 34 displays read suit and rank in a banker hand 341 and a player hand 342 as simple marks. According to the determination result in the game progress determination part 37 that the drawn card is the player hand or the banker hand, the reading result display part 34 displays the result (suit and rank) read by the card reading part 36.

Returning to FIG. 4, when the game progress determination part 37 determines that all cards has been drawn, the game result determination part 38 determines the game result according to the reading result of the card reading part 36 and the rules of the baccara. Specifically, the game result determination part 38 determines which of PLAYER, BANKER and TIE wins, whether or not PLAYER pair is present, and whether or not BANKER pair is present.

In the baccara, the game result does not depend on the determination of the players P or the dealer D, and can be determined only by ascertaining rank and suit of the card drawn from the card shoe 3. In this manner, the card shoe 3 including the game result determination part 38 also functions as the win-loss determination device. The game result determined by the game result determination part 38, together with date and time, and table number, is recorded in the recording part 41.

When the standby button 33 is pressed, the game result display lamp 35 turns on the lamp according to the determination result from the game result determination part 38. Specifically, the game result display lamp 35 turns on any of the PLAYER lamp, the BANKER lamp, and the TIE lamp according to which of PLAYER, BANKER and TIE wins. When the game result determination part 38 determines that PLAYER pair is present, the P. PAIR lamp is turned on, and when the game result determination part 38 determines that BANKER pair is present, the B. PAIR lamp is turned on.

As described above, when all cards are drawn, the players finish squeeze, and the game result is established at the game table 4, the dealer D presses the standby button 33. Pressing the standby button 33 causes the game result display lamp 35 of the card shoe 3 to be turned on. Accordingly, the dealer D can confirm whether or not the game result indicated by the card placed face up on the game table 4 coincides with the game result indicated by the game result display lamp 35.

When the unfair player P makes unfair practice (for example, replaces the card drawn from the card shoe 3 with the card brought by oneself), the game result indicated by the card placed face up on the game table 4 does not coincide with the game result indicated by the game result display lamp 35, such that the dealer D can detect the unfair practice. When the standby button 33 is pressed, the game result display lamp 35 turns out all lamps.

When it is attempted to draw the card from the outlet 32 in a draw prohibition period, the draw limitation part 39 limits card drawing. Due to its physical mechanism, the draw limitation part 39 makes it difficult to draw the card from the outlet 32, or prevents the card from being drawn. The former case is effective at calling the dealer's attention when the dealer D is about to wrongly draw the card, and the latter case is effective at preventing the players P from unfairly drawing the card.

The draw prohibition period is the period from the time when all cards to be drawn in the game (2 to 3 for each of PLAYER and BANKER) have been drawn to the time when the standby button 33 is pressed. The draw limitation part 39 acquires information about the game progress state from the game progress determination part 37, and information about whether or not the standby button 33 has been pressed, and determines whether or not it is the draw prohibition period based on the information. When any unfair practice or mistake is detected, the draw limitation part 39 limits card drawing according to a control signal from the table management control device 50.

As described above, when all cards are placed face up on the table to establish the game result, the dealer D presses the standby button 33. Thus, the timing when the standby button 33 is pressed means the end of the game and the start of the settlement. The timing when the first card is drawn after pressing of the standby button 33 means the end of bet and the start of the game.

Thus, the time recording part 40 detects pressing of the standby button 33, and records the time as game end (settlement start) time in the recording part 41. The time recording part 40 detects that the card reading part 36 first reads the card after pressing of the standby button 33, and records the time as game start (bet end) time in the recording part 41. That is, the card shoe 3 sets start time of card dealing to the game start time.

FIG. 6 is a view illustrating data recorded in the recording part. FIG. 6 illustrates records for one game, and the recording part 41 records these records for each game. The recording part 41 records, in addition to the game end time and game start time recorded by the time recording part 40, the win-loss result (any of PLAYER, BANKER and TIE) determined by the game result determination part 38, presence/absence of PLAYER PAIR and presence/absence of BANKER PAIR.

The data recorded in the recording part 41 is transmitted to the table management control device 50. Alternatively, the data illustrated in FIG. 6 may be transmitted to the table management control device 50 and recorded in the table management control device 50 without being recorded in the recording part 41.

FIG. 7 is a view illustrating the reader/writer and a member card. The member card 1 is a plastic card and has an RF tag 11 therein. A member ID assigned to each player (member) by member registration, points owned by the player (owned points) and so on are stored in the RF tag 11. The RF tag 11 is provided with an antenna, and the reader/writer 5 can write/read information to/from the RF tag 11 in a contactless manner.

The reader/writer 5 includes a wireless part 51, a seating button 52, a seat leaving button 53, and a position designation button 54. The wireless part 51 writes/reads information to/from the RF tag 11 in the member card 1 according to the RFID mode. The position designation button 54 includes buttons "1", "2", "3", "5", "6", "7" and "8" corresponding to the seven positions of the game table 4 and a button "C" for cancelling designation.

FIG. 8 is a view illustrating information stored in the member card 1. The member card 1 stores the member ID, the owned points, the latest balance, the acquired points during the last three days, the acquired points during the last one month, and the acquired points during the last one year. A total value of the paid amount (+) and the collected amount (−) in the period from previous seating to seat leaving is recorded as the latest balance.

When the player P is seated at the player position of the game table 4, the dealer D keeps the member card 1 of the concerned player P, and causes the reader/writer 5 to read the member card 1. Specifically, the dealer D presses the position designation button 54 at the corresponding player position, presses the seating button 52, and holds the member card 1 over the wireless part 51 to cause the wireless part 51 to read information recorded in the member card 1. Thereby, the reader/writer 5 can identify the player P located at each player position based on the member ID, and function as a player identification means.

The reader/writer 5 outputs (transmits) information read by the wireless part 51, a seating signal responding to pressing of the seating button 52, and information about the player position at which the player corresponding to the member ID is seated, to the table management control device 50. The table management control device 50 records the information received from the reader/writer 5 as well as the time when the seating signal is received as start time. The start time is recorded in the form of time and date. The table management control device 50 transmits information about the start time and the member ID received from the reader/writer 5 to the overall management device 60.

Based on the member ID and information about the player position from the reader/writer 5, the table management control device 50 ascertains what player P having what member ID plays at which player position. That is, the table management control device 50 can associate each player position of the game table 4 with the particular player P at the game table 4. While the player P plays a plurality of games, the table management control device 50 finds bet amount, paid amount, and collected amount for each member ID, and records them.

When the player P leaves the game table 4, the dealer D causes the reader/writer 5 to read the member card 1 kept from the player P. In this case, the dealer D presses the seat leaving button 53, and holds the member card 1 over the wireless part 51, causing the wireless part 51 to read the member ID from the member card 1.

The reader/writer 5 outputs (transmits) the member ID and a seat leaving signal to the table management control device 50. When receiving the member ID and the seat leaving signal from the reader/writer 5, the table management control device 50 records the time when the seat leaving signal is received as end time. The end time is recorded in the form of date and time. The table management control device 50 finds accumulated bet amount and accumulated balance for the member ID from the start time to the end time. Further, the table management control device 50 calculates the acquired points based on the bet amount accumulated from the start time to the end time.

The table management control device 50 adds the calculated acquired points to the owned points read from the member card 1 at seating to update the owned point. Based on the calculated acquired points, all of the acquired points during the last three days, the acquired points during the last one month, and the acquired points during the last one year are updated. The table management control device 50 outputs the updated owned points, acquired points during the last three days, acquired points during the last one month, and acquired points during the last one year, and the accumulated balance from the start time to the end time, to the reader/writer 5. Using the information, the reader/writer 5 rewrites the information in the member card 1. The accumulated balance from the start time to the end time is recorded as the latest balance.

The above-mentioned functions of the table management control device 50 and the reader/writer 5 enables addition of points corresponding to the actual bet amount to the member card 1, such that the players P can store the owned points in the member card 1.

A face recognition system may be used as a player identification means. A camera installed on a ceiling, a camera for recognizing the bet area, or a face recognition camera installed at each table may be used as a camera for the face recognition system. As in the member card, player information recognized by the face recognition system may be associated with the bet amount or the like. In the case where a plurality of players bet on one player position (back bet), it can be recognized which player bets each chip.

The display 15 is a liquid crystal display. The display 15 may be a two-dimensionally disposed lamp. The display 15 is positioned and oriented so as to be visually recognizable to the players P at the player positions and surrounding customers.

The display 15 displays various information. For example, when the game table 4 closes, an indication of closure (for example, letters "CLOSED") is displayed, and when the game table 4 opens, game conditions such as a minimum bet amount (for example, letters "MIN. $100") and a highest bet amount (for example, letters "MAX. $100000") are displayed.

Figure 9:
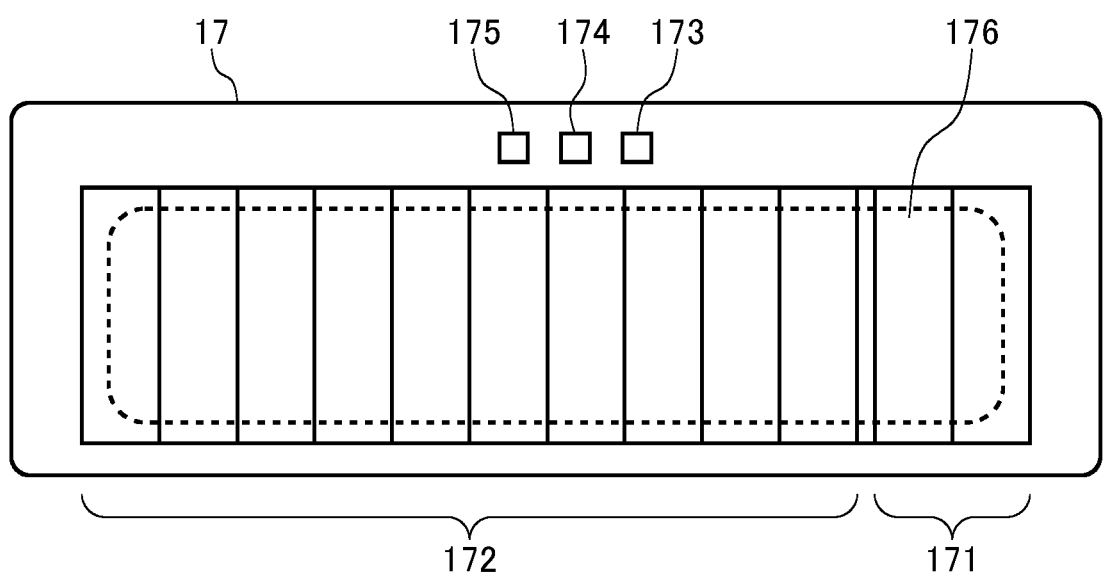
FIG. 9 is a plan view illustrating a dealer chip tray.

FIG. 9 is a plan view illustrating the dealer chip tray. A plurality of vertical grooves are provided side by side in the dealer chip tray 17. The grooves each are formed to be inclined toward the side of the dealer D. Thus, the chips 9 stored in the grooves move to the near side of the dealer D due to self-weight, and are sequentially piled from the near side of the dealer D.

The two right grooves constitute a collection float 171 for temporarily storing the chips 9 collected from the losing players P at the settlement, and the remaining grooves constitute a collection float 172 for storing the chips 9 by value. The dealer D temporarily stores the chips 9 collected from the game table 4 in the collection float 171 and then, pays the chips 9 from the collection float 172 to the winning players P, and finally stores the chips 9 in the collection float 171, in the collection float 172 by value.

Three confirmation lamps including a bet confirmation lamp 173, a collection confirmation lamp 174, and a payment confirmation lamp 175 are provided on the upper side of the dealer chip tray 17. The bet confirmation lamp 173 is turned on according to the confirmation result about whether or not a change in the chips 9 bet from the start of the game to the end of the game (late betting or unbetting) is present. The collection confirmation lamp 174 is turned on according to the collected amount and the confirmation result about whether or not the collected chips 9 are authentic. The payment confirmation lamp 175 is turned on according to the confirmation result about whether or not the paid amount is authentic.

A RFID reader 176 for reading the RFID tag built in the chip 9 is provided in the dealer chip tray 17. The RFID reader 176 can read the RFID tags of the chips 9 stored in all grooves of the collection float 171 and the collection float 172. As described above, since the RFID tag of each chip 9 records the value of the chip 9, the RFID reader 176 can read the RFID tags of all chips 9 in the dealer chip tray 17, ascertaining the total amount of the chips 9 in the dealer chip tray 17.

The RFID reader 176 can independently read the RFID tags of the chips 9 stored in the collection float 171 and the RFID tags of the chips 9 stored in the collection float 172. That is, when reading the RFID tags, the RFID reader 176 can distinguish the RFID tags of the chips 9 stored in the collection float 171 from the RFID tags of the chips 9 stored in the collection float 172. To achieve such individual reading, the RFID reader 176 may be provided with an antenna for reading the RFID tags of the chips 9 stored in the collection float 171, and an antenna for reading the RFID tags of the chips 9 stored in the collection float 172, or may be provided with respective antennas for the grooves.

Figure 10:
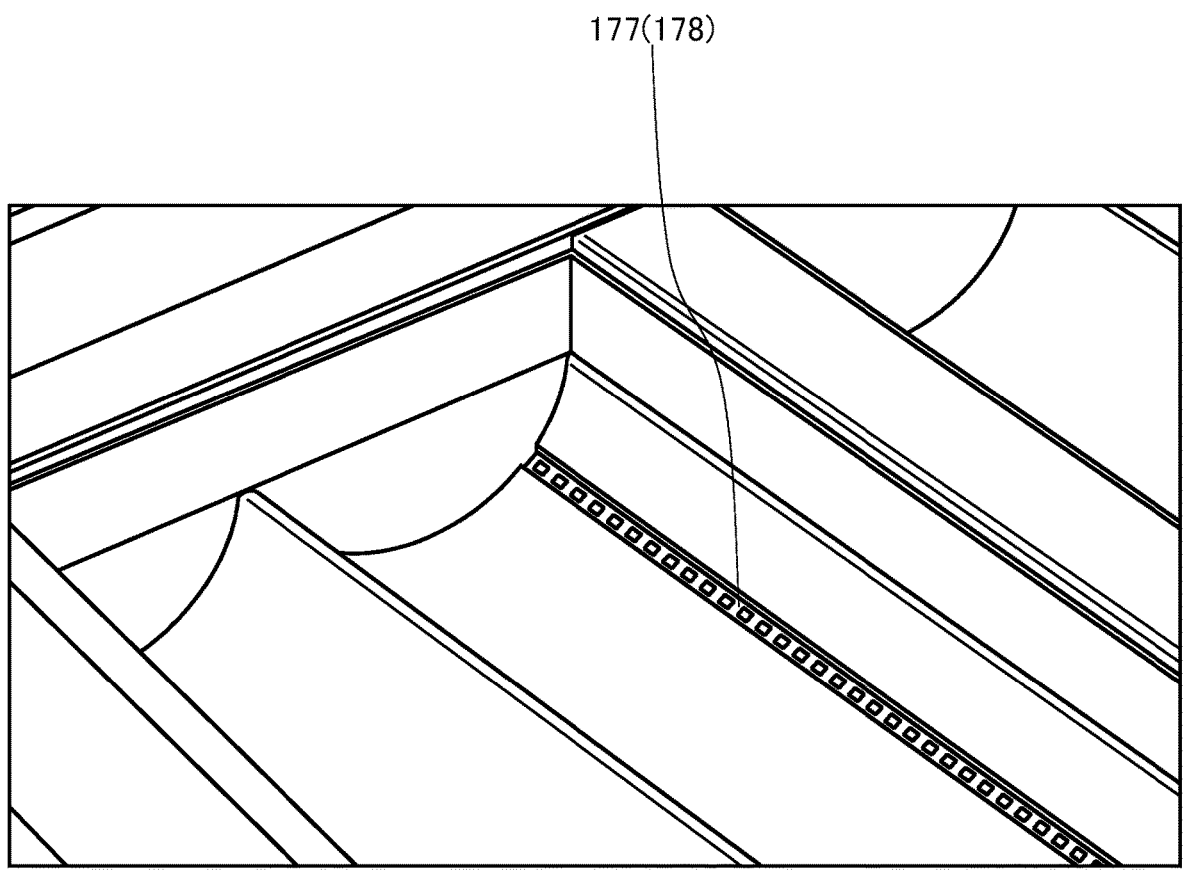
FIG. 10 is an enlarged perspective view illustrating a collection float of the dealer chip tray.

FIG. 10 is an enlarged perspective view illustrating the collection float of the dealer chip tray. In a curved portion of the collection float 171, which conforms to the side face of the stored chips 9, a slit 177 is formed along the length of the collection float 171. The slit 177 is provided with a linear optical sensor (line sensor) 178. The line sensor 178 can ascertain how high the chips 9 are piled in the collection float 171, or how many chips 9 are stored in the collection float 171. The collection float 172 may be also provided with similar slit and optical sensor. By forming a series of slit in the groove, capturing an image of the slit from the back side using a camera (for example, infrared camera), and recognizing the acquired image, the number of chips 9 stored in the groove may be ascertained.

Figure 11:
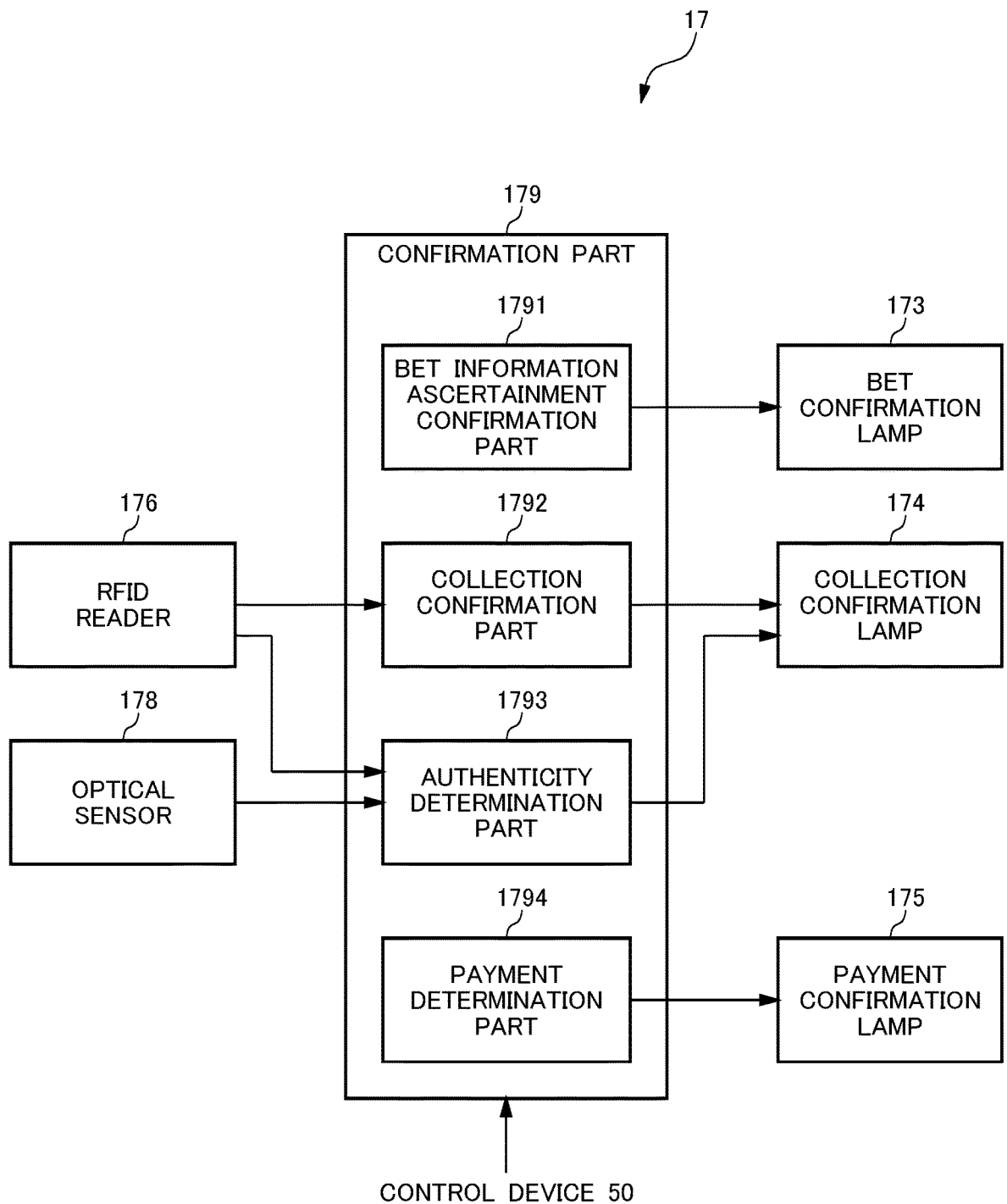
FIG. 11 is a block diagram illustrating the configuration of the dealer chip tray.

FIG. 11 is a block diagram illustrating the configuration of the dealer chip tray. The dealer chip tray 17 includes a confirmation part 179, in addition to the above-mentioned constituents. The confirmation part 179 is configured of a computer, and executes a predetermined program to constitute a bet information ascertainment confirmation part 1791, a collection confirmation part 1792, an authenticity determination part 1793, and a payment confirmation part 1794. Various data and instructions are inputted from the table management control device 50 to the confirmation part 179.

The confirmation part 179 is connected to the bet confirmation lamp 173, the collection confirmation lamp 174, and the payment confirmation lamp 175 to control these lamps. Specifically, the confirmation part 179 controls turning-on, flashing, and turning-off, as well as luminescent colors of the bet confirmation lamp 173, the collection confirmation lamp 174, and the payment confirmation lamp 175. Operations of the confirmation part 179 will be described later.

As described above, the camera 2, the card shoe 3, and the dealer chip tray 17 each input information for detecting any unfair practice or mistake (hereinafter referred to as only "unfair practice") to the table management control device 50. A method of detecting the unfair practice in each game will be described below.

Figure 12:
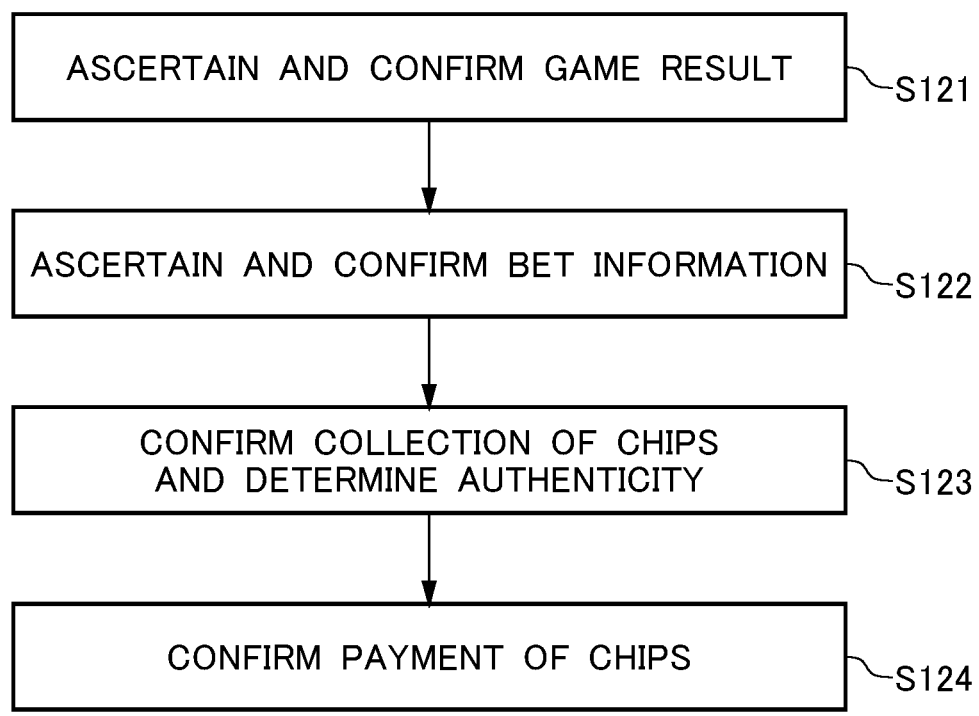
FIG. 12 is a flow chart illustrating the management of a table game.

FIG. 12 is a flow chart illustrating the management of the table game in this embodiment. The unfair practice detection in this embodiment is divided into four stages: ascertainment and confirmation of the game result (Step S121), ascertainment and confirmation of the bet information about the chips 9 (Step S122), collection confirmation and authenticity determination of the chips 9 (Step S123), and payment confirmation of the chips 9 (Step S124).

Among them, ascertainment and confirmation of the bet information about the chips 9 (Step S122), collection confirmation and authenticity determination of the chips 9 (Step S123), and payment confirmation of the chips 9 (Step S124) are performed by the bet information ascertainment confirmation part 1791, the collection confirmation part 1792, the authenticity determination part 1793, and the payment confirmation part 1794 of the confirmation part 179 of the dealer chip tray 17.

A monitor is connected to the table management control device 50, and displays screens for confirming: ascertainment and confirmation of the bet information about the chips 9 (Step S122), collection confirmation and authenticity determination of the chips 9 (Step S123), and payment confirmation of the chips 9 (Step S124). The monitor is connected to the table management control device 50, installed at a backyard, and visually observed by a guard. The monitor may be installed at the game table 4 in addition to or in place of the backyard.

Figure 13:
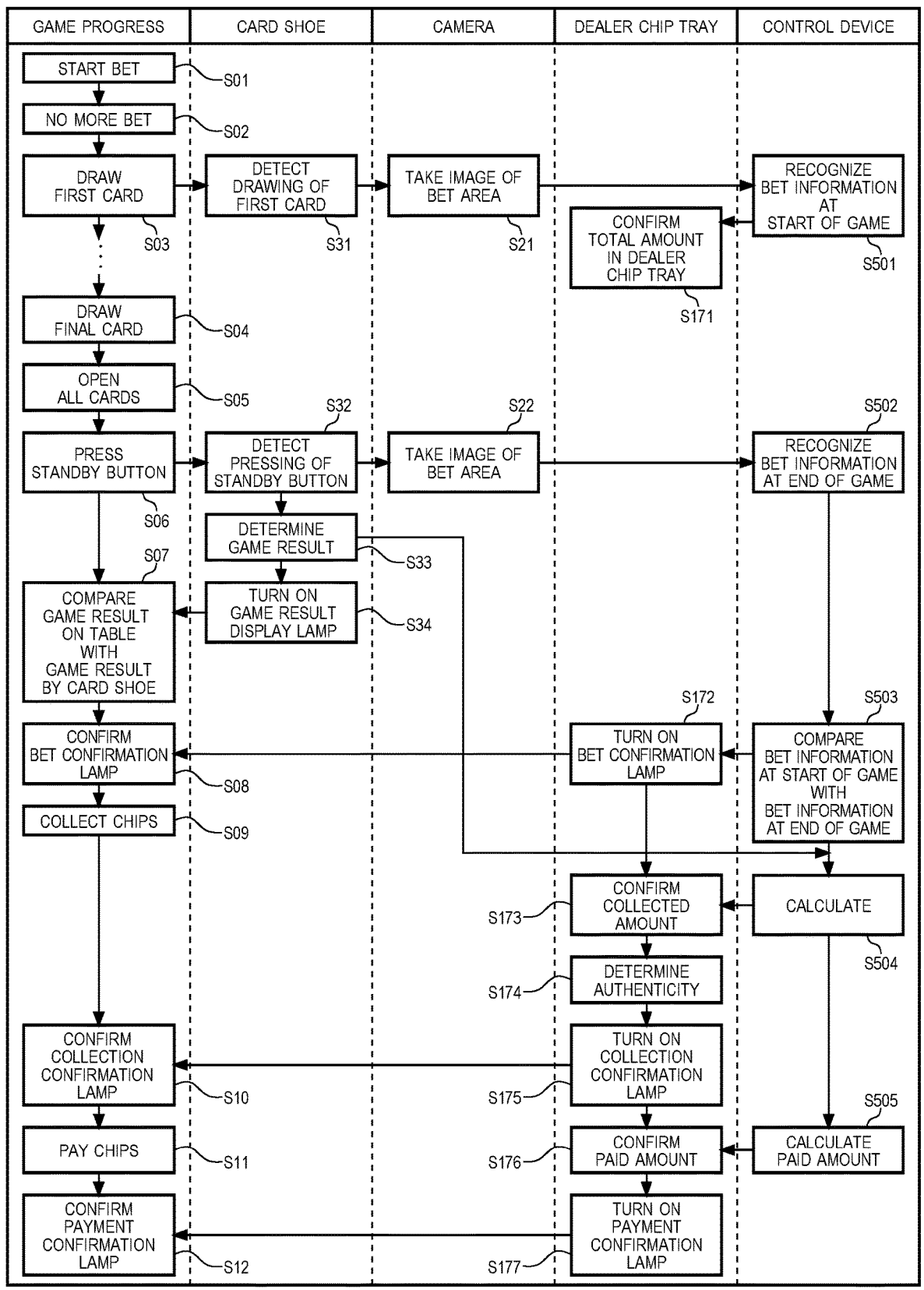
FIG. 13 is a flow chart illustrating roles of each constituent in four stages of unfair practice detection.

FIG. 13 is a flow chart illustrating roles of the constituents in the four-stages of unfair practice detection. The leftmost row illustrates the flow of the game progress and dealer's operations at the game table 4. In the flow illustrated in FIG. 13, mutual coordination among the card shoe 3, the camera 2, the dealer chip tray 17, and the table management control device 50 are made under control of the table management control device 50.

First, the dealer D instructs the players P to start bet (Step S01). The players P each place the chip 9 on the bet area for betting. When all of the players P finish bet, the dealer D gives a signal of "no more bet" (Step S02) and from then on, the players P are not allowed to change the bet target and the bet amount.

When bet is finished, the dealer D draws the first card from the card shoe 3 (Step S03). When the card shoe 3 detects that the first card is drawn since the standby button 33 was pressed in the previous game (Step S31), the time recording part 40 records the time in the recording part 41, and notifies it to the table management control device 50.

The table management control device 50 controls the camera 2 to capture an image of the bet area (Step S21). The camera 2 transmits the captured image to the table management control device 50, and the table management control device 50 recognizes the image to recognize the bet information at start of the game (Step S501). The table management control device 50 controls the dealer chip tray 17 such that the RFID reader 176 reads all chips 9 in the dealer chip tray 17 to ascertain the total amount of all chips 9 in the dealer chip tray 17 (Step S171).

The camera 2 may capture images of the bet area at predetermined time intervals and transmit the images to the table management control device 50. In this case, after receiving the notification that drawing of the first card was detected from the card shoe 3, the table management control device 50 may recognize the first image acquired from the camera 2 to recognize bet information at start of the game. Here, the bet information indicates information about the player, the bet targets (PLAYER, BANKER, TIE, PLAYER PAIR, BANKER PAIR), and the number of the chips 9, and the value of the chips 9. The table management control device 50 stores the bet information at start of the game.

When the dealer D sequentially draws the cards and draws the final card (Step S04), and the players P perform squeeze and open all cards (Step S05), the game result is established at the game table 4. As described above, while the dealer D sequentially draws the cards, the card shoe 3 reads rank and suit of the drawn card.

When all cards are opened, the dealer D presses the standby button 33 of the card shoe 3 (Step S06). When detecting that the standby button 33 is pressed (Step S32), the card shoe 3 determines the game result based on the read rank and suit of the cards and the rules of the baccara (Step S33), and turns on the game result display lamp 35 according to the game result (Step S34).

The dealer D compares the game result determined based on the cards opened on the game table 4 with the game result indicated by the game result display lamp 35 of the card shoe 3 (Step S07). This confirmation corresponds to ascertainment and confirmation of the game result in the flow illustrated in FIG. 12 (Step S121).

When detecting that the standby button 33 is pressed (Step S32), the card shoe 3 notifies it to the table management control device 50. The table management control device 50 controls the camera 2 to capture an image of the bet area 44 (Step S22). The camera 2 transmits the captured image to the table management control device 50, and the table management control device 50 recognizes the image to recognize bet information at the end of the game (Step S502).

Since the players P are not allowed to change bet contents (bet targets, bet amount) from the start of the game (bet end) to the end of the game, if any unfair practice is absent, the bet information recognized by the control device 50 at the start of the game (Step S501) should coincide with the bet information recognized by the control device 50 at the end of the game (Step S502). Thus, the table management control device 50 compares the bet information with each other (Step S503).

The table management control device 50 notifies coincidence or noncoincidence as a comparison result to the dealer chip tray 17. The case where the comparison result exhibits noncoincidence includes the case where the total number or total amount of the chips 9 becomes larger at the end of the game than at start of the game (late betting tried by the winning player P), and the case where the total number or total amount of the chips 9 becomes smaller at the end of the game than at start of the game (unbetting tried by the losing player P).

According to the comparison result from the table management control device 50, the bet information ascertainment confirmation part 1791 of the dealer chip tray 17 turns on the bet confirmation lamp 173 (Step S172). Here, the bet information ascertainment confirmation part 1791 turns on the bet confirmation lamp 173 in green if the comparison result exhibits noncoincidence, and flashes the bet confirmation lamp 173 in yellow if the comparison result exhibits coincidence.

The dealer D confirms that the bet confirmation lamp 173 is turned on in green (Step S08), and collects the chips 9 from the losing players P and stores the collected chips 9 in the collection float 171 (Step S09). Based on the game result determined by the card shoe 3 and the recognized bet information, the table management control device 50 calculates the amount of the chips 9 to be collected (collected amount) (Step S504). The collected amount is calculated from the value and number of the chips 9 to be collected. The table management control device 50 notifies the calculated collected amount to the dealer chip tray 17.

When the dealer D puts the collected chips 9 into the collection float 171 of the dealer chip tray 17, the collection confirmation part 1792 of the dealer chip tray 17 acquires reading information from the RFID reader 176 to ascertain the collected amount of the chips 9 stored in the collection float 171, and compares the collected amount with the calculated collected amount notified from the table management control device 50, thereby confirming whether or not the collected amount (the number of chips by value) is correct (Step S173). The RFID reader 176 reads the chips 9 to acquire information about the number of chips by value as the reading information, and the table management control device 50 also calculates the collected amount as the number of chips by value. Thus, it is determined whether or not the numbers of chips by value coincide with each other by comparison.

Also, at this time, the authenticity determination part 1793 determines whether or not the number of chips 9 recognized by the RFID reader 176 coincides with the number of chips 9 detected by the optical sensor 178, thereby making authenticity determination about the collected chips 9 (Step S174). If an unfair chip 9 including no RFID tag is collected from the player P, the optical sensor 178 detects the unfair chip 9, but the RFID reader 176 does not detect the unfair chip 9. As a result, noncoincidence occurs, enabling detection of the unfair chip 9.

According to the results of the confirmation of the collected amount and the authenticity determination, the collection confirmation part 1792 and the authenticity determination part 1793 turn on the collection confirmation lamp 174 (Step S175). Specifically, the dealer chip tray 17 turns on the collection confirmation lamp 174 in green, when the collected amount detected by the RFID reader 176 coincides with the calculated collected amount acquired from the table management control device 50 and the collected chips 9 are authentic. On the contrary, the dealer chip tray 17 flashes the collection confirmation lamp 174 in yellow when the collected amount detected by the RFID reader 176 does not coincide with the calculated collected amount acquired from the table management control device 50, or the unfair chip 9 is present.

The dealer D confirms that the collection confirmation lamp 174 is turned on in green (Step S10), and pays the chips 9 to the winning players (Step S12). The table management control device 50 calculates the paid amount of the chips 9 based on the game result determined by the card shoe 3 and the recognized bet information (Step S505). The table management control device 50 notifies the calculated paid amount to the dealer chip tray 17. The paid amount is also calculated as information about the number of chips by value.

When the dealer D pays the chips 9 onto the game table 4 from the dealer chip tray 17, the dealer chip tray 17 finds the paid amount of the chips 9 stored in the dealer chip tray 17 by using the RFID reader 176, and compares the payed amount with the calculated paid amount notified from the table management control device 50, thereby confirming whether or not the paid amount is correct (Step S176). Using the RFID reader 176, the paid amount is acquired as information about the number of chips by value.

Here, the confirmation of the paid amount in the dealer chip tray 17 is described. At the start of the game, the dealer chip tray 17 confirms the total amount in the dealer chip tray 17 (Step S171). Then, the dealer chip tray 17 receives the calculated collected amount and the paid amount from the table management control device 50 (Steps S504, S505). An increase/decrease amount is calculated from the collected amount and the paid amount. By adding the calculated increase/decrease amount to the total amount of the chips 9 in the dealer chip tray 17 at the start of the game, which is confirmed in Step S171, the total amount of the chips 9 to be stored in the dealer chip tray 17 after the settlement is calculated. Also, in this case, the total amount of the chips 9 is acquired as information about the number of chips by value.

If the calculated total amount coincides with the total amount of the chips 9 read by the RFID reader 176 after the payment, it is determined that the collection and the payment have been correctly performed. It is determined that the collection has been correctly performed in Step S173, which means that the payment has been correctly performed. Thus, the payment confirmation part 1794 of the dealer chip tray 17 compares the calculated total amount of the chips 9 (the number of chips by value) to be stored in the dealer chip tray 17 after the settlement (acquired from the table management control device 50) with the total amount of the chips 9 (the number of chips by value) read by the RFID reader 176, to determine whether or not the paid amount is correct (Step S176).

In place of this, payment may be confirmed according to a following manner. That is, after it is determined that the collection has been correctly performed, the RFID reader 176 of the dealer chip tray 17 reads the RFID tags of all chips 9 in the dealer chip tray 17 to ascertain the actual total amount (the number of chips by value) after the collection into the dealer chip tray 17 and before the payment. After the payment, the RFID reader 176 reads the RFID tags of all chips 9 in the dealer chip tray 17 again to ascertain the actual total amount (the number of chips by value) in the dealer chip tray 17 after the payment, thereby finding the amount actually paid from the dealer chip tray 17. The actual paid amount may be compared with the paid amount calculated by the table management control device 50 to confirm that the payment has been correctly performed.

According to the confirmation result of the paid amount, the dealer chip tray 17 turns on the payment confirmation lamp 175 (Step S177). Specifically, if the actual paid amount coincides with the calculated paid amount, the dealer chip tray 17 turns on the payment confirmation lamp 175 in green, and if the actual paid amount does not coincide with the calculated paid amount, the dealer chip tray 17 flashes the payment confirmation lamp 175 in yellow. The dealer confirms that the payment confirmation lamp 175 is turned on in green (Step S12), and finishes the game.

In this embodiment, the confirmation part 179 is provided in the dealer chip tray 17. However, some or all functions of the confirmation part 179 may be provided in the table management control device 50. In this case, after the table management control device 50 causes the confirmation part 179 to execute the above-mentioned processing, the table management control device 50 issues an instruction of turning-on, flashing, or turning-off to each of the bet confirmation lamp 173, the collection confirmation lamp 174, and the payment confirmation lamp 175 of the dealer chip tray 17.

Figure 14:
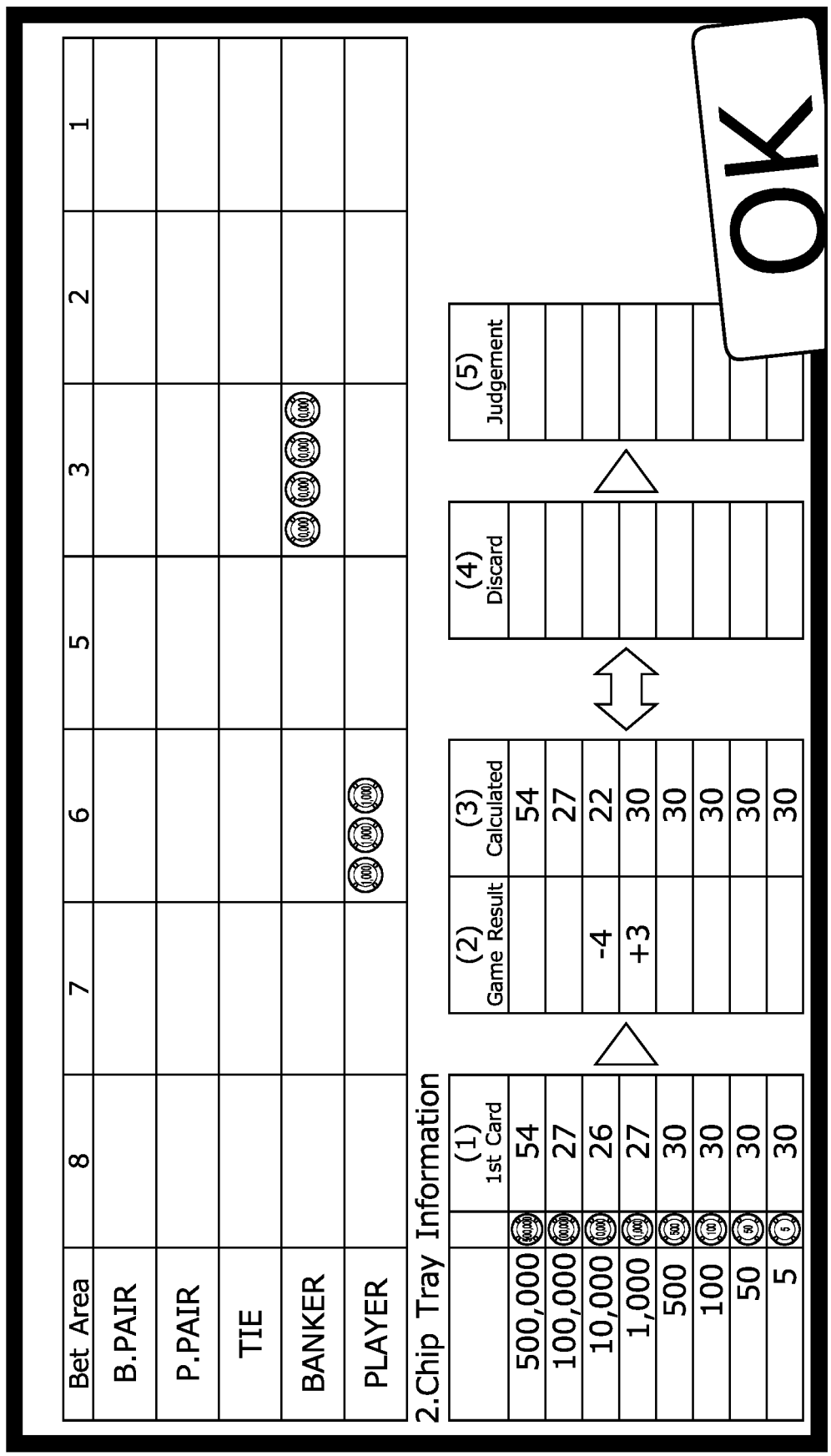
FIG. 14 is a view illustrating an example of a monitor screen displaying a comparison result between bet information at start of the game and bet information at the end of the game.

FIG. 14 illustrates an example of a monitor screen representing a comparison result between the bet information at the start of the game and the bet information at the end of the game. In an upper side of the screen, the bet information is displayed in the form of table, and in a lower side thereof, information about the dealer chip tray 17 is displayed. The bet information indicates how many chips 9 of what value are bet on which bet target at each player position. In the example illustrated in FIG. 14, at the No. 3 player position, four 10000-dollar chips are bet on BANKER, and at the No. 6 player position, three 1000-dollar chips are bet on PLAYER. Such situation may be ascertained by recognizing the image from the camera 2 in the measurement device 21 as described above.

In the lower side, "(1) 1st Card" indicates the number of the chips 9 stored in the dealer chip tray 17 at the start of the game (at drawing of the first card) by value. "(2) Game Result" indicates the balance corresponding to the game result of the number of the chips 9 by value. In this example, after the settlement of the game, 10000-dollar chip decreases by four- and 1000-dollar chip increases by three from the dealer chip tray 17.

"(3) Calculated" indicates the number of chips 9 stored in the dealer chip tray 17 by value, as a result of the calculation of the (2) balance with respect to (1), that is, after the settlement. "(4) Discard" indicates the number of chips 9 actually stored in the dealer chip tray 17, which is read by the RFID reader 176, using discard of the card into a discard box as a trigger. "(5) Judgement" indicates a comparison result between (3) and (4). That is, (5) Judgement indicates the comparison result between the number of chips 9 calculated in (3) and the number of actual chips 9 read by the RFID reader 176 in (4).

Figure 15:
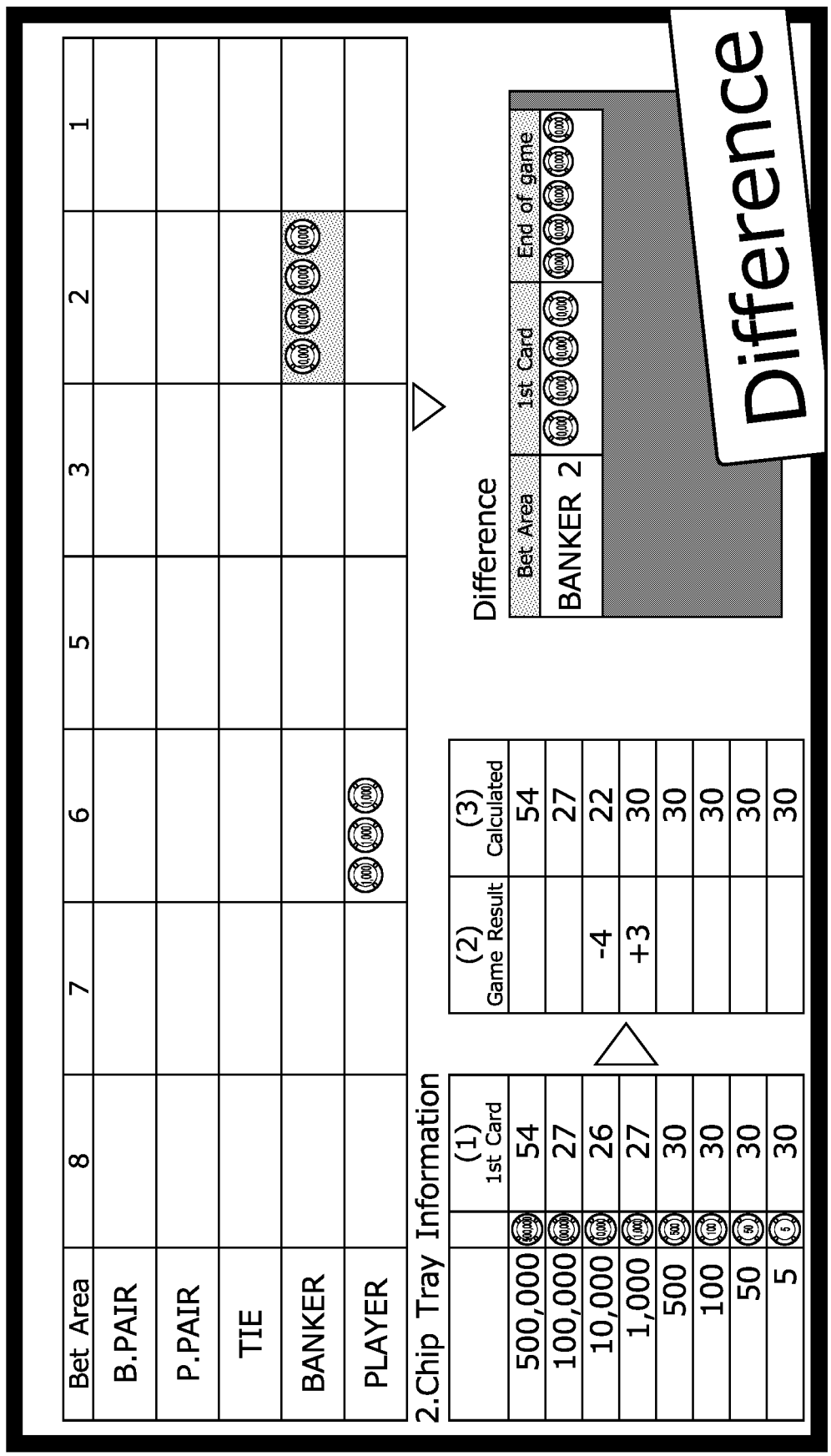
FIG. 15 is a view illustrating an example of a monitor screen in the case of late betting.

FIG. 15 illustrates an example of a monitor screen in the case of late betting. In the example illustrated in FIG. 15, the number of 1000-dollar chips bet on BANKER at the No. 2 player position was four at the start of the game, and increases to five at the end of the game. This difference is displayed as "Difference" at the bottom right of the monitor screen. In the bet information table displayed in the upper side, the square at which late betting is detected (in the example illustrated in FIG. 15, BANKER at the No. 2 player position) is highlighted.

Figure 16:
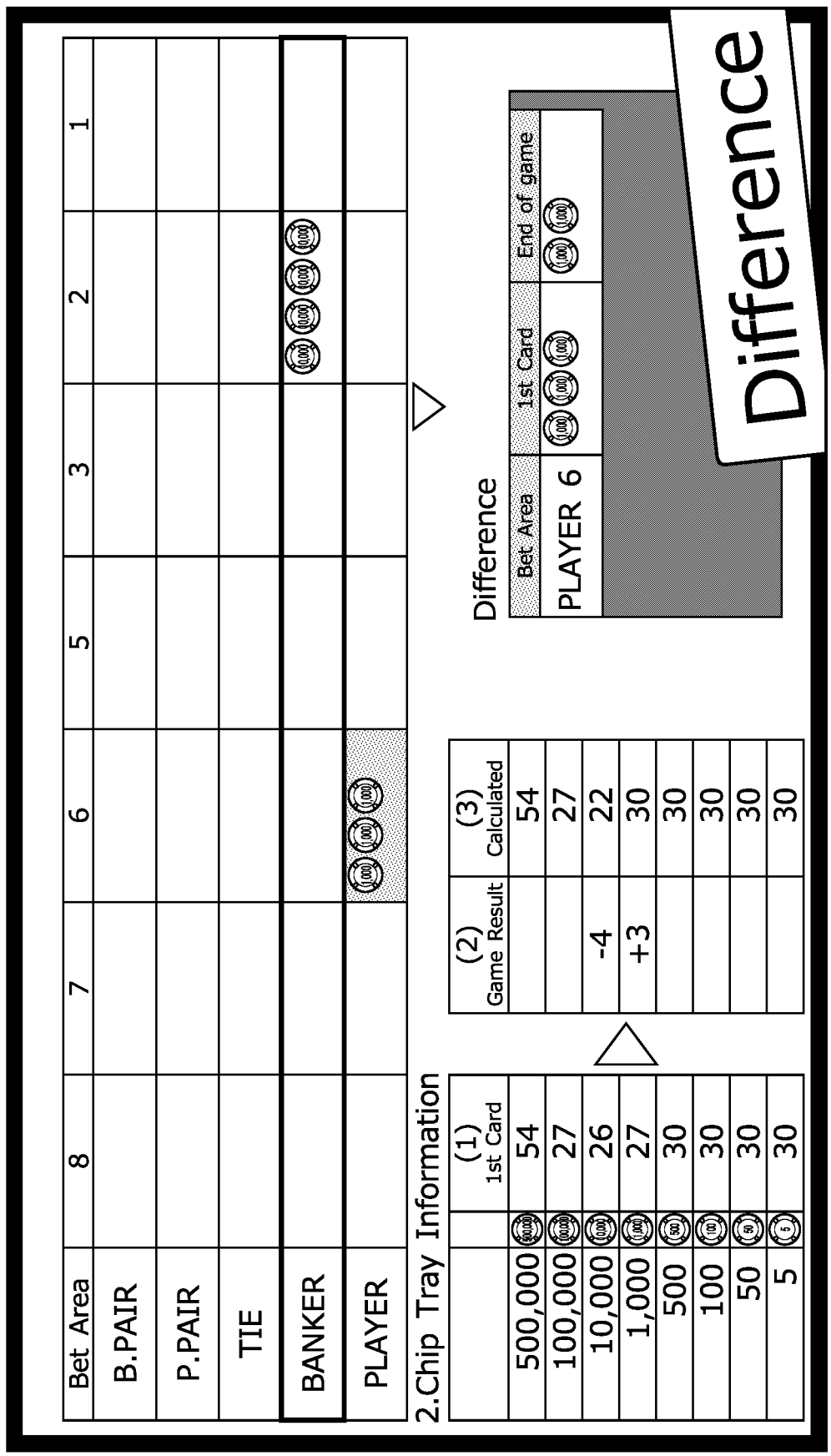
FIG. 16 is a view illustrating an example of a monitor screen in the case of unbetting.

FIG. 16 illustrates an example of a monitor screen in the case of unbetting. In the example illustrated in FIG. 16, the number of 1000-dollar chips bet on PLAYER at the No. 6 player position was three at the start of the game, and decreases to two at the end of the game. This difference is displayed as "Difference" at the bottom right of the monitor screen. In the bet information table displayed in the upper side, the square at which unbetting is detected (in the example illustrated in FIG. 16, PLAYER at the No. 6 player position) is highlighted.

The monitor screens as illustrated in FIG. 14, FIG. 15, and FIG. 16 are not necessarily generated, or may be only generated and saved without being displayed. The monitor screens as described above may be displayed according to particular instructions of the guard. Alternatively, the monitor screen may be generated at the detection of abnormality such as the above-mentioned late betting or unbetting, and displayed and/or saved.

As described above, in the game table system in this embodiment, various sensing technologies and image recognition technologies are used to detect unfair practices at each stage of the game. In the management system including the game table system and a plurality of game table systems in this embodiment, results of such sensing and image recognition are used to detect unfair practices in each game, and also used as casino management information. The casino management information includes higher level of detection of unfair practices that cannot be detected in individual games. For this reason, the table management control device 50 in each game table system is connected to the overall management device 60, and transmits various information to the overall management device 60.

Figure 17:
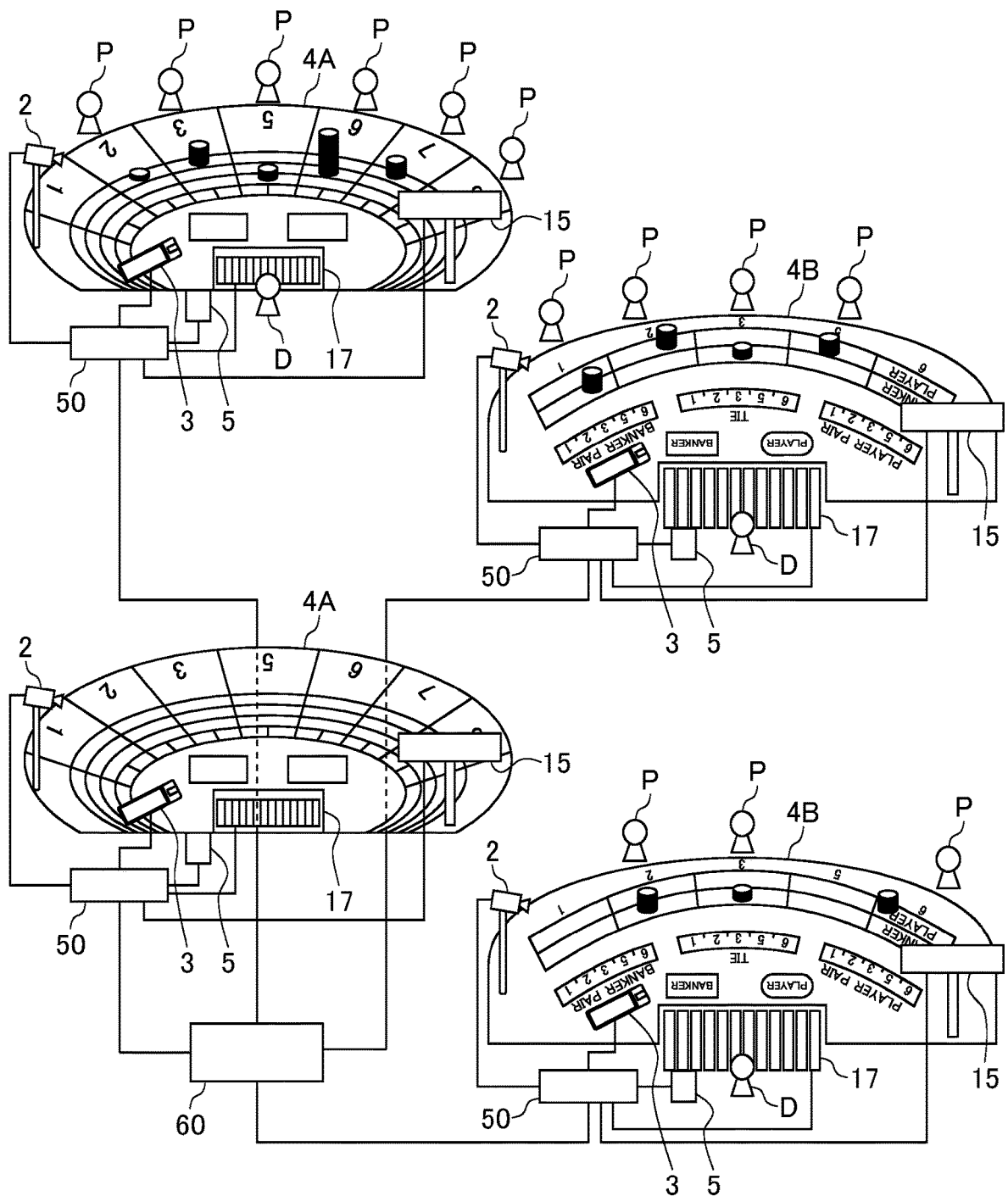
FIG. 17 is a view illustrating an example of the configuration of a casino play hall.

FIG. 17 is a view illustrating an example of the configuration of the casino play hall. The plurality of game tables 4 are installed in the casino play hall. In the example illustrated in FIG. 17, four game tables 4 are provided. The game tables 4 in FIG. 17 are tables for the baccara. The case of playing the baccara at the game tables will be described below.

The four game tables have two types of table face layouts (hereinafter referred to as merely "layout"). In the game table 4A of the first type of layout (Type-a), seven player positions (player positions 1, 2, 3, 5, 6, 7, and 8) for seven persons are prepared and in the game table 4B of the second type of layout (Type-b), five player positions (player positions 1, 2, 3, 5, and 6) for five persons are prepared.

On the game table 4A of the first type, bet areas for PLAYER (player), BANKER (banker), TIE (tie), PLAYER PAIR (player pair), and BANKER PAIR (banker pair) are provided as bet targets at positions corresponding to the player positions. On game table 4B of the second type, bet areas for only PLAYER (player) and BANKER (banker) are provided at positions corresponding to the player positions, and bet areas for TIE (tie), PLAYER PAIR (player pair), BANKER PAIR (banker pair) are collectively disposed.

FIG. 18 is a view illustrating the configuration of a game record generated for each game. The game record is generated in the table management control device 50, and is transmitted to the overall management device 60 at an appropriate timing. The game record includes information about "date and time", "table ID", "layout", "minimum bet amount", "dealer ID", "bet period", "gaming period", "chip collection period", "chip payment period", "game result", "dealer chip amount at start", "dealer chip amount after settlement", and "verification result".

The "date and time" refers to the date and time at the start of the game. In addition to or in place of the date and time at start of the game, the date and time at the end of the game may be recorded as the "date and time". The "table ID" is an ID that is unique to each table. The table can be identified according to the table ID. The "layout" refers to the type of the layout on the table face. In the example in FIG. 17, two types of layouts (Type-a and Type-b) are illustrated, and the "layout" indicates either of the type.

The "minimum bet amount" is the lowest bet amount (minimum bet amount) set in the game. The players participating in the game must bet the chip with the amount that is equal to or larger than the minimum bet amount. The minimum bet amount may be appropriately changed at any timing between games. In addition to the minimum bet amount, the highest bet amount (maximum bet amount) in one game on the game table 4 may be set and recorded.

The "dealer ID" is an ID that identifies the dealer D in charge of the dealing on the concerned game table 4. Each dealer D has a dealer card including an IC tag that records the dealer ID therein. When the dealer D is seated at the game table 4, the IC tag of the dealer card may be read by the reader/writer 5, and the dealer ID read by the reader/writer 5 may be outputted to the table management control device 50. Alternatively, the table management control device 50 may have an input device, and the dealer D seated at the game table 4 may input the own dealer ID by using the input device.

The "bet period" refers to a period from the start of bet to the end of bet. When the dealer chip tray 17 determines that the payment in the previous game has been normally finished, the table management control device 50 recognizes the start of bet. When the card shoe 3 detects the drawing of the first card, the table management control device 50 recognizes the end of bet. Since the card shoe 3 records the time when the first card is drawn, and notifies the time to the table management control device 50, the table management control device 50 ascertains the bet end time based on the notification.

The game table 4 may be provided with a discard box for discarding used cards, and the discard box may be provided with a sensor. In this case, when the sensor detects discarding of the card, the table management control device 50 may recognize the start of bet (in the next game). The card shoe 3 may be provided with an operating means for instructing the start of bet, and the dealer may operate the operating means immediately before the start of bet. In this case, when the operation of the operating means is detected, the table management control device 50 may recognize the start of bet. Further, the table management control device 50 may recognize an image from the camera 2, thereby detecting the bet chip 9 to recognize the start of bet.

The "gaming period" refers to a period from the time when the dealer D draws the first card from the card shoe 3 to the time when the dealer D presses the standby button 33. That is, after the final card is drawn from the card shoe 3, the players P performs squeeze to open all cards, establishing the game result on the game table 4, and accordingly, the dealer D presses the standby button 33. The period is included in the gaming period.

The "chip collection period" refers to a period from the end of the game to the end of the collection of the chips 9 from the losing player P. As described above, the time when the dealer D presses the standby button 33 immediately after the establishment of the game result is defined as the game end time. The table management control device 50 sets the time when the confirmation of the collection is notified from the dealer chip tray 17 to the collection end time.

The "chip payment period" refers to a period from the end of the collection of the chips 9 from the losing players P to the payment of the chips 9 to the winning players P. The table management control device 50 sets the time when the dealer chip tray 17 notifies the confirmation of the payment to the payment end time. Alternatively, the table management control device 50 may analyze an image from the camera 2 to ascertain the chip collection period and the chip payment period. Alternatively, the time when discarding of the card into the discard box may be defined as the "chip payment period".

The "game result" refers to PLAYER, BANKER, or TIE, and presence/absence of PLAYER PAIR and BANKER PAIR. As described above, the game result is ascertained by reading the rank and suit of the card drawn from the card shoe 3, and the table management control device 50 receives information about the game result from the card shoe 3.

The "dealer chip amount at start" refers to the total amount of the chips 9 stored in the dealer chip tray 17 at the start of the game, is ascertained in the dealer chip tray 17 in Step S171 in FIG. 13, and is notified to the table management control device 50. The "dealer chip amount after settlement" refers to the total amount of the chips 9 stored in the dealer chip tray 17 after the settlement of the game, which is ascertained in Step S176 in FIG. 13, and is notified to the table management control device 50.

The "verification result" refers to a verification result indicating whether or not the theoretical dealer chip amount after settlement coincides with the actual dealer chip amount after settlement, which is expressed by OK or NG. The table management control device 50 calculates the actual total amount of the chips 9 in the dealer chip tray 17 after the settlement, which is read in the dealer chip tray 17 (the above-mentioned "dealer chip amount after settlement"), and the theoretical total amount in the dealer chip tray 17 after the settlement (theoretical dealer chip amount after settlement). The theoretical total amount is acquired by calculating the theoretical balance based on the game result ascertained by reading the cards by the card shoe 3, and adding the balance to the total amount of the chips 9 in the dealer chip tray 17 at the actual start, which is read in the dealer chip tray 17 (the above-mentioned "dealer chip amount at start"). The table management control device compares them (corresponding to Step S176 in FIG. 13).

The table management control device 50 compares the theoretical dealer chip amount after settlement with the actual dealer chip amount after settlement in each game. The verification result is "OK" if they coincide with each other, and is "NG" if they do not coincide with each other.

The game record further includes "member ID", "bet amount", "bet target", "payment (−)/collection (+)", "sales", and "net profit" for each "player position". As illustrated in FIG. 1, numbers are assigned as the "player positions" to respective player positions of the table. The players P are previously registered as members. The players P registered as members each have the member ID and the member card 1 that stores the member ID. The member card 1 records the member ID and the acquired points therein.

The "bet amount" is the bet amount for each player position, and is represented as the number of chips 9 by value for each player position. Additionally or alternatively, as information about the "bet amount" may be represented for each stack of the chips 9 at the time when the camera 2 and the measurement device 21 recognize the image. In this case, the "bet amount" includes information about the number of stacks, and the value and the number of the chips 9 for each stack and each player position.

The "payment (−)/collection (+)" refers to the amount of payment or collection for each player position. The table management control device 50 records the amount payed from the dealer D with the − sign apart from the bet amount for the winning players P, and records the bet amount with the + sign for the losing players P, as the "payment (−)/collection (+)".

The "sales" refers to the total bet amount acquired by summing the bet amounts of all players P. The table management control device 50 sums the bet amounts of all players P to calculate the "sales", and records the sales. The "net profit" refers to the amount acquired by summing the paid amount (−) and the collected amount (+) of all players in the concerned game, which is the profit of the game organizer (house) in the concerned game. The table management control device 50 sums the paid amount and the collected amount of all players P to calculate the "net profit", and records the net profit. The sales (the total bet amount) is recorded as the number of chips 9 by value.

As described above, the table management control device 50 outputs the net profit (Y) that is the winning or losing amount for the game organizer, and the total bet amount (sales) (B) that is the total amount of the chips 9 placed by the players P, for each game table 4. In particular, the camera 2 and the measurement device 21 detect the total bet amount (B) at each player position of the game table 4, and the table management control device 50 outputs the total bet amount (B) for each player P and each player position as the game record.

The table management control device 50 generates the above-mentioned game record in each game. The table management control device 50 at each game table 4 is connected to the overall management device 60, and the game record generated in the table management control device 50 is transmitted from the table management control device 50 to the overall management device 60. The table management control device 50 is communicably connected to the overall management device 60 in a wired or wireless manner. The overall management device 60 collects the game records from the plurality of table management control device 50, and executes following processing.

Figure 19:
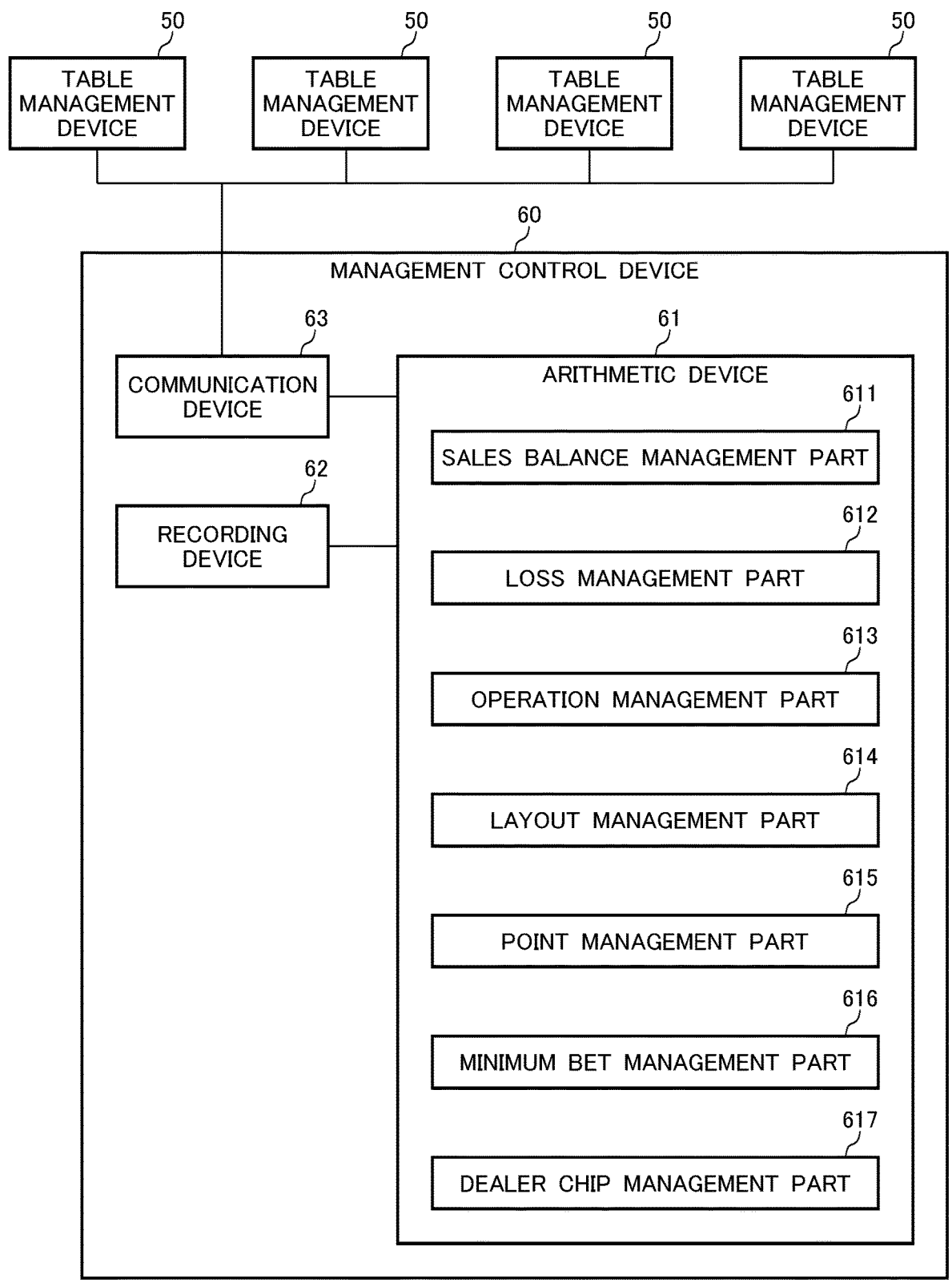
FIG. 19 is a block diagram illustrating the configuration of an overall management device.

FIG. 19 is a block diagram illustrating the configuration of the overall management device. The overall management device 60 includes an arithmetic device 61, a recording device 62, and a communication device 63. The arithmetic device 61 includes a sales balance management part 611, a loss management part 612, an operation management part 613, a layout management part 614, a point management part 615, a minimum bet management part 616, and a dealer chip management part 617.

The overall management device 60 is a computer including a processor and a memory, and the arithmetic device 61 operates according to a management control program in this embodiment to constitute the sales balance management part 611, the loss management part 612, the operation management part 613, the layout management part 614, the point management part 615, the minimum bet management part 616, and the dealer chip management part 617. The overall management device 60 further includes a recording device such as a hard disc. The overall management device 60 has a communication function for communicating with the table management control device 50.

FIG. 21 is an exemplified sales table generated by the sales balance management part 611 of the overall management device 60. That is, FIG. 20 is a table indicating the amount of the chips 9 stored in the dealer chip tray 17 for each game table 4, that is, the situation of the stock of the chips 9 owned by the casino. The sales balance management part 611 calculates sales for each game table 4 every predetermined period (for example, every hour, every 24 hours). The sales described herein refers to the amount bet by the players (bet amount).

The sales balance management part 611 manages the sales of the house in a predetermined period in terms of the value and number of the chips 9 bet at each game table 4, and the total sales amount at each game table 4. The sales balance management part 611 also manages the sales in the house in the predetermined period in terms of the number of chips 9 by value of the chips 9. Further, the sales balance management part 611 manages the sales in the house in the predetermined period in terms of the total sales amount at all of the game tables 4. The sales table indicates the numeric values managed by the sales balance management part 611.

FIG. 21 is an exemplified gross profit table generated by the sales balance management part 611 of the overall management device 60. The sales balance management part 611 manages the gross profit (income) for each game table 4 every predetermined period (for example, every hour, every 24 hours). The gross profit described herein is the amount found by subtracting the payed amount of the chips 9 at the settlement from the collected amount of the chips 9 at the settlement, which is an income of the house. The ratio of the gross profit to the sales (sales profit ratio) becomes the gross profit ratio.

The sales balance management part 611 manages the income (gross profit) of the house in a predetermined period at each game table 4. The sales balance management part 611 also manages the total gross profit at all of the game table 4 in the predetermined period. Further, the sales balance management part 611 manages the gross profit ratio for each game table 4 and the total gross profit ratio at all game tables 4 in the predetermined period. The gross profit table indicates the numeric values managed by the sales balance management part 611, along with the sales at each game table 4 and the total sales at all game tables 4.

As described above, the overall management device 60 manages the sales and the gross profit ratio. The income of the house is acquired by subtracting a loss caused by unfair practices or mistakes from a product of the sales and the gross profit ratio. That is, a following equation (1) holds:

$$\text{income} = \text{sales} \times \text{gross profit ratio} - \text{loss} \qquad (1)$$

Thus, the game organizer can increase the income (gross profit) by increasing the sales and the gross profit ratio, and decreasing the loss. The decrease in the loss caused by mistakes or unfair practices may be achieved by the above-mentioned table system including various sensors. Processing of increasing the sales and the gross profit ratio will be described below.

It is difficult to utilize only the information about the sales and the gross profit ratio to increase the sales and the gross profit ratio in specific management measures. Therefore, the overall management device 60 breaks down the sales and the gross profit ratio into a plurality of elements, and calculates useful information for improvement of the elements.

The sales are expressed as a product of the number of dealings and the unit price of the bet amount (hereinafter referred to as "bet unit price"). That is, a following equation (2) holds:

$$\text{sales} = \text{the number of dealings} \times \text{bet unit price} \qquad (2)$$

Here, the number of dealings refers to play of one player P in one game. For example, if three players P play at one game table 4, the number of dealings in one game is three, and if two players P play at each of three game tables 4, the number of dealings in one game is 2×3=6. The bet unit price refers to average bet amount (sales) of each player P in one game (one dealing). That is, to increase the sales, the number of dealings and the bet unit price may be increased.

The number of dealings is expressed as a product of the number of players (the number of guests) and a turnover ratio. That is, a following equation (3) holds:

$$\text{the number of dealings} = \text{the number of players} \times \text{turnover ratio} \qquad (3)$$

The number of players described herein refers to the number of players participating in the game (betting), and the turnover ratio refers to a reciprocal of time required for one game (that is, progress speed of the game). Thus, to increase the number of dealings, the number of players participating in the game and the turnover ratio of the game may be increased.

If the game result coincides with the theoretical probability, the gross profit ratio becomes a deduction ratio (house edge). Accordingly, the gross profit ratio is expressed as a product of a leading ratio and a deduction ratio, and a following equation (4) holds:

$$\text{gross profit ratio} = \text{leading ratio} \times \text{deduction ratio} \quad (4)$$

The leading ratio described herein refers to a ratio indicating how the house leads a theoretical winning percentage of the house. The leading ratio becomes 1 if the winning percentage of the house coincides with the theoretical winning percentage, the leading ratio becomes larger than 1 if the winning percentage of the house is larger than the theoretical winning percentage, and the leading ratio becomes smaller than 1 if the winning percentage of the house is smaller than the theoretical winning percentage. The leading ratio becomes 1 if the winning percentage of the player P coincides with the theoretical winning percentage derived from the rules of the game, the leading ratio becomes smaller than 1 if the winning percentage of the player P is larger than the theoretical winning percentage, and the leading ratio becomes larger than 1 if the winning percentage of the player P is smaller than the theoretical winning percentage.

The deduction ratio is a ratio of a commission collected by the house to the bet amount, and is determined according to game rules including setting of odds. The deduction ratio is set such that the house can receive a profit of, for example, 1 to 3% if the leading ratio is 1, that is, the game result coincides with the theoretical result. For example, in a game that predicts pips of a die, the winning percentage of the players is ⅙. However, by setting the odd to 5.9 times rather than 6 times, the deduction ratio of about 1.7% is set.

The deduction ratio may have different values according to the type of layout or the bet area of the game table 4. For example, in the baccara, the deduction ratios of TIE and PAIR are different from the deduction ratios of BANKER and PLAYER, and in the roulette, the deduction ratios of "0" and "00" is different from the deduction ratios of other red or black numerals.

From the above-mentioned equations (1) to (4), the income (gross profit) of the house can be broken down into a plurality of elements as expressed in a following equation (5):

$$\text{income} = \text{the number of players} \times \text{turnover ratio} \times \text{bet unit price} \times \text{leading ratio} \times \text{deduction ratio} - \text{loss} \quad (5)$$

First, the structure of the income can be roughly analyzed by breaking down the elements according to the equation (1). For example, if the income (gross profit) is 10,000 dollars, it can be understood that the profit is 1% of sales of 1,000,000 dollars, 10% of 100,000 dollars, or 0.1% of 10,000,000 dollars. Then, the sales balance management part 611 compares the gross profit ratio with a predetermined reference gross profit ratio (for example, 2%) or a reference gross profit ratio range (for example, 1 to 3%), and generates an alarm if the gross profit ratio is excessively low (for example, 1% or less) and is excessively high (for example, 3% or more).

As expressed by the equation (4), the gross profit ratio can be broken down into the leading ratio and the deduction ratio. However, since the deduction ratio is set by the game organizer, if the gross profit ratio is excessively high or low, it is deemed that the leading ratio is excessively high or low. Thus, if the gross profit ratio is excessively high or low, it is doubtful that the players P or the dealer D makes an unfair practice of manipulating the leading ratio.

Thus, the sales balance management part 611 calculates the gross profit ratio in a predetermined period for each players P, each dealer D, and each game table 4. If the gross profit ratio is excessively low or high, an alert is generated. The generated alert may be notified to a communication account (for example, E-mail address) of the game organizer, or may be recorded in a recording part 62.

The sales balance management part 611 analyzes the game record acquired from each of the table management control devices 50 to generate statistics of the number of games, the number of players, and the bet unit price in a predetermined period. If the sales are not ideal, the game organizer can recognize whether or not there is a room for improvement in any of the number of games, the number of players, and the bet unit price. Further, if an action for improving the number of games, the number of players, or the bet unit price is made, the game organizer can monitor the transition of the number of games, the number of players, and the bet unit price to verify whether or not the improvement action is effectively achieved.

The sales balance management part 611 calculates and outputs the sales profit ratio (X), which is the ratio of the net profit (Y) that is the winning or losing amount for the game organizer to the total bet amount (sales) (B) that is the total amount of the chips 9 placed by the players P. The sales balance management part 611 compares the sales profit ratio (X) with the theoretical profit ratio or previous average profit ratio, and outputs a comparison result. The sales balance management part 611 calculates the sales profit ratio (X) for each game table 4, each player P, each player position, or each dealer D in each predetermined period or game, and outputs the sales profit ratio as necessary.

The sales balance management part 611 ascertains the relation between the number of games and time taken for the number of games (bet period+gaming period+chip collection period+chip payment period). The sales balance management part 611 calculates the total bet amount (B), the winning or losing amount for the game organizer (Y), and/or the sales profit ratio (X) per predetermined number of games for each player P, or each game table 4, and/or each dealer D in charge of each game table 4, and outputs it as necessary.

The sales balance management part 611 records 1) the bet amount of individual game played at the game table 4 (B), 2) the win-loss result (W&L) of the individual game played at the game table 4, and 3) the gross profit ratio (R %) according to rules of the game played at the game table in the recording device 62. Then, using the information 1) to 3) in each game and/or the information 1) to 3) in a predetermined time or period, the sales balance management part 611 calculates a following equation (6):

$$Y = \Sigma(B \times W\&L \times R\%) \quad (6),$$

and outputs the gross profit (Y).

Here, 1) the bet amount (B) of individual game played at the game table 4 is sales in each game. 2) The win-loss result (W&L) of individual game played at the game table 4 is synonymous with the above-mentioned leading ratio. The win-loss result (W&L) becomes +1 if the casino side wins (chips are collected), and becomes −1 if the casino side loses (chips are paid). 3) The gross profit ratio (R %) according to rules of individual game played at the game table is synonymous with the above-mentioned deduction ratio, and is determined according to the game rules including setting of odds. If the player bets BANKER or PLAYER, the gross profit ratio becomes 100% (that is, when the player wins, the player receives the same payment as the bet amount, and when the player loses, the entire bet amount is collected). If the player bets PAIR, the gross profit ratio becomes 800% when the player wins, and becomes 100% when the dealer wins (that is, when the player, the player receives a payment that is eight times of the bet amount, and when the player loses, the entire bet amount is collected).

If the gross profit ratio varies according to the type of layout or the bet area (bet target) of the game table 4 (for example, the odds of TIE or PAIR are increased), the sales balance management part 611 adopts the different gross profit ratio (R1%, R2%, . . . ) to calculate the gross profit (Y). If different gross profit ratio is set according to the type of layout or bet area (bet target) of the game table 4, the sales balance management part 611 outputs the distribution state of the total bet amount (TB) of the game and/or the bet amount (B) of the game for each type of layout or bet area (bet target) of the different gross profit ratio (R1%, R2%, . . . ). This can ascertain, for example, only the bet amount for TIE.

Further, if the different gross profit ratio is set according to the type of layout or bet area (bet target) of the game table 4, the sales balance management part 611 outputs the distribution state of the total bet amount (TB) of the game and/or the bet amount (B) of the game for each type of layout or bet area (bet target), and for each gross profit ratio (R1%, R2%, . . . ). This can ascertain, for example, the bet amount for the bet target having an excessively high gross profit ratio.

Further, if the different gross profit ratio is set according to the type of layout or bet area of the game table 4, the sales balance management part 611 compares the gross profits (Y) or total gross profit ratios (R %) of four game tables 4 each having the type of layout or bet area (bet target) of the different gross profit ratio (R1%, R2%, . . . ). This can compare the gross profit ratios of the tables with each other.

The loss management part 612 detects unfair practices or mistakes by statistically analyzing records of a plurality of games at the plurality of game tables 4 rather than detecting unfair practices or mistakes in each game. The loss management part 612 counts the number of times of noncoincidence detection of detecting whether or not the increase/decrease amount in the total amount of the chips 9 in the dealer chip tray 17 coincides with the winning or losing amount for the game organizer (Y), and outputs the count. The noncoincidence can be detected when the "verification result" of the game record (see FIG. 18) is NG. The loss management part 612 records the count for each game table 4, each dealer, and each player in the recording device 62. Thus, if there is the game table 4, dealer D, or player P having a high count, further examination can be made to find the unfair practice.

The loss management part 612 compares the increase/decrease amount in the total amount of the chips 9 in the dealer chip tray 17 with the winning or losing amount for the game organizer (Y). When there is noncoincidence, the loss management part 612 counts a noncoincidence amount (L) and outputs the count. The loss management part 612 can compare a difference between the "dealer chip amount at start" and the "dealer chip amount after settlement" with the "net profit" in the game record to calculate the noncoincidence amount (L). The loss management part 612 records the counts for each game table 4, each dealer D in charge of each game table 4, and each player P in the recording device 62. The loss management part 612 periodically refers to the recording device 62, ascertains the accumulated noncoincidence amount (L), and outputs the accumulated noncoincidence amount. Thus, if there is the game table 4, dealer D, or player P that has a high count, further examination can be made to find an unfair practice.

The loss management part 612 compares the increase/decrease amount in the total amount of the chips 9 in the dealer chip tray 17 with the winning or losing amount for the game organizer (Y), counts the noncoincidence amount (loss amount) (L), corrects the equation (6) to a following equation (7), and outputs a gross profit (Y'):

$$Y'=\Sigma(B \times W\&L \times R\%L) \quad (7)$$

Thereby, the gross profit can be calculated in consideration of the loss amount (L).

Further, at completion of a predetermined number of games, the loss management part 612 compares results of the actual winning percentage and the total amount of the gross profit (Y) with numerals calculated by probability and statistics or numerals based on previous accumulated data for each player P, each dealer D in charge of each game table 4, and each game table 4 to determine whether or not there is a significant difference between them, identifying the player P, the dealer D, and the game table 4 that cause the significant difference. Thereby, based on the comparison with the numerals calculated by probability and statistics or the numerals based on previous accumulated data, the player P or the dealer D who wins or loses too much can be found, and even the unfair practices that cannot be detected at the game table 4 can be found.

When detecting the significant difference, the loss management part 612 records the bet chip amount at the bet areas (bet positions) having the different gross profit ratios (R %) at each game table 4 in the recording device 62, and identifies whether or not a cause for the significant difference in a series of games is related to the bet area (bet position) (for example, "TIE" in the baccara) having the different gross profit ratio (R %). Thus, for example, the player P who wins a typical number of times, but when wins, bets on the bet target having a high ratio at all times, thereby finding the unfair practice.

The loss management part 612 can ascertain purchase information about the purchase of the chips 9 by each player P for each type of chips 9. For example, the purchase information can be acquired from a device provided at a casher for purchasing the chips 9, and when the players purchase the chips 9 at the game table 4, the purchase information may be acquired by image recognition using the camera 2 and the measurement device 21. The purchase information includes the number of purchased chips 9 by value and purchase date and time.

The loss management part 612 ascertains the purchase information of the chips 9 by the players P in a predetermined time or period, associates the bet amount, the winning amount, or the losing amount of each player P with the purchase information, records them in the recording device 62, and outputs the purchase information as necessary. This can detect a doubt about money laundering in collusion between the player P and the dealer D.

The operation management part 613 calculates the number of games and the number of players in a predetermined period for each dealer D. In general, as the number of players is larger, the collection and the payment of the chips 9 take more time, such that the turnover ratio (that is, the number of games per unit time) does not increase. When the turnover ratio is large irrespective of a large number of players, the dealer D is smoothly operating the game.

Conversely, when the turnover ratio is small irrespective of a small number of players, the dealer D is slowly operating the game.

Accordingly, the operation management part 613 extracts the dealer D who has turnover ratio×the number of players (that is, the number of dealings in a predetermined period) which is less than a predetermined threshold. The game organizer causes the extracted dealer D to improve the operation so as to progress the game faster, thereby increasing sales.

The operation management part 613 creates statistics of the bet period, the gaming period, the chip collection period, and the chip payment period for each dealer D. For each dealer D, the turnover ratio is desirably large. Thus, to find a cause for a small turnover ratio, it is effective to analyze which of the bet period, the chip collection period, the chip payment period, and the gaming period is large. The length of the bet period largely depends on the betting of the players P, and cannot be controlled by the dealer D so much. On the contrary, the length of the chip settlement period largely depends on the dealer's operation and can be decreased by efforts of the dealer D. The length of the gaming period depends on the behavior of both the players P and the dealer D (For example, squeeze of the players P in the baccara affects the gaming period). The gaming period further can be divided into a dealing period by the dealer D and a squeezing period by the player P.

Thus, the operation management part 613 calculates the chip collection period/the number of players, and the chip payment period/the number of players for each game record. Then, the operation management part 613 calculates an average of the bet periods, an average of the chip collection period/the number of players, an average of the chip payment period/the number of players, and an average of the gaming periods of a plurality of game records for each dealer D, and extracts the dealer D having the average more than a predetermined threshold and the dealer D having the average less than a predetermined threshold. Using the statistical data, the game organizer can give necessary guidance to such dealers D.

The operation management part 613 ascertains the dealer in charge of each game table 4 based on the game record transmitted from the table management control device 50, and detects at least one of following periods: 1) bet period, 2) chip collection period, 3) chip payment period, 4) gaming period, for each dealer, and stores the detected period in the recording device 62.

The operation management part 613 ascertains the bet positions (bet targets) and/or the number of stacks of the chips 9 placed at the game table 4 by the game participants, or the number of chips 9 in each stack, and outputs it in association with the number of games and time taken to play the number of games. The operation management part 613 ascertains the number of players at the game table 4, associates it with the number of games and time taken to play the number of games, and outputs them. Here, the time taken to play the games may be a sum of the bet period, the gaming period, the chip collection period, and the chip payment period of the number of games, may be a sum of the chip collection period and the chip payment period (chip settlement period) of each game, or may be the chip collection period or the chip payment period.

The layout management part 614 calculates the gross profit ratio in a predetermined period for each type of layout. By examining the gross profit ratio, it can be recognized which layout can increase the gross profit ratio. The layout management part 614 finds the bet amount for each bet target. By analyzing the bet amount on each bet target of each layout, it can be determined which layout is the most desirable.

The layout management part 614 analyzes whether or not the layout affects the sales. Specifically, the layout management part 614 calculates the bet unit price/minimum bet amount for each game record, and sums them for each layout. In more detail, the layout management part 614 analyzes which bet target (PLAYER, BANKER, TIE, PLAYER PAIR, and BANKER PAIR) has a large number of bets or bet amount for each layout to estimate the layout. For example, it is estimated that the layout having a large bet amount on TIE, PLAYER PAIR and BANKER PAIR contributes to an increase in sales.

As described above, as the number of players and bet unit price is larger, the sales in the house increases. Since the number of players and the bet unit price cannot be directly increased by giving a guidance to the dealer, it is effective to make approaches to the players. The approaches to the players increase the provision of points and the setting of the minimum bet amount. The approaches will be described below.

The point management part 615 provides points and benefits corresponding to the points to the players P that are members. The players P can convert the points into various benefits according to the number of the points. The point management part 615 can efficiently setting the benefits to increase the number of players and the bet unit price.

The recording part 62 stores owned points of each member. When providing points to the member, the management part 615 notifies the provided points to the table management control device 50, and updates the owned points of the concerned member, which are stored in the recording part 62. The table management control device 50 adds the points provided in the overall management device 60 to the owned points of the concerned player P, and updates the owned points. The reader/writer 5 records the updated owned points in the member card 1 of the concerned player P.

The point management part 615 provides points corresponding to the bet amount of the player P. Alternatively, the point management part 615 may ascertain the number of games in which each player P participates in a predetermined time or period, and provide points or status to the player P under a predetermined condition. If a value acquired by subtracting the loss amount from the total profit of the game organizer is positive, the game organizer makes a profit, and if the acquired value is negative, the game organizer suffers a loss. The value acquired by subtracting the loss amount from the total profit of the game organizer is referred to as the net profit of the game organizer, and the game organizer's cost related to the benefit provided to the members is desirably determined according to the net profit.

According to the net profit, the point management part 615 adjusts the ratio of the provided points to the bet amount of the players P, and the relation between the benefit and consumed points. The point management part 615 adjusts the ratio of the provided points to the bet amount of the players, and the relation between the benefit and the consumed points so as to increase the number of players and the bet unit price as a temporary campaign promotion. The ratio of the provided points to the bet amount of the players, and the relation between the benefit and the consumed points are recorded in the recording part 62.

The point management part 615 records at least one of following information: 1) the number of visits to the concerned play hall, 2) the number of times of bet, 3) the winning amount, and 4) the losing amount in unit of weeks or months, or a predetermined period for each game participant, in the recording device 62. When the concerned player P enters into the casino play hall, the point management part 615 reads at least one of the information 1) to 4) from the recording device 62, and outputs the read information. The visit of a particular player P to the concerned play hall may be recognized at the entrance to the play hall by ID confirmation using the member card 1, may be recognized at the purchase of the chips by ID confirmation using the member card 1, or may be recognized by reading the member card 1 by use of the reader/writer 5 at the game table 4.

By the purchase information and the selling information of the chips, and addition/subtraction of the winning amount and the losing amount, the balance of the chips to be owned by the players can be checked at a predetermined timing. Also, at the leaving from the play hall, the balance at the present time can be ascertained by confirming the ID in the member card. Further, if the balance of the chips is a predetermined amount or more, an alert about leaving may be issued.

The members can consume the owned points to receive the benefit or status. However, a particular provision condition other than the consumption of the owned points is set to a certain benefit or status, such that only the players P who satisfy the provision condition can receive the benefit or status.

The point management part 615 may provide the point or status according to the sales, as well as special point or status if the particular provision condition is satisfied. The particular provision condition may be the condition that the bet amount, the number of times of bet, the winning amount, or the losing amount satisfies a predetermined condition in a predetermined time or period. Here, the predetermined time or period may be in unit of days or consecutive days, in unit of months, or in a cumulative (indefinite) period. The point management part 615 may provide additional points or status to the members who intensively receive points in a predetermined time or period.

For example, to promote the members who make the net profit of a predetermined amount or more in a predetermined period to stay in the casino play hall on the next day onward and play the game, it is advantageous to provide benefits immediately available to the payment of charges for hotel services that promote long-term stay (for example, extension of check-out, upgrading of room, and so on in the currently stayed hotel). Thus, for example, the point management part 615 sets the provision condition that the net profit of the player in a predetermined period is a predetermined amount or more, with respect to the benefits such as extension of check-out and upgrading of room in the currently stayed hotel.

On the contrary, if the net profit of the players in the predetermined period is the predetermined amount or less, it is advantageous to provide limited-time chips available after an elapse of a predetermined period, chips that can be bet but cannot be converted into money, and a coupon available in the casino play hall as benefits. Thus, for example, the point management part 615 sets the provision condition that the profit of the players in the predetermined period is the predetermined amount or less, with respect to the benefits such as limited-time chips available after an elapse of a predetermined period and the coupon available in the casino play hall as benefits. As a matter of course, some benefits may be unconditionally acquired only by consuming points.

When the member replaces the owned points with the benefit, the member uses the member card 1. The point management part 615 acquires a request to replace points with the benefit, and refers to the recording part 62 to determine whether or not the owned points of the concerned member ID satisfies the consumed points corresponding to the requested benefit, and whether or not the provision condition, if present, is satisfied.

If the owned points are enough and the provision condition is satisfied, the point management part 615 updates the owned points by subtracting the points corresponding to the benefit from the owned points. The point management part 615 rewrites the owned points in the recording part 62 with the owned points updated with the addition of the benefit.

The benefits can be used in the casino play hall, related hotels, and predetermined facilities. When the benefits are used in the casino play hall, the benefit may be an access to a VIP room or a gaming chips that cannot be converted into money. In this case, the point management part 615 may grant the access to the VIP room in exchange for a predetermined number of points, and may provide the unconvertible gaming chips corresponding to the number of points if the owned points are a predetermined number or more. When the benefit is used in hotels, the benefits may be various hotel services.

When providing the benefit corresponding to the owned points to the members, the point management part 615 may provide the benefit without consuming the points. That is, the status of the members may be set (rated) according to the owned points, and the benefit corresponding to the status may be provided. Alternatively, the status may be provided in place of points. In this case, the point management part 615 checks the owned points of the member who attempts to receive the benefit, and provides the benefit to the member if the owned points are a predetermined value or more. For example, the point management part 615 may grant an access to the VIP room to the member having the owned points exceeding a predetermined threshold.

The point management part 615 may output the accumulated bet amount or the bet amount in a predetermined period for each game participant as credit information about the concerned game participant.

In addition to or in place of the in the member card, the user may be recognized by face recognition. At the entrance or leaving, at the purchase or conversion into money at the cage or table, or at the betting at the table, face recognition may be performed. Further, VIP member or not, member or non-member, foreigner or native, and collation with entrance and leaving record may be performed. In addition, for example, players who previously won in unreliable manner may be registered to recognize the particular registered player. Referring to a database associated with the member card, collation may be made, and if a member is not present in the database, the member may be newly registered in the database.

Based on the game record acquired from the table management control device 50, the minimum bet management part 616 determines the minimum bet amount (or a recommended value) for each game table 4. By properly setting the minimum bet amount of the plurality of game tables 4 in the casino play hall, the number of games, the number of players, and bet unit price can be optimized to increase the sales. That is, in a certain game table 4, if the player playing at the substantially higher bet amount than the minimum bet amount (high-amount player) and the player playing at the minimum bet amount or the slightly higher amount than the minimum bet amount (low-amount player) are mixed, the sales in the whole casino play hall may be sometimes limited.

Figure 22:
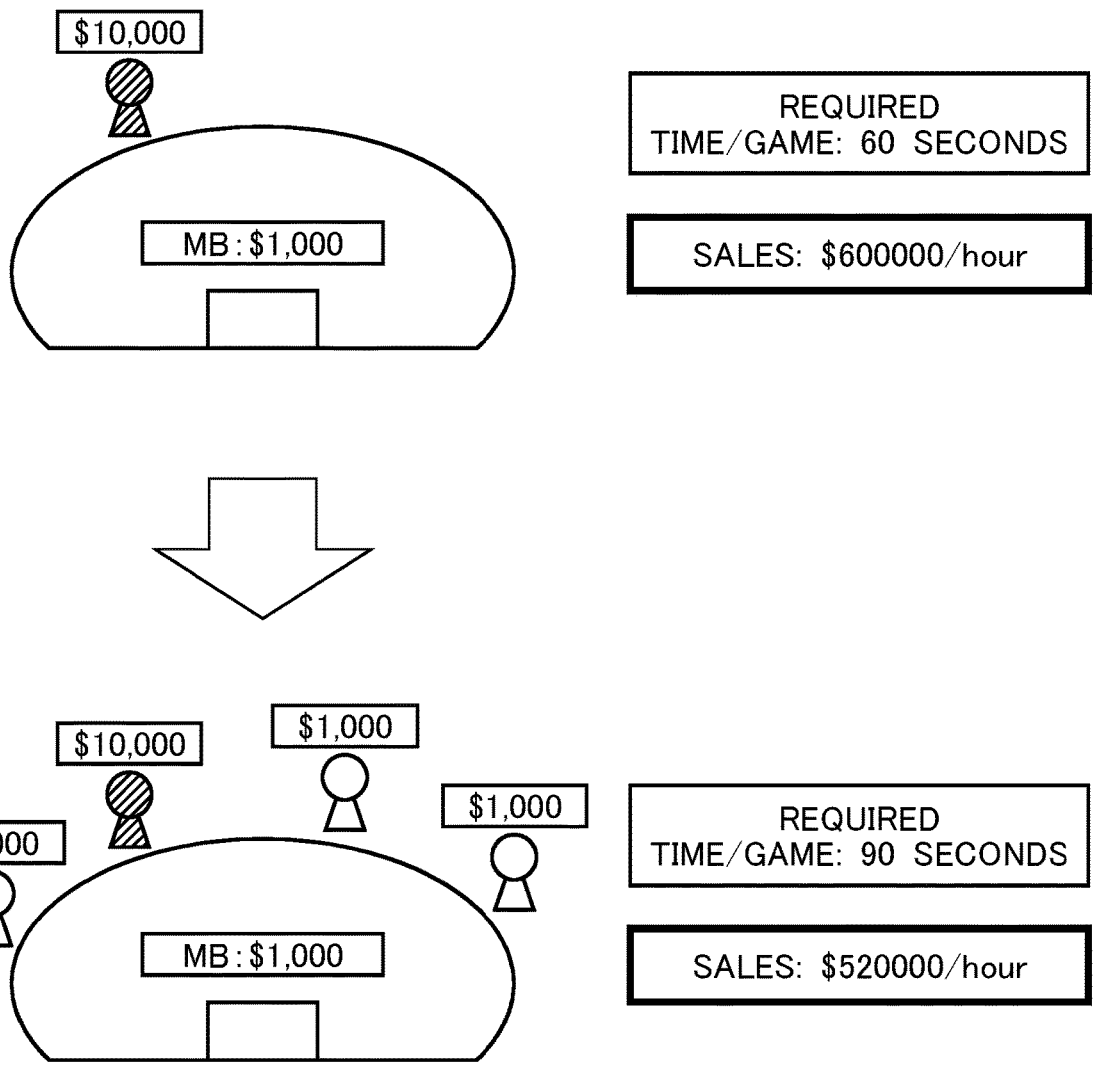
FIG. 22 is a view for describing the situation where the sales of the entire casino play hall is limited to be low.

FIG. 22 is a view for describing such situation. As illustrated in the upper side in FIG. 22, it is assumed that, at a certain game table, the minimum bet amount is set to 1,000 dollars, and one high-amount player having the bet amount of about 10,000 dollars is playing. At this time, the average required time (including the bet period, the chip settlement period (the chip collection period+the chip payment period), and the gaming period) in one game is 60 seconds, and the average sales/hour is 600,000 dollars.

When three low-amount players with the bet amount of about 1,000 dollars further participate in the game table 4, the total bet amount at the game table 4 increases to about 13,000 dollars and however, as the number of players increases, the average required time of one game also increases. Assuming that the play time increases by 10 seconds with an increase in one player, the required time of four players in one game becomes 90 seconds. As a result, the sales/hour decreases from about 600,000 dollars to about 520,000 dollars. As described above, since the high-amount player and the low-amount players are mixed at the same game table, even if the number of players increases, the sales in the house decreases.

Figure 23A:
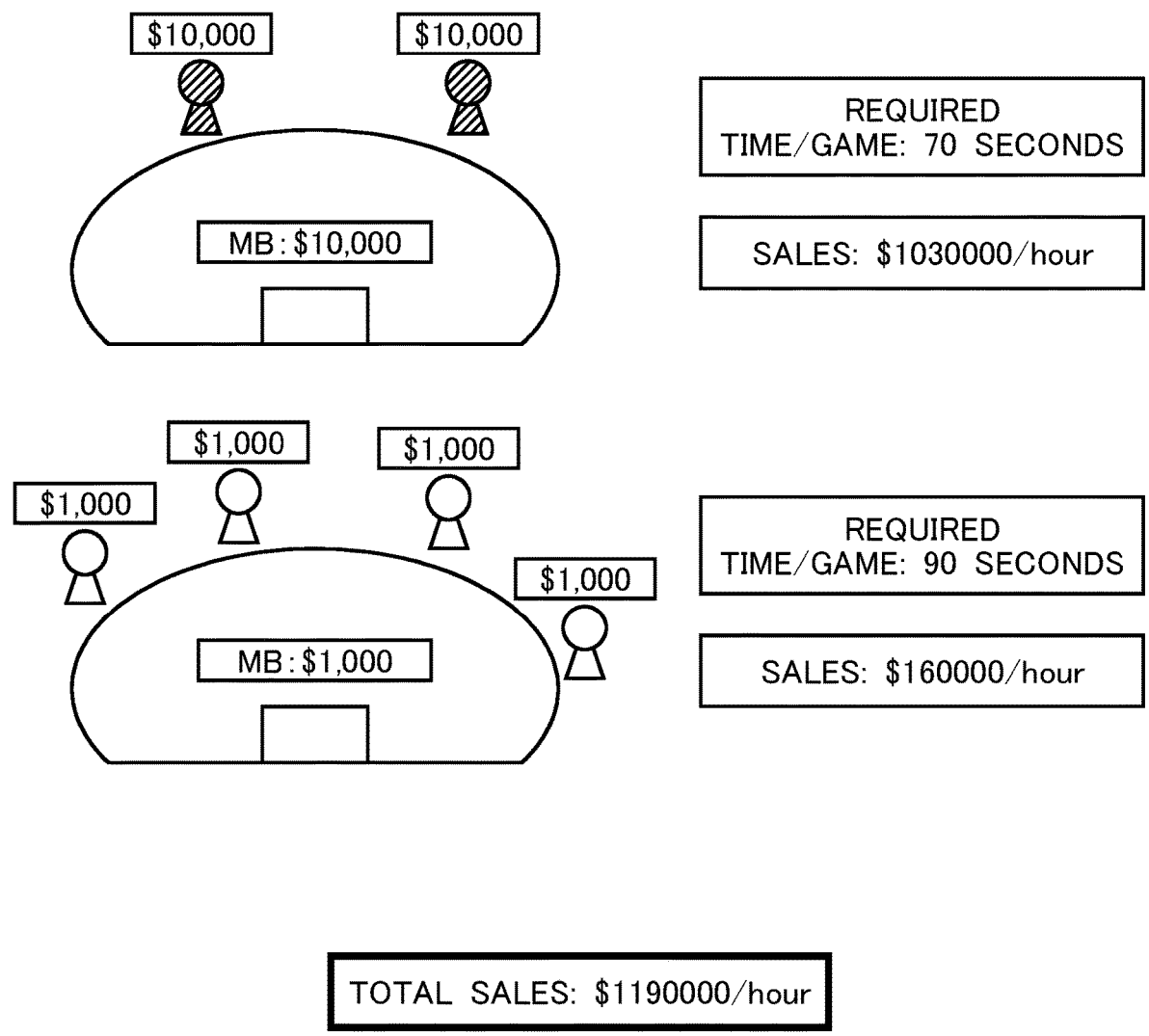
FIG. 23A is a view for describing the situation where the sales of the entire casino play hall are limited to be low.
Figure 23B:
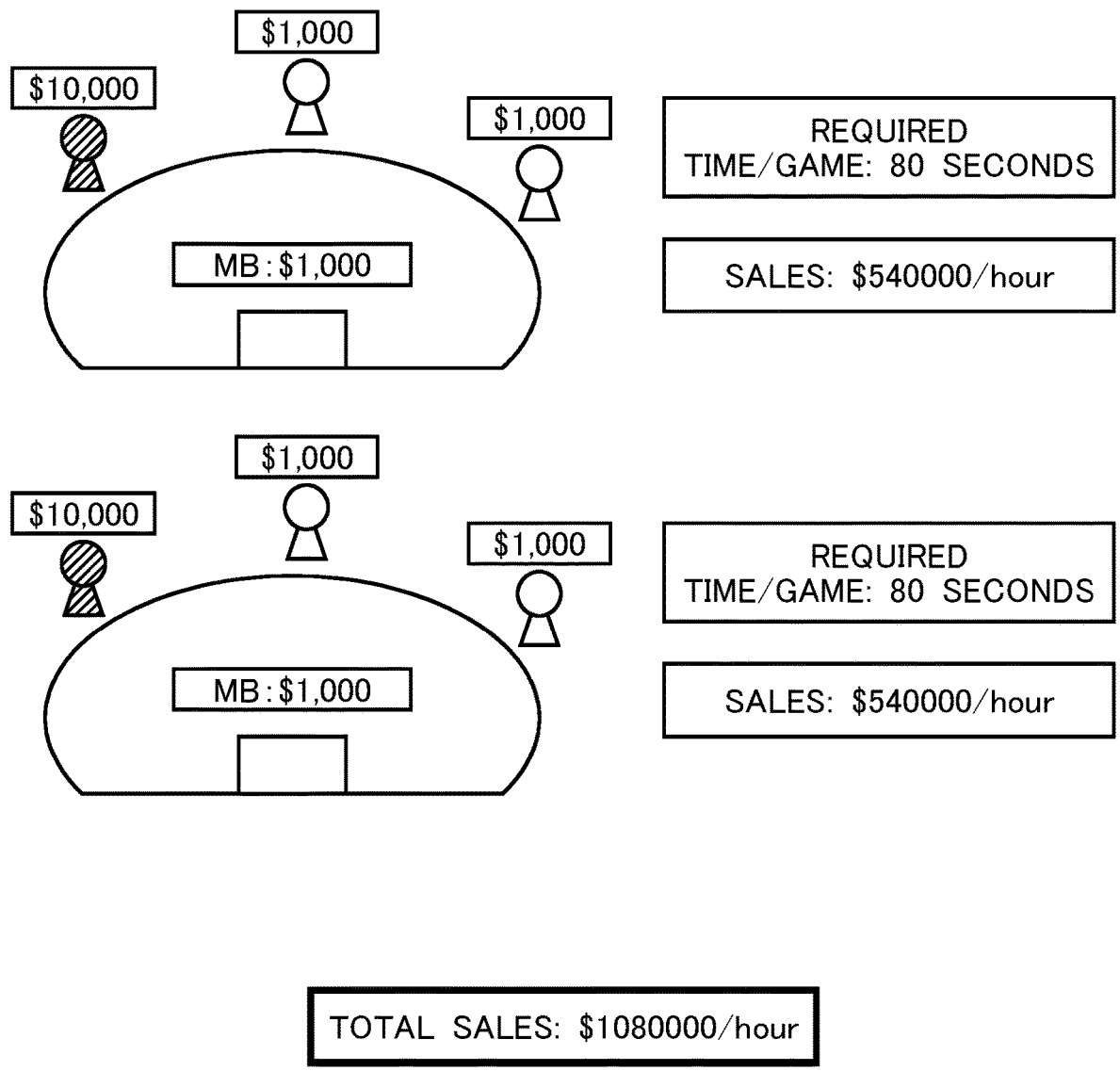
FIG. 23B is a view for describing the situation where the sales of the entire casino play hall are limited to be low.

FIG. 23A and FIG. 23B are views for describing another example. As illustrated in FIG. 23A, the minimum bet amount at one of the two game tables is set to 10,000 dollars, and the minimum bet amount at the other table is set to 1,000 dollars. The average required time in one game at the game table for the high-amount player is 70 seconds, and the sales/hour is about 1,030,000 dollars. The average required time in one game at the game table for the low-amount player is 90 seconds, and the sales/hour is about 160,000 dollars. Thus, the total sales/hour at the two game tables becomes about 1,190,000 dollars.

In the example illustrated in FIG. 23B, two high-amount players in FIG. 23A are dispersed to separate game tables. That is, there are two game tables to which 1,000 dollars of minimum bet amount is set, and at both the game tables, one high-amount player with the bet amount of about 10,000 dollars and two low-amount players with the bet amount of about 1,000 dollars are playing. At this time, the average required time per game at each game table 4 is 80 seconds, the sales/hour is about 540,000 dollars, and the total sales/hour at two game tables 4 is about 1,080,000 dollars.

As described above, when the high-amount players are dispersed to the plurality of game table 4, and the high-amount players and the low-amount players are mixed at each game table 4, the sales in the house decreases (in the case illustrated in FIG. 23A and FIG. 23B, 1,190,000 dollars decreases to 1,080,000 dollars).

As in the above-mentioned example, since the minimum bet amount is not properly set and the high-amount players and the low-amount players are mixed at the game table 4, the sales in the house decreases, and for the high-amount player, the required time in one game increases, making it difficult to play comfortably.

Thus, based on the game record transmitted from each table management control device 50, the minimum bet management part 616 sets the minimum bet amount that is suitable for each game table 4 in the casino play hall.

The minimum bet management part 616 sets the minimum bet amount for each game table 4 so as to increase the sales and the gross profit ratio. The minimum bet management part 616 may set the minimum bet amount for each game table 4 so as to increase the number of games per unit time or the average value of the total bet amount per game.

The minimum bet management part 616 sets a plurality of stages of candidates for the minimum bet amount. In this embodiment, the minimum bet management part 616 prepares five stages of candidates for the minimum bet amount: 100 dollars, 500 dollars, 1,000 dollars, 5,000 dollars, and 10,000 dollars. The minimum bet management part 616 selects one of the candidates for the minimum bet amount. The minimum bet management part 616 may set more proper minimum bet amount other than the prepared candidates, thereby enabling further classification if the previously set candidates for the minimum bet amount are improper.

The overall management device 60 outputs (transmits) the set minimum bet amount to the table management control device 50 of the corresponding game table 4. The table management control device 50 displays the minimum bet amount outputted from the overall management device 60 on the display 15. When receiving the minimum bet amount from the overall management device 60, the table management control device 50 may display the concerned recommended value as it is on the display 15, or may present the recommended value to only the dealer once and then, display it the display 15 according to the determination and operation of the dealer.

Based on information about the number of players, and information about the bet amount that is the minimum amount or information about the average bet amount for each player position in the game record, the minimum bet management part 616 selects any of the plurality of candidates for the minimum bet amount.

The minimum bet management part 616 ascertains the total bet amount for each player, for each game table 4 in each game and/or each predetermined time, or each predetermined period, and sets the minimum bet amount at each game table 4. In this embodiment, if players who bet a higher amount than the current minimum bet amount at the game table 4 by a predetermined ratio occupy a predetermined ratio or more, the minimum bet management part 616 increases the minimum bet amount.

Specifically, the minimum bet management part 616 rates the players with the minimum amount among the bet amounts in the predetermined number of previous games (in this embodiment, five games) that is a predetermined ratio (in this embodiment, 150%) of the minimum bet amount or more for each game table 4 and each player position, as high-amount players. If the high-amount players occupy a predetermined ratio (in this embodiment, 50%) or more at the game table 4, the minimum bet management part 616 sets the minimum bet amount higher than the already-set minimum bet amount at the concerned game table 4.

FIG. 24A and FIG. 24B are tables illustrating examples of setting the minimum bet amount according to the actual bet amount. In the example illustrated in FIG. 24A and FIG. 24B, four players participate in the game, and the minimum bet amount is set to 1,000 dollars.

In the example illustrated in FIG. 24A, the minimum amount of the bet amounts of the player 1 in five previous games is 1,000 dollars, the minimum amount of the bet amounts of the player 2 in five previous games is 2,000 dollars, the minimum amount of the bet amounts of the player 3 in five previous games is 1,500 dollars, and the minimum amount of the bet amounts of the player 4 in five previous games is 1,000 dollars. In this case, the minimum bet amount of the player 2 and the player 3 in the five previous games is equal to or larger than 1,500 dollars that is 150% of the current minimum bet amount 1,000 dollars and thus, the players 2 and 3 are rated as the high-amount players. Then, since the ratio of the high-amount players (two) among four players participating the games is 50%, and reaches 50% as a reference, the minimum bet management part 616 decides the minimum bet amount higher than the already-set minimum bet amount of 1,000 dollars, as the recommended value.

On the contrary, in the example illustrated in FIG. 24B, the minimum amount of the bet amounts of the player 1 in five previous games is 1,000 dollars, the minimum amount of the bet amounts of the player 2 in five previous games is 1,500 dollars, the minimum amount of the bet amounts of the player 3 in five previous games is 1,000 dollars, and the minimum amount of the bet amounts of the player 4 in five previous games is 1,100 dollars. In this case, the minimum bet amount of the player 2 in the five previous games is equal to or larger than 1,500 dollars that is 150% of the current minimum bet amount 1,000 dollars and thus, the player 2 is rated as the high-amount player. Since the ratio of the high-amount player (one) among four players is 25% and does not reach 50% that is the reference, the minimum bet management part 616 decides the current minimum bet amount of 1,000 dollars as the recommended value, without changing the already-set minimum bet amount of 1,000 dollars.

When increasing the minimum bet amount, the minimum bet management part 616 rises the minimum bet amount by one rank, and make the above-mentioned calculation. In the case illustrated in FIG. 24A, when the current minimum bet amount is set to 5,000 dollars as one higher rank, if the condition for deciding the higher minimum bet amount as the recommended value is not satisfied and therefore, 5,000 dollars is decided as the recommended value of the minimum bet amount. When the minimum bet amount is increased by one rank and the above-mentioned calculation is made, if the above-mentioned condition is satisfied, the minimum bet amount is further increased by one rank, and repeats it until the above-mentioned condition is not satisfied.

In the above-mentioned example, the minimum bet management part 616 estimates the minimum amount of the bet amount in the five previous games for each player position (player). Alternatively, players having an average value (average bet amount) of the bet amounts in the predetermined number of previous games (for example, five games) that is a predetermined ratio (for example, 300%) of the minimum bet amount may be rated as the high-amount players, for each game table 4 and player position.

In the above-mentioned example, if the high-amount players occupy the predetermined ratio or more, the minimum bet amount is increased by one rank among predetermined candidates. Alternatively, the minimum bet amount may be increased to the predetermined ratio (for example, 150%) of the minimum bet amount. That is, in the example illustrated in FIG. 24A, 1,500 dollars that is 150% of the minimum bet amount 1,000 dollars may be set as the minimum bet amount. In the example illustrated in FIG. 24A, if the current minimum bet amount is 500 dollars, the minimum bet amount may be increased to 1,000 dollars that is the minimum bet amount of the players.

Next, decision of the recommended value of the minimum bet amount based on the table congestion degree will be described. Based on information about the number of players in the game record, the minimum bet management part 616 calculates the table congestion degree at each game table 4. The table congestion degree refers to the ratio of the number of the players participating in the game to a capacity of each game table 4. The minimum bet management part 616 sets the minimum bet amount of each game table 4 according to the table congestion degree determined by the minimum bet management part 616.

Figure 25B:
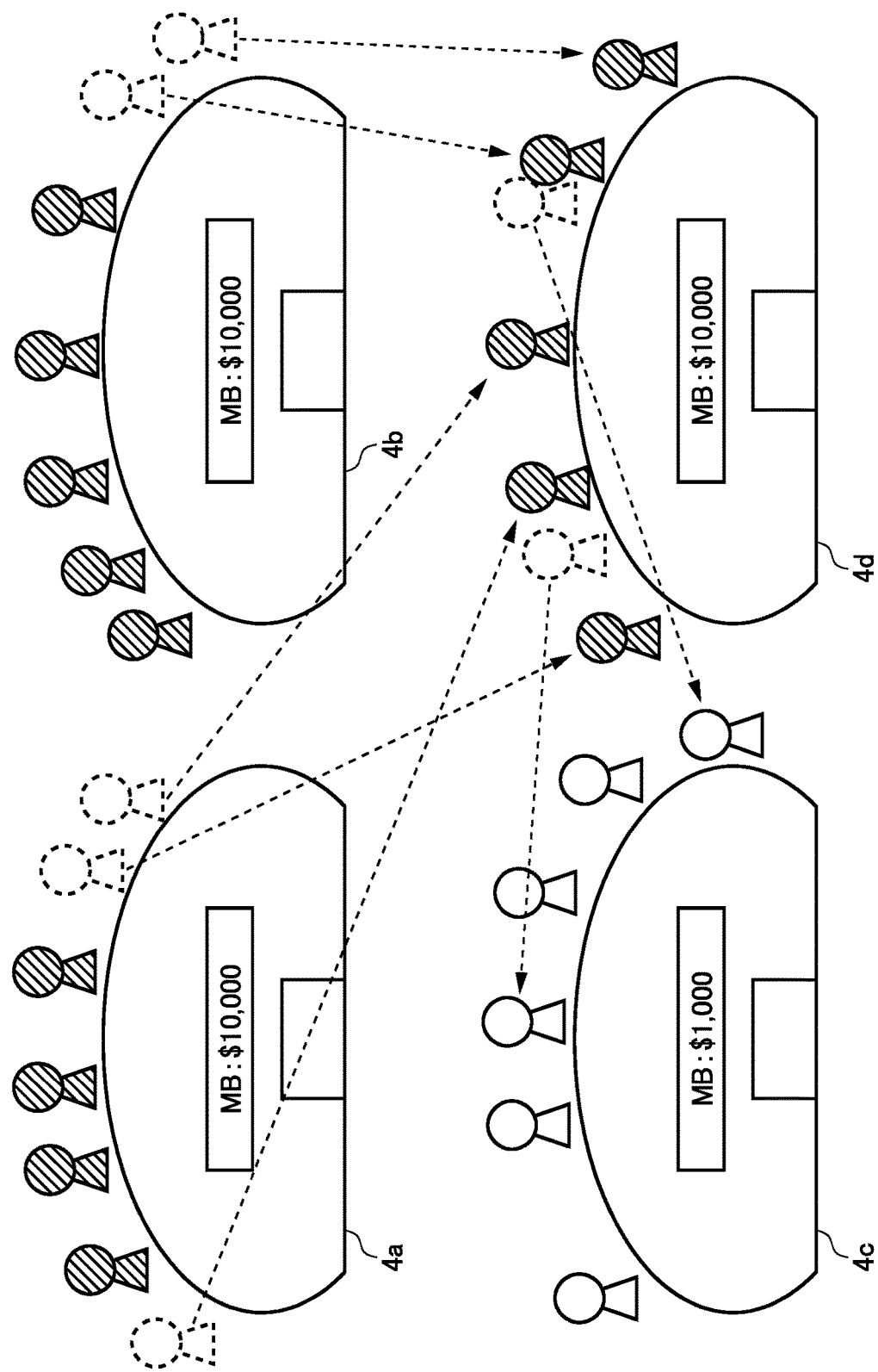
FIG. 25B is a view illustrating an example of decision of the recommended value of the minimum bet amount based on table congestion degree.

FIG. 25A and FIG. 25B are views illustrating examples of decision of the recommended value of the minimum bet amount based on the table congestion degree. As illustrated in FIG. 25A, four game tables 4a to 4d are provided. The minimum bet amount of the two game tables 4a, 4b is set to 10,000 dollars, and the minimum bet amount of the two remaining game tables 4c, 4d is set to 1,000 dollars.

As illustrated in FIG. 25A, in the two game tables 4a, 4b to which the minimum bet amount of 10,000 dollars is set, the number of players participating in the game is large (the table congestion degree is high), and in the two game tables 4c, 4d at which the minimum bet amount is set to 1,000 dollars, the number of players participating in the game is small (the table congestion degree is low).

In such situation, the minimum bet management part 616 increases the minimum bet amount of the game table 4d among the game tables 4c, 4d with the minimum bet amount of 1,000 dollars, at which the number of players participating in the game is the smallest (the table congestion degree is the minimum) to 10,000 dollars. In this manner, it is expected that, as illustrated in FIG. 25B, some of the players at the game table 4d move to the game table 4c with the minimum bet amount of 1,000 dollars, and some of players at the game tables 4a, 4b with the minimum bet amount of 10,000 dollars move to the game table 4d with the increased minimum bet amount of 10,000 dollars.

As described with reference to FIG. 23A and FIG. 23B, it is apparent that the sales in the house is larger in FIG. 25B than in FIG. 25A. In this manner, according to the table congestion degree determined by the minimum bet management part 616, the minimum bet management part 616 sets the minimum bet amount for each area and each game table 4 such that the high-amount players can play at the game table 4 including a smaller number of players.

As described above, the minimum bet management part 616 decides the recommended value of the minimum bet amount at each game table 4 so as to decrease an average number of game participants at the game table 4 with the high minimum bet amount. For this reason, the minimum bet management part 616 may decrease the recommended value of the minimum bet amount if the game tables 4 including a predetermined number of game participants or less occupy a predetermined ratio or more.

As described above, in this example, the minimum bet management part 616 manages the plurality of game table 4, ascertains the total bet amount for each game table 4, for each player in each game and/or predetermined time or period, and sets different minimum bet amounts to different game tables 4.

Based on information about the number of players determined by the table management control device 50 as a device for determining the number of players, the minimum bet management part 616 calculates the area congestion degree in each of a plurality of areas of the casino play hall. The area congestion degree refers to a ratio of the total number of players to the total number of player positions in a concerned area. The minimum bet management part 616 may define the ratio of the game table 4 with the table congestion degree exceeding a predetermined value (for example, 80%) for each area, as the area congestion degree.

The minimum bet management part 616 ascertains all game tables 4 in the casino play hall and the number of opened game tables 4, and decides the recommended number of the game tables 4 to be opened for each area according to the area congestion degree determined by the minimum bet management part 616. Specifically, if the area congestion degree becomes a predetermined value (in this embodiment, 80%) or more, the minimum bet management part 616 decides to newly open the game table 4 in the concerned area.

When the new game table 4 is opened, the minimum bet management part 616 sets the minimum bet amount at the game table 4. The minimum bet management part 616 may simply set the same minimum bet amount as the minimum bet amount of the game table 4 surrounding the game table 4 to be newly opened, to the game table 4 to be newly opened. This can guide guests to the area, and cause the guests to efficiently play.

Figure 26A:
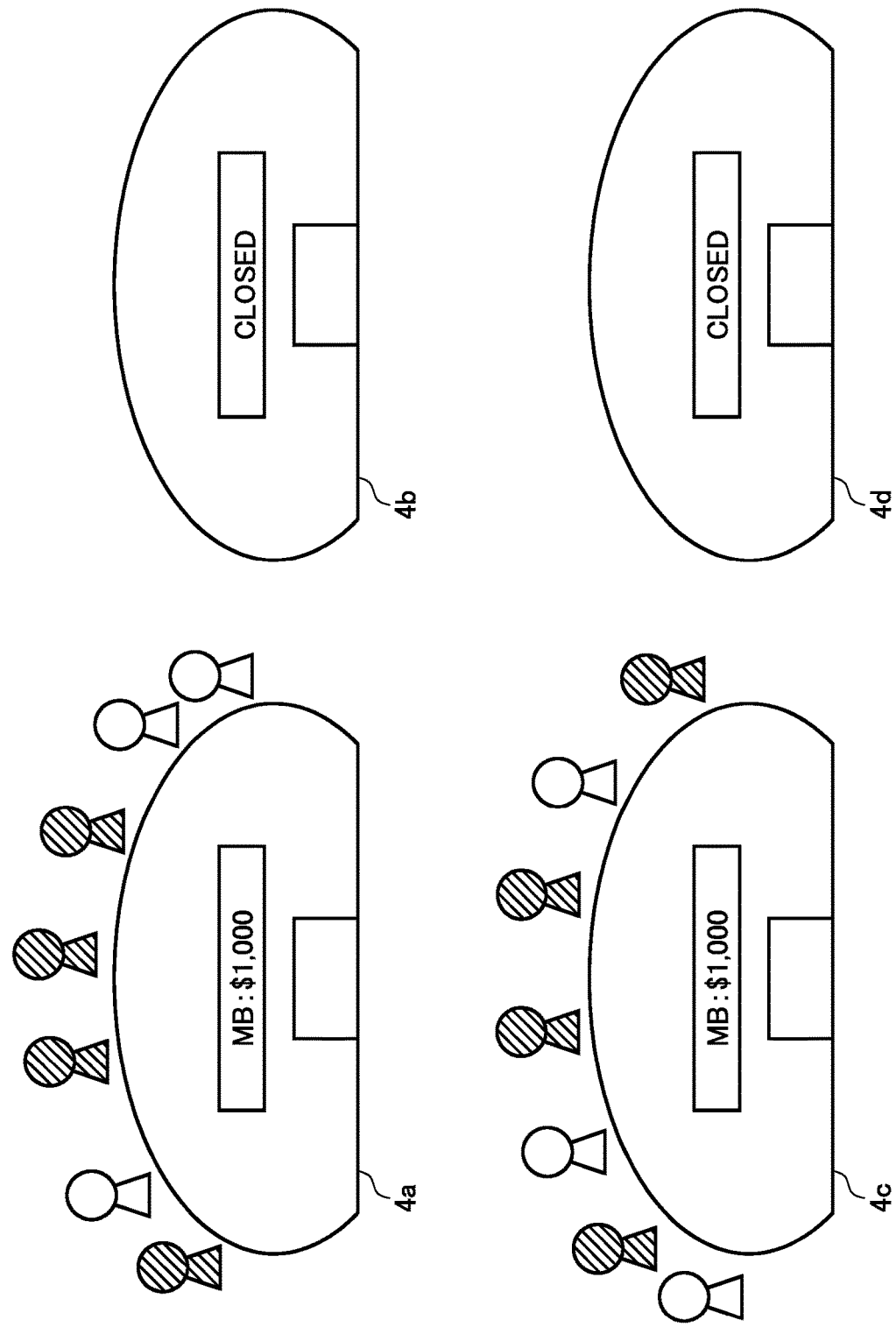
FIG. 26A is a view for describing an example of opening of a new game table in a certain area.
Figure 26B:
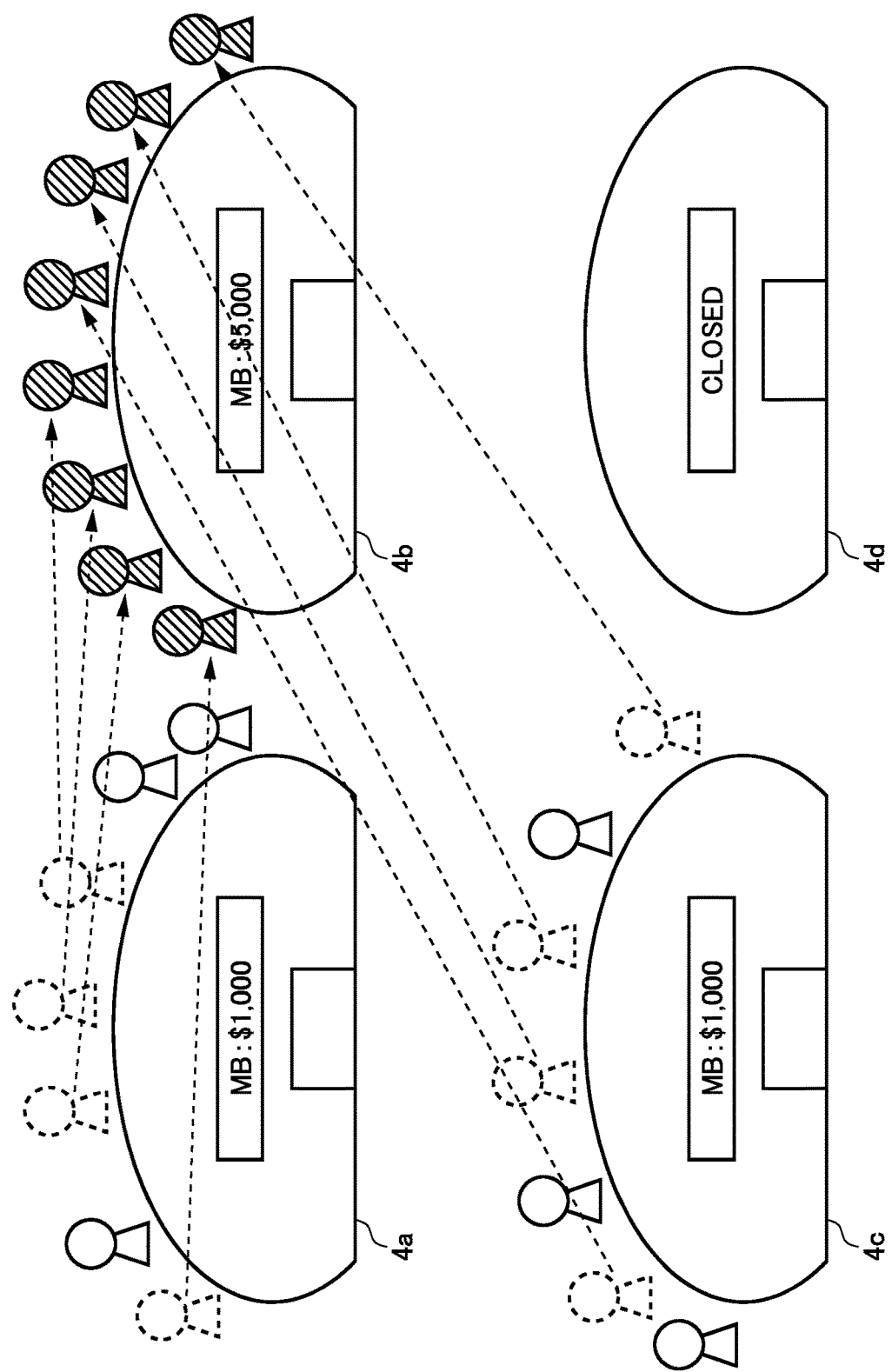
FIG. 26B is a view for describing an example of opening of a new game table in a certain area.
Figure 26C:
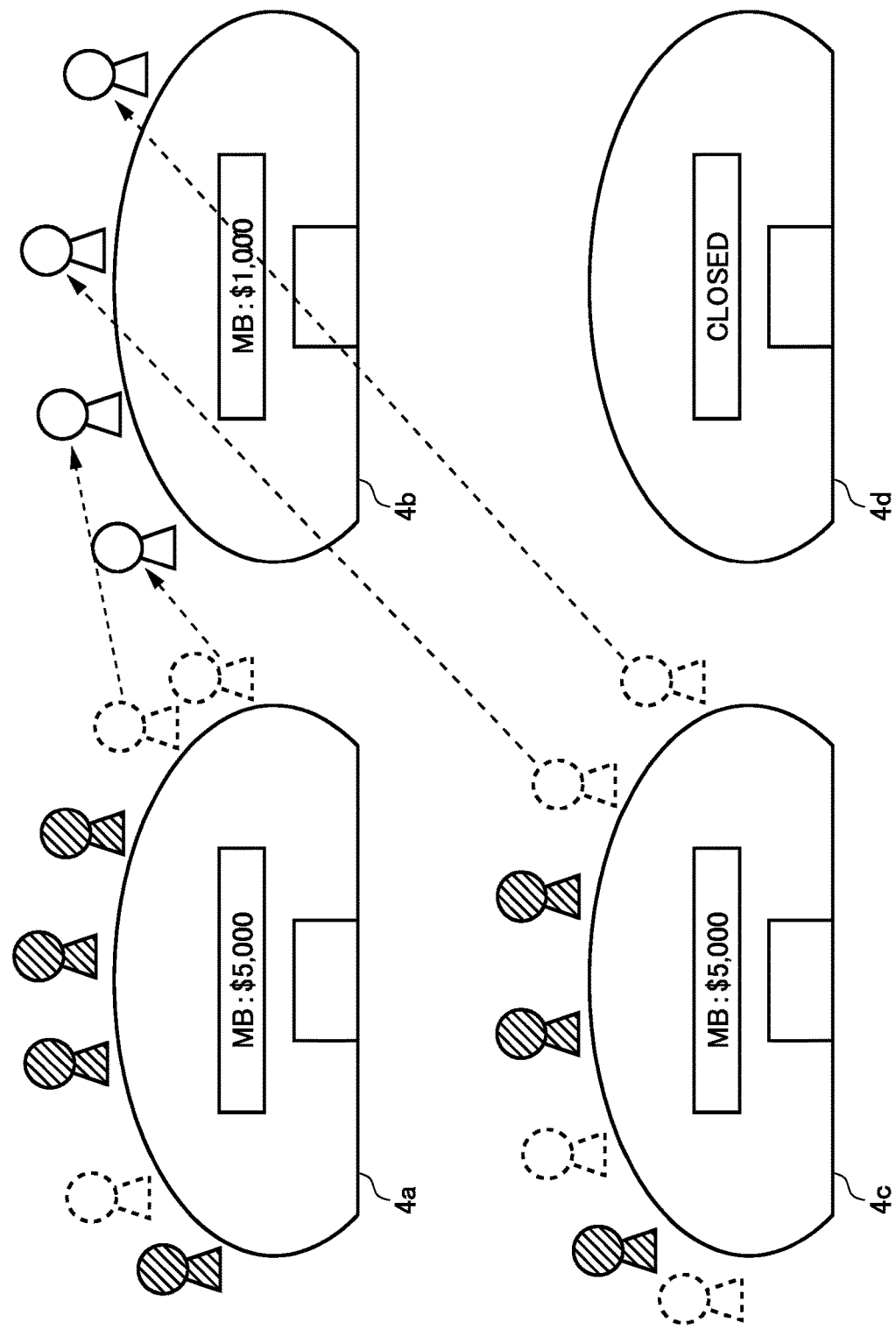
FIG. 26C is a view for describing an example of opening of a new game table in a certain area.

Further, when the game table 4 is newly opened, the minimum bet management part 616 may set the minimum bet amount so as to maximize the sales in the house. FIG. 26A to FIG. 26C are views for describing the example of opening of a new game table 4 in a certain area. Also, in this case, the average required time/game of one player is 60 seconds. It is assumed that as the number of players increases by 1, the average required time/game increases by 10 seconds. It is given that the average bet amount of the high-amount players (players hatched in the figures) is 5,000 dollars, and the average bet amount of the low-amount players (players drawn in white) is 1,000 dollars.

In the example illustrated in FIG. 26A, the game tables 4a, 4c are opened, seven players participate in the game having a capacity of eight persons, and among them, four persons are the high-amount players and three persons are the low-amount players. FIG. 26B illustrates the case where the new game table 4b is opened and the minimum bet amount is set to 5,000 dollars in the situation illustrated in FIG. 26A. By setting the minimum bet amount of the newly opened game table 4b to 5,000 dollars, as illustrated in FIG. 26B, all of the high-amount players at the game tables 4a, 4c may move to the game table 4b.

In the case illustrated in FIG. 26B, the average sales of 1,380,000 dollars/hour in FIG. 26A decreases to 1,377,000 dollars/hour. As described above, when the game table 4 is newly opened, according to the setting of the minimum bet amount, the sales may not increase so much, or in some cases, may decrease. Further, in consideration of the cost caused by opening of the new game table 4, the profit of the casino owner decreases.

In the example illustrated in FIG. 26A, as illustrated in FIG. 26C, it is effective to set a small minimum bet amount of the game table 4b to be newly opened, and increase the minimum bet amount of the already-opened game tables 4a, 4c. In this manner, the average sales of 1,380,000 dollars/hour in FIG. 26A increases to 1,760,000 dollars/hour.

As described above, the minimum bet management part 616 decides the minimum bet amount of the newly opened game table 4, based on minimum bet amount and the actual bet amount at the game tables 4 surrounding the concerned game table 4. As illustrated in FIG. 26C, the minimum bet management part 616 changes the minimum bet amount of the surrounding game tables 4 at the timing of opening a new game table 4, thereby promoting the players to move from the surrounding game tables 4 to the newly opened game table 4.

The minimum bet management part 616 manages dealers at work, and decides whether or not a new game table 4 is opened according to the number of dealers. Specifically, even if the area congestion degree becomes high, when there is no waiting (dispatchable) dealer (that is, all dealers are at the respective game tables 4), and when there is no game table 4 to be newly opened (that is, when all game tables 4 are opened), the minimum bet management part 616 decides so as not to open the new game table 4, and changes the minimum bet amount of the game table 4 already opened by the minimum bet management part 616.

The minimum bet management part 616 records the transition of the area congestion degree for each area in the recording part 62, and decides the recommended number of game tables 4 to be opened for each area, based on the recorded information about the transition. That is, if the area congestion degree tends to rise, the minimum bet management part 616 decides to open the new game table 4 before the area congestion degree in the concerned area becomes a predetermined value.

As described above, in this example, the minimum bet management part 616 manages the plurality of game tables 4, ascertains the total bet amount for each game table 4, for each game and/or predetermined time or period, and set the minimum bet amount of the game table to be newly opened.

The minimum bet management part 616 associates information about the bet amount and payment/collection in the game record with the member ID, and records them in the recording part 62. In this manner, the minimum bet management part 616 records previous play contents for each player in the recording part 62.

Based on the game record, the minimum bet management part 616 finds the average bet amount, an average consecutive play time at the same table, a seat leaving ratio at increase in the minimum bet amount, and a recent winning percentage and a leading amount for each player from the previous play contents, and associates the information as tendency information of each player with the member ID and then, records them in the recording part 62.

The minimum bet management part 616 may decide the recommended number of game tables to be newly opened for each area, based on the tendency information about a plurality of players in a concerned area recorded in the recording part 62. The minimum bet management part 616 may set the minimum bet amount of the newly opened game table 4 for each area, based on the tendency information about the plurality of players in the concerned area recorded in the recording part 62, or may set the minimum bet amount of the newly opened game table 4.

As described above, when the game table 4b with a relatively large minimum bet amount is newly opened as illustrated in FIG. 26B from the state illustrated in FIG. 26A, it is expected that all high-amount players move to the concerned game table 4b. Actually, the players may not move as illustrated in FIG. 26B. In FIG. 26C, when the minimum bet amount is increased at the game tables 4a, 4c, it is expected that all low-amount players leave. However, in response to the increased minimum bet amount, the low-amount players may remain at the same game tables 4a, 4c. Thus, the minimum bet management part 616 performs probability simulation using the tendencies of the players recorded in the recording part 62, and sets the minimum bet amount so as to maximize the sales.

The dealer stores the chips 9 collected from the losing players in the dealer chip tray 17, and pays the chips 9 from the dealer chip tray 17 to the winning players. Accordingly, the chips 9 in the dealer chip tray 17 increase or decrease.

In the case where many chips 9 are collected and cannot be stored in the game table 4, the dealer calls nearby pit staff (pit manager) to collect the chips 9. Also, in the case where many chips 9 are paid, and the chips to be paid lack at settlement, the dealer calls nearby pit staff to fill the chips 9.

If the dealer chip amount after settlement in the game record transmitted from the table management control device 50 exceeds a predetermined upper threshold and falls below a predetermined lower threshold, the dealer chip management part 617 notifies it to a nearby pit of the concerned game table 4. The notification includes at least the table number of the concerned game table 4 and information about collection or filling.

Thereby, the pit manager can collect or fill chips from or into the concerned game table 4 according to the notification from the overall management device 60. The dealer can concentrate on dealing of the game without paying attention to the timing of calling the pit manager.

As described above, the table game management system in this embodiment, various sensors are installed at each game table 4 to automatically find unfair practices or mistakes, and decrease unfair practices and mistakes, thereby increasing the gross profit of the house. By statistically processing sensing data acquired to find unfair practices and mistakes, various analysis for increasing the gross profit of the house is made, and analysis results are presented to the game organizer. As a result, the game organizer can decrease negative factors such as a loss caused by the unfair practices and mistakes to increase the gross profit, and also enhance positive factors to increase the gross profit.

In the above-mentioned embodiment, the management system 100 includes the plurality of table management control device 50 installed at each game table 4, and the overall management device 60 connected to the plurality of table management control device 50. Alternatively, some or all functions of the table management control device 50 may be provided in the overall management device 60, or some or all functions of the overall management device 60 may be provided in the table management control device 50 of each game table 4. That is, the configuration and functions of the above-mentioned table management control device 50 and the overall management device 60 may be realized by a device provided in each game table 4, or a device provided in any place (for example, backyard) other than the game table 4.

The table management control device 50 or the management control device 60 may have a monitor. In this case, the table management control device 50 or the management control device 60 may generate various screens and display them on the monitor. Hereinafter, the table management control device 50 or the management control device 60 that generates a screen is referred to as a screen generation device. The screen generation device generates a screen indicating the status of the ascertained chips 9 in the dealer chip tray 17 and displays the screen on the monitor.

Specifically, the screen generation device generates a screen showing a graph and/or a table that represents, in time series, the number of chips 9 of each type (value) contained in the dealer chip tray 17 and/or the total amount thereof for each predetermined time or for each predetermined number of games.

In addition, the screen generation device generates a screen showing a graph and/or a table that represents, in time series, the "bet period", "gaming period", "chip collection period", "chip payment period" and/or total time thereof for each predetermined time or for each predetermined number of games.

In addition, the screen generation device generates a screen showing a graph or a table that represents, in time series, the bet amount for each bet area and the profit ratio in each bet area at predetermined time intervals or for each predetermined number of games.

In addition, the screen generation device generates a screen showing a graph or a table that represents, in time series, the total or average bet amount for each player position and the profit ratio in each player position at predetermined time intervals or for each predetermined number of games.

In addition, the screen generation device records the results and bettings of a predetermined number of games and calculates the probability that these results and betting will occur, if the possibility is lower than a predetermined threshold, or if the possibility is lower than the predetermined threshold and the payout amount is higher than the predetermined threshold, the screen generation device generates a warning screen.

The above plurality of types of screens may be displayed using a plurality of monitors, or the above plurality of types of screens may be switched and displayed on one monitor. Also, each screen described above may be generated for each table, may be generated for the sum of a plurality of tables, or for the sum of all the tables in the casino.

What is claimed is:

1. A table game management system for use with gaming chips (a) that each includes a plurality of plastic colored portions that are of varying colors and (b) a respective type of each of which is identifiable from its respective appearance, the table game management system comprising:
   a camera; and
   at least one processor, wherein the at least one processor is configured to:
      determine a respective win-loss result (WL) of each of a plurality of games at a game table for a bet area of the game table;
      use the camera to detect respective positions, types, and numbers of those of the gaming chips that are respectively placed, by respective ones of at least one game participant, on the bet area for each of the plurality of games;
      store the detected respective positions, types, and numbers;
      based on the detected respective positions, types, and numbers, determine a total bet amount (B) formed by the gaming chips placed on the bet area of the game table for a predetermined number of games;
      based on the determined win-loss result and the detected respective positions, types, and numbers, determine a winning or losing amount of a game organizer for the predetermined number of games;
      determine a sales profit ratio (X) of the winning or losing amount of the game organizer to the total bet amount (B) for the predetermined number of games;
      compare the sales profit ratio (X) to a theoretical profit ratio or a previous average profit ratio; and
      generate an alarm in response to a result of the comparison.

2. The table game management system according to claim 1, wherein the at least one processor is configured to use deep learning to perform the detection of the respective positions, types, and numbers.

3. The table game management system according to claim 1, wherein the at least one processor is configured to determine one or more of the total bet amount (B), the winning or losing amount, and the sales profit ratio respectively for each of the plurality of games.

4. The table game management system according to claim 1, wherein the at least one processor is configured to:
   determine the total bet amount (B) respectively for respective ones of a plurality of player positions of the game table; and output one or both of the total bet amount (B) and the sales profit ratio (X) respectively for each of the plurality of player positions.

5. The table game management system according to claim 4, wherein the at least one processor is configured to associate each position of the plurality of player positions with a respective one of the at least one game participant.

6. The table game management system according to claim 4, wherein the at least one processor is configured to:
perform the detection of the positions, types, and numbers of gaming chips respectively for each of a plurality of stacks of the gaming chips placed on the game table; and
associate each of the stacks with a respective one of the at least one game participant.

7. The table game management system according to claim 1, wherein the at least one processor is configured to ascertain a relation between a number of games and time taken to play the games, and output the total bet amount (B), the winning or losing amount for the game organizer, or the sales profit ratio (X) for a predetermined number of games, respectively for any one or more of: each respective one of the at least one game participant, each of a plurality of game tables, and each of a plurality of dealers that are respectively in charge of respective ones of the plurality of game tables.

8. The table game management system according to claim 1, wherein the at least one processor is configured to ascertain, and output in association with a number of games and a time taken to play the games:
  (a) respective bet positions of the gaming chips placed on the game table by the at least one game participant;
  (b) respective numbers of stacks of the gaming chips placed on the game table by the at least one game participant; or
  (c) a number of the gaming chips in each of the stacks.

9. The table game management system according to claim 1, wherein the at least one processor is configured to ascertain, and output in association with a number of games and a time taken to play the games, a number of the at least of game participant that is at the game table.

10. The table game management system according to claim 1, wherein the game table is one of a plurality of game tables, and the at least one processor is configured to:
for each of the plurality of game tables, ascertain a respective dealer in charge of the respective game table; and
respectively for each of the dealers, detect and store at least one of following periods:
  1) a bet period;
  2) a chip collection period;
  3) a chip payment period; and
  4) a gaming period.

11. The table game management system according to claim 10, wherein the at least one processor is configured to, respectively for each of the games, detect a respective start time and a respective end time of distribution of playing cards in the respective game, and ascertain as a respective gaming period a respective period from the respective start time to the respective end time.

12. The table game management system according to claim 1, wherein the at least one processor is configured to determine and output, respectively for the game table, a respective suggested minimum bet amount in order to increase the total bet amount (B) within a predetermined time or period.

13. The table game management system according to claim 12, wherein the at least one game participant includes a plurality of game participants and the at least one processor is configured to suggest the minimum bet amount to be increased in response to there being at least a first predefined ratio of (a) those of the plurality of game participants who bet respective bet amounts that are each higher, by at least a second predefined ratio, than the minimum bet amount as previously set to (b) all others of the plurality of game participants.

14. The table game management system according to claim 1, wherein:
the game table is one of a plurality of game tables; and
the at least one processor is further configured to manage the plurality of game tables and to determine and output different respective minimum bet amounts for different ones of the plurality of game tables in order to increase the total bet amount (B) within a predetermined time or period respectively for each of the game tables or for respective subsets of the game tables.

15. The table game management system according to claim 14, wherein, respectively for respective ones of the plurality of game tables, the at least one processor is configured to determine the respective minimum bet amount for the respective game table so as to decrease an average number of game participants at the respective game table that are associated with bet amounts that are higher, by a predetermined amount or ratio, than the respective minimum bet amount of the respective game table.

16. The table game management system according to claim 14, wherein the at least one processor is configured to determine to decrease the minimum bet amount for one or more of the game tables in response to there being at least a predefined ratio of (a) those of the game tables that each has no more than a predetermined number of game participants to (b) all others of the game tables.

17. The table game management system according to claim 1, wherein:
the game table is one of a plurality of game tables; and
the at least one processor is configured to:
  manage the plurality of game tables;
  ascertain the total bet amount respectively for each of the game tables, and, with respect to each of the game tables, a bet amount respectively for (a) each of a plurality of player positions of the respective game table or (b) each of the at least one game participant at the respective game table; and
  for each of the plurality of game tables respectively, determine, based on the ascertained bet amounts, and output a respective suggested minimum bet amount.

18. The table game management system according to claim 1, wherein:
the game table is one of a plurality of game tables; and
the at least one processor is further configured to:
  manage the plurality of game tables;
  respectively for each of the game tables, ascertain the total bet amount (B) respectively for each of the plurality of games at the respective game table or for each of a plurality of predetermined times or time periods; and
  based on the ascertained total bet amounts, determine and output a suggested minimum bet amount of a game table to be newly opened.

19. The table game management system according to claim 1, wherein:
the game table is one of a plurality of game tables; and
the at least one processor is further configured to:

ascertain a bet amount respectively for each of the at least one game participant and respectively for each of a plurality of predetermined times or time periods; and assign to the game participant, and output, a point or status under a predetermined condition of the ascertained bet amount.

20. The table game management system according to claim 19, wherein, for each of the at least one game participant and each of the plurality of predetermined times or time periods, the at least one processor is configured to:
ascertain purchase information about a purchase by the game participant of the gaming chips at the predetermined time or in the predetermined period; and
output the purchase information in association with (a) the bet amount determined for the respective game participant in association with the respective time or time period or (b) a winning or losing amount of the respective game participant.

21. The table game management system according to claim 20, wherein the at least one processor is further configured to ascertain the purchase information respectively for each of the types of the gaming chips.

22. The table game management system according to claim 19, wherein the point or status is assigned based on the total bet amount ascertained for the respective game participant within the predetermined time period, the predetermined time period being a period of contiguous or non-contiguous days, a period of contiguous or non-contiguous months, or a constantly accumulating time period.

23. The table game management system according to claim 19, wherein, responsive to an assignment of a large number of points to the respective game participant at a particular point in time or within a predefined time period, the at least one processor is configured to boost the point or status of the respective game participant.

24. The table game management system according to claim 19, wherein an access to a VIP room is provided under a predetermined condition of the point or status.

25. The table game management system according to claim 19, wherein the point or status are convertible in the table game management system into gaming chips under a predetermined condition.

26. The table game management system according to claim 19, wherein the point or status are convertible by the table game management system into a payment of a hotel charge or other facility charge under a predetermined condition.

27. The table game management system according to claim 1, wherein:
the game table is one of a plurality of game tables; and
the at least one processor is configured to:
manage the plurality of game tables; and
respectively for each of the at least one game participant:
ascertain a respective net profit at a predetermined time or in a predetermined time period; and
under a predetermined condition, assign to the respective game participant and output a respective point or status.

28. The table game management system according to claim 1, wherein:
the game table includes a plurality of game tables; and
the at least one processor is configured to:
manage a plurality of game tables;
for each of the at least one game participant, ascertain number of the plurality of games in which the respective game participant participated at a predefined time or within a predefined time period; and
under a predetermined condition, assign to the respective game participant and output a respective point or status.

29. The table game management system according to claim 1, wherein the game table includes a plurality of game tables, and the at least one processor is configured to store information that includes at least one of the following respectively for respective ones of the at least one game participant and in units of weeks, months, or other predefined time period:
1) a number of visits to a particular play hall;
2) a number of times the respective game participant placed a bet;
3) a winning amount of the respective game participant; and
4) a losing amount of the respective game participant.

30. The table game management system according to claim 29, wherein the at least one processor is configured to output the information when the game participant enters the particular play hall.

31. The table game management system according to claim 1, wherein:
the game table includes a plurality of game tables; and
the at least one processor is configured to:
manage the plurality of game tables; and
for each of the at least one game participant:
determine a respective bet amount for the respective game participant; and
determine a credit of the respective game participant based on a total accumulation of the bet amount determined for the respective game participant overall or within a predetermined period.

32. The table game management system according to claim 1, wherein the at least one processor is configured to:
store:
(1) the total bet amount (B) respectively for each of the plurality of games and each of a plurality of bet areas of the game table;
(2) the win-loss result (WL) respectively for each of the plurality of games and each of the plurality of bet areas; and
(3) a gross profit ratio (R %) respectively for each of the plurality of games and each of the plurality of bet areas according to respective rules of the respective game; and
use information about the items (1) to (3) in each of the plurality of games or for a predetermined time or time period and each of the plurality of bet areas to calculate a gross profit (Y) as $\Sigma(B \times WL \times R \%)$.

33. The table game management system according to claim 32, wherein the at least one processor is configured to output:
bet positions or a number of stacks of the gaming chips placed on the game table by the at least one game participant; or
a number of the gaming chips in each of the stacks.

34. The table game management system according to claim 32, wherein the gross profit ratio (R %) on the basis of which the gross profit (Y) is calculated includes a plurality of gross profit ratios (R1%, R2%, . . . ) that vary according to layout or bet area of the game table.

35. The table game management system according to claim 34, wherein the at least one processor is configured to output a respective portion of the total bet amount for each of the layout or bet areas whose respective gross profit ratios (R1%, R2%, ... ) differ from one another.

36. The table game management system according to claim 34, wherein:
the game table includes a plurality of game tables; and
the at least one processor is configured to:
manage the plurality of game tables; and
compare the gross profie (Y)/the total bet amount (B), the gross profit(Y)/the predetermined time or time period or the gross profit (Y)/the predetermined number of games
for different ones of the game tables.

37. The table game management system according to claim 1, wherein the at least one processor is configured to:
determine a total amount of the gaming chips that are in a chip tray of the game table based on a reading of unique IDs of the gaming chips or an output of the camera or another camera;
determine the winning or losing amount of the game organizer respectively for each of the plurality of games;
detect whether there is an inconsistency by detecting whether a change amount by which the total amount of the gaming chips in the chip tray has changed for a respective one of the games coincides with the winning or losing amount for the game organizer determined for the respective game; and
output a detection result of the inconsistency detection.

38. The table game management system according to claim 37, wherein the at least one processor is configured to count a number of times of that a result of the inconsistency detection is that the coincidence is present and output the count.

39. The table game management system according to claim 37, wherein the at least one processor is configured to determine a discrepancy amount when a result of the inconsistency detection is that the coincidence is not present and output the discrepancy amount.

40. The table game management system according to claim 39, wherein the at least one processor is configured to ascertain an accumulated amount of the discrepancy amount.

41. The table game management system according to claim 39, wherein:
the at least one processor is configured to calculate a gross profit (Y) as $Y=\Sigma(B \times WL \times R \% \pm L)$;
B is the total bet amount respectively for each of the plurality of games and each of a plurality of bet areas;
WL is the win-loss result respectively for each of the plurality of games and each of the plurality of bet areas;
R % is a gross profit ratio respectively for each of the plurality of bet areas;
L is the discrepancy amount respectively for each of the plurality of games; and
the at least one processor is configured to output the gross profit (Y).

42. The table game management system according to claim 41, wherein the game table is one of a plurality of game tables, and the at least one processor is configured to compare the change amount with the winning or losing amount for the game organizer and determine and output the discrepancy amount (L) respectively for each of the at least one game participant or respectively for each of a plurality of dealers that are each in charge of a respective one of the game tables.

43. The table game management system according to claim 1, wherein the at least one processor is further configured to, respectively for each of the at least one game participant, respectively for each of a plurality of dealers, and respectively for each of a plurality of game tables:
compare results of actual winning percentage and total amount of gross profit with numbers calculated by probability and statistics or numbers based on previous accumulated data at completion of a predetermined number of games,
determine whether there is a significant difference between the compared results and numbers, and
identify at least one of a game participant, a dealer, and a game table that causes the significant difference.

44. The table game management system according to claim 43, wherein:
the game table is one of a plurality of game tables;
gross profit ratios vary according to various layouts or bet areas of the plurality of game tables;
the at least one processor is configured to store bet chip amounts at bet positions of each game table of the plurality of game tables; and
based on the stored bet chip amounts, identify whether a cause for the significant difference in a series of games is dependent on the gross profit ratios.

45. The table game management system according to claim 34, wherein the at least one processor is configured to output a respective portion of the total bet amount for each of the different gross profit ratios.

46. A table game management system for use with gaming chips that each includes a unique ID, the table game management system comprising:
a reader configured to read the unique IDs of the gaming chips; and
at least one processor, wherein the at least one processor is configured to:
determine a respective win-loss result (WL) of each of a plurality of games at a game table for a bet area of the game table;
use the unique IDs read by the reader to detect respective positions, types, and numbers of those of the gaming chips that are respectively placed, by respective ones of at least one game participant, on the bet area for each of the plurality of games;
store the detected respective positions, types, and numbers;
based on the detected respective positions, types, and numbers, determine a total bet amount (B) formed by the gaming chips placed on the bet area of the game table for a predetermined number of games;
based on the determined win-loss result and the detected respective positions, types, and numbers, determine a winning or losing amount of a game organizer for the predetermined number of games;
determine a sales profit ratio (X) of the winning or losing amount of the game organizer to the total bet amount (B) for the predetermined number of games;
compare the sales profit ratio (X) to a theoretical profit ratio or a previous average profit ratio; and
generate an alarm in response to a result of the comparison.

* * * * *

UNITED STATES PATENT AND TRADEMARK OFFICE
CERTIFICATE OF CORRECTION

PATENT NO. : 11,410,491 B2
APPLICATION NO. : 16/411868
DATED : August 9, 2022
INVENTOR(S) : Shigeta Page 1 of 1

It is certified that error appears in the above-identified patent and that said Letters Patent is hereby corrected as shown below:

In the Claims

Claim 36, Column 49, Line 8: please replace "profie" with --profit--.

Signed and Sealed this
Eleventh Day of October, 2022

Katherine Kelly Vidal
*Director of the United States Patent and Trademark Office*